United States Patent
Sanghi et al.

(10) Patent No.: US 10,789,110 B2
(45) Date of Patent: Sep. 29, 2020

(54) METHODS AND APPARATUS FOR CORRECTING OUT-OF-ORDER DATA TRANSACTIONS BETWEEN PROCESSORS

(71) Applicant: Apple Inc., Cupertino, CA (US)

(72) Inventors: Karan Sanghi, San Jose, CA (US); Saurabh Garg, San Jose, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 16/179,667

(22) Filed: Nov. 2, 2018

(65) Prior Publication Data

US 2020/0104195 A1   Apr. 2, 2020

Related U.S. Application Data

(60) Provisional application No. 62/738,623, filed on Sep. 28, 2018.

(51) Int. Cl.
  *G06F 9/54* (2006.01)
  *G06F 9/46* (2006.01)
  *G06F 1/329* (2019.01)

(52) U.S. Cl.
  CPC ............ *G06F 9/544* (2013.01); *G06F 9/467* (2013.01); *G06F 1/329* (2013.01)

(58) Field of Classification Search
  None
  See application file for complete search history.

(56) References Cited

U.S. PATENT DOCUMENTS 4,805,137 A   2/1989  Grant et al.
4,949,299 A   8/1990  Pickett et al.

(Continued)

FOREIGN PATENT DOCUMENTS

EP   3013008 A1   4/2016
JP   2012108677 A  6/2012

(Continued)

OTHER PUBLICATIONS

PCI Express Base Specification, Rev 3 . 0 Behavioral Transmitter Parameters Date Unknown.
PCI Express Ease Specification Revision 3 . 0 Oct. 8, 2014.

*Primary Examiner* — Syed A Roni
(74) *Attorney, Agent, or Firm* — Gazdzinski & Associates, PC

(57) ABSTRACT

Methods and apparatus for correcting out-of-order data transactions over an inter-processor communication (IPC) link between two (or more) independently operable processors. In one embodiment, a peripheral-side processor receives data from an external device and stores it to memory. The host processor writes data structures (transfer descriptors) describing the received data, regardless of the order the data was received from the external device. The transfer descriptors are written to a memory structure (transfer descriptor ring) in memory shared between the host and peripheral processors. The peripheral reads the transfer descriptors and writes data structures (completion descriptors) to another memory structure (completion descriptor ring). The completion descriptors are written to enable the host processor to retrieve the stored data in the correct order. In optimized variants, a completion descriptor describes groups of transfer descriptors. In some variants, the peripheral processor caches the transfer descriptors to offload them from the transfer descriptor ring.

18 Claims, 24 Drawing Sheets

(56) References Cited

U.S. PATENT DOCUMENTS

| | | |
|---|---|---|
| 4,987,529 A | 1/1991 | Craft |
| 5,339,427 A | 8/1994 | Elko et al. |
| 5,367,688 A | 11/1994 | Croll et al. |
| 5,467,459 A | 11/1995 | Alexander et al. |
| 5,613,086 A | 3/1997 | Frey et al. |
| 5,692,182 A | 11/1997 | Desai et al. |
| 5,708,779 A | 1/1998 | Graziano et al. |
| 5,731,973 A | 3/1998 | Takaishi et al. |
| 5,903,564 A | 5/1999 | Ganmukhi et al. |
| 5,943,507 A | 8/1999 | Cornish et al. |
| 6,216,178 B1 | 4/2001 | Stracovsky et al. |
| 6,233,702 B1 | 5/2001 | Horst et al. |
| 6,260,152 B1 | 7/2001 | Cole et al. |
| 6,434,633 B1 | 8/2002 | Braun et al. |
| 6,523,073 B1 | 2/2003 | Kammer et al. |
| 6,553,446 B1 | 4/2003 | Miller |
| 6,735,642 B2 | 5/2004 | Kagan et al. |
| 6,947,442 B1 | 9/2005 | Sato et al. |
| 6,948,094 B2 | 9/2005 | Schultz et al. |
| 6,990,594 B2 | 1/2006 | Kim et al. |
| 7,100,020 B1 | 8/2006 | Brightman et al. |
| 7,191,240 B1 | 3/2007 | Johnson et al. |
| 7,281,172 B2 | 10/2007 | Chujo |
| 7,398,382 B2 | 7/2008 | Rothman et al. |
| 7,506,084 B2 | 3/2009 | Moerti et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,681,012 B2 | 3/2010 | Verm et al. |
| 7,685,476 B2 | 3/2010 | Andre et al. |
| 7,802,256 B2 | 9/2010 | Havens et al. |
| 7,908,335 B1 | 3/2011 | Citterelle et al. |
| 7,941,682 B2 | 5/2011 | Adams |
| 8,230,248 B2 | 7/2012 | Dance |
| 8,255,725 B2 | 8/2012 | Shimazaki et al. |
| 8,310,965 B1 | 11/2012 | Zhang et al. |
| 8,352,624 B2 | 1/2013 | Zimmerman et al. |
| 8,422,404 B2 | 4/2013 | Taki |
| 8,555,099 B2 | 10/2013 | Marinkovic et al. |
| 8,635,412 B1 | 1/2014 | Wilshire |
| 8,656,228 B2 | 2/2014 | Check et al. |
| 8,769,168 B2 | 7/2014 | Moertl et al. |
| 8,788,822 B1 | 7/2014 | Riddle |
| 8,808,091 B2 | 8/2014 | Shaw et al. |
| 8,819,386 B1 | 8/2014 | Mather |
| 8,832,331 B2 | 9/2014 | Co et al. |
| 8,914,649 B2 | 12/2014 | So et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,547,535 B1 | 1/2017 | Wilt |
| 9,568,970 B1 | 2/2017 | Kaushal et al. |
| 9,582,448 B2 | 2/2017 | Saitou |
| 9,594,718 B2 | 3/2017 | Kaushik et al. |
| 9,628,211 B1 | 4/2017 | Stoler et al. |
| 9,959,124 B1 | 5/2018 | Herbeck et al. |
| 1,014,669 A1 | 12/2018 | Krigovski et al. |
| 2002/0013868 A1 | 1/2002 | West |
| 2002/0169938 A1 | 11/2002 | Scott et al. |
| 2003/0014607 A1 | 1/2003 | Slavin et al. |
| 2003/0086122 A1 | 5/2003 | Parry et al. |
| 2003/0112758 A1 | 6/2003 | Pang et al. |
| 2003/0200413 A1 | 10/2003 | Gurumoorthy et al. |
| 2004/0064589 A1 | 4/2004 | Boucher et al. |
| 2004/0128568 A1 | 7/2004 | O'Shea |
| 2004/0179546 A1 | 9/2004 | McDaniel et al. |
| 2004/0221056 A1 | 11/2004 | Kobayashi |
| 2004/0268172 A1 | 12/2004 | Kates et al. |
| 2005/0033947 A1 | 2/2005 | Morris et al. |
| 2005/0076196 A1 | 4/2005 | Zimmer et al. |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0149711 A1 | 7/2005 | Zimmer et al. |
| 2005/0285862 A1 | 12/2005 | Noda et al. |
| 2006/0039285 A1 | 2/2006 | Chapman et al. |
| 2006/0047989 A1 | 3/2006 | Delgado et al. |
| 2006/0107071 A1 | 5/2006 | Girish et al. |
| 2007/0005869 A1 | 1/2007 | Balraj et al. |
| 2007/0043901 A1 | 2/2007 | Wu et al. |
| 2007/0070997 A1 | 3/2007 | Weitz et al. |
| 2007/0083687 A1 | 4/2007 | Rinaldi et al. |
| 2007/0180041 A1 | 8/2007 | Suzuoki |
| 2007/0226417 A1 | 9/2007 | Davis |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0183931 A1 | 7/2008 | Verm et al. |
| 2008/0244259 A1 | 10/2008 | Zimmer et al. |
| 2009/0113141 A1 | 4/2009 | Bullman et al. |
| 2009/0138650 A1 | 5/2009 | Lin et al. |
| 2009/0177847 A1 | 7/2009 | Ceze et al. |
| 2009/0225818 A1 | 9/2009 | Dapper et al. |
| 2009/0282050 A1 | 11/2009 | Thomas et al. |
| 2009/0282088 A1 | 11/2009 | Thomas et al. |
| 2010/0017655 A1 | 1/2010 | Gooding et al. |
| 2010/0027729 A1 | 2/2010 | Murphy et al. |
| 2010/0030932 A1 | 2/2010 | Ergas et al. |
| 2010/0098419 A1 | 4/2010 | Levy et al. |
| 2011/0022859 A1 | 1/2011 | More et al. |
| 2011/0029696 A1 | 2/2011 | Uehara |
| 2011/0035575 A1 | 2/2011 | Kwon et al. |
| 2011/0083002 A1 | 4/2011 | Albers et al. |
| 2011/0219208 A1 | 9/2011 | Asaad et al. |
| 2011/0248865 A1 | 10/2011 | Hong et al. |
| 2011/0257983 A1 | 10/2011 | Rathonyi et al. |
| 2011/0283031 A1 | 11/2011 | Lee |
| 2011/0320861 A1 | 12/2011 | Bayer et al. |
| 2012/0017063 A1 | 1/2012 | Hummel et al. |
| 2012/0072658 A1 | 3/2012 | Hashimoto et al. |
| 2012/0084483 A1 | 4/2012 | Sanjive |
| 2012/0102307 A1 | 4/2012 | Wong |
| 2012/0159513 A1 | 6/2012 | Pakhunov et al. |
| 2012/0306553 A1 | 12/2012 | Kim et al. |
| 2013/0124895 A1 | 5/2013 | Saha et al. |
| 2013/0138840 A1 | 5/2013 | Kegel et al. |
| 2013/0290947 A1 | 10/2013 | Li |
| 2014/0033220 A1 | 1/2014 | Campbell et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang et al. |
| 2014/0215236 A1 | 7/2014 | Heinrich et al. |
| 2014/0244866 A1 | 8/2014 | Manula et al. |
| 2015/0212806 A1 | 7/2015 | Hsieh |
| 2015/0293873 A1 | 10/2015 | Shao et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0364350 A1* | 1/2016 | Sanghi |
| 2016/0034195 A1 | 2/2016 | Li et al. |
| 2016/0041852 A1 | 2/2016 | Suarez et al. |
| 2016/0077989 A1 | 3/2016 | Pulyala et al. |
| 2016/0091959 A1 | 3/2016 | Barak et al. |
| 2016/0142988 A1 | 5/2016 | Powell et al. |
| 2016/0179157 A1 | 6/2016 | Ardanaz et al. |
| 2016/0269991 A1 | 9/2016 | Van et al. |
| 2016/0299860 A1 | 10/2016 | Harriman et al. |
| 2016/0363955 A1 | 12/2016 | Stevens et al. |
| 2017/0108912 A1 | 4/2017 | Li et al. |
| 2017/0325124 A1* | 4/2017 | Mitra |
| 2017/0177222 A1 | 6/2017 | Singh et al. |
| 2017/0228481 A1 | 8/2017 | Pusuluri et al. |
| 2017/0269675 A1 | 9/2017 | Klacar et al. |
| 2017/0286300 A1 | 10/2017 | Doshi et al. |
| 2018/0074572 A1 | 3/2018 | Bauman et al. |
| 2018/0101498 A1 | 4/2018 | Cosby et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |

(56) References Cited

U.S. PATENT DOCUMENTS

2018/0367460 A1  12/2018  Gao et al.
2019/0073011 A1   3/2019  Paterson et al.

FOREIGN PATENT DOCUMENTS

| KR | 20150041072 A | 4/2015 |
| KR | 20150079788 A | 7/2015 |

* cited by examiner

METHODS AND APPARATUS FOR CORRECTING OUT-OF-ORDER DATA TRANSACTIONS BETWEEN PROCESSORS

PRIORITY

This application claims the benefit of priority to U.S. Provisional Patent Application Ser. No. 62/738,623 filed Sep. 28, 2018 and entitled "METHODS AND APPARATUS FOR CORRECTING OUT-OF-ORDER DATA TRANSACTIONS BETWEEN PROCESSORS", which is incorporated herein by reference in its entirety.

RELATED APPLICATIONS

This application is related to commonly owned and/or commonly pending U.S. patent application Ser. No. 16/049,624 entitled "METHODS AND APPARATUS FOR VERIFYING COMPLETION OF GROUPS OF DATA TRANSACTIONS BETWEEN PROCESSORS" and filed Jul. 30, 2018; Ser. No. 15/865,638 entitled "METHODS AND APPARATUS FOR REDUCED-LATENCY DATA TRANSMISSION OVER AN INTER-PROCESSOR COMMUNICATION LINK BETWEEN INDEPENDENTLY OPERABLE PROCESSORS" and filed Jan. 9, 2018; Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS" and filed Oct. 8, 2015; Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS" and filed Oct. 8, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronics devices, as well as networks thereof. More particularly, and in one exemplary aspect, the disclosure is directed to methods and apparatus for implementing an inter-processor communication (IPC) link between two (or more) independently operable processors. In various exemplary aspects, the present disclosure is directed to optimized signaling for completion of groups of data transactions that arrive out-of-order between two or more independently operable processors.

2. Description Of Related Technology

As consumer devices and computer systems continue to incorporate multiple processing components (such as processor chipsets), each of these multiple processors play a distinct role in accomplishing one or more functions of such consumer devices and systems. For example, smartphones, smartwatches, tablets, laptops, phablets, portable media players, smart home device (including use in conjunction with the so-called Internet of things (IoT)), and other mobile devices have become ubiquitous in everyday life. To support the increasing complexity of computing by these devices and systems, consumer devices increasingly rely on independent operation of processors.

Various bus architectures and techniques have evolved over time to handle higher data rates and data throughput. One example of such a bus is the Peripheral Component Interconnect Express (PCIe); see, e.g., PCI Express Base Specification Revision 4.0 dated Oct. 5, 2017 ("PCIe Specification"), which is incorporated herein by reference in its entirety. PCIe is a high-speed serial computer expansion bus standard designed to replace older, conventional PCI (Peripheral Component Interconnect) and similar bus standards. In terms of architecture, PCIe is based on point-to-point connectivity with separate serial links connecting every endpoint component (e.g., graphics card, memory) to the root complex (e.g., a host processor). Typically, PCIe transactions involve the transfer of bulk data, such as large collections of data from one or multiple sources, typically stored or buffered in dedicated memory modules (e.g., RAM).

Notably, PCIe has many desirable attributes in terms of, inter alia, performance, flexibility, and wide adoption. However, PCIe (as well as some other existing "computer-centric" bus technologies) suffers from certain disadvantages, especially from the standpoint of portable electronic consumer devices. Specifically, extant PCIe technologies were developed for use within desktop, server, and laptop computers, which to varying degrees are agnostic to many electrical power, memory, and/or data size considerations affecting peripheral devices or smaller portable devices.

One such implementation of a multi-processor bus technology that is specifically designed for mobile devices is the inter-processor communication (IPC) bus. The IPC is derived from Peripheral Component Interconnect Express (PCIe) technology and inherits many of its desirable data transfer capabilities, however unlike desktop computing applications, the IPC is designed for use with independently operable processors that may have different power and time domains.

While IPC technologies enable much larger data transfers for mobile devices, mobile devices may encounter new problems of scale. For example, consider a scenario in which data is downloaded from a network via a peripheral processor (e.g., a baseband processor), and provided to a host processor (e.g., an application processor) over IPC link. The data download is provided as a flow of sequentially ordered packets, however the radio link fails at least one packet transmission (e.g., one transmitted packet was not received). Subsequently thereafter, the failed packets are retransmitted; as a result, the retransmission results in a non-sequential order (out-of-order) packet reception at the peripheral processor. Out-of-order packets must be re-ordered into their original sequential order for processing. In one such example scenario, the peripheral processor releases the packets in the same order as the packets were received (i.e., the non-sequential order) to the host processor. In other scenarios, the peripheral processor re-orders the packets and releases the packets in-order to the host processor. Either way, existing re-ordering logic stores the entire packet flow in order to re-order packets sequentially. Earlier bus technologies only transferred small amounts of data and thus only required small amounts of re-ordering memory; however IPC provides much higher bandwidth and requires significantly more memory. The higher re-ordering memory requirements for IPC are problematic as mobile devices are typically memory constrained.

Thus, improved solutions for re-ordering packets over inter-processor communication (IPC) links between two or more independently operable processors are needed. More specifically, there is a need for improved apparatus and associated methods that can efficiently re-order data, while also providing the desirable benefits of low-power, low-latency, and high throughput for mobile devices. Ideally, such solutions may reduce and/or substantially eliminate waiting or confirmation times, thereby improving speed of operation between independently operable processors.

SUMMARY

The present disclosure satisfies the foregoing needs by providing, inter alia, methods and apparatus for processing and correcting groups of out-of-order data transmissions over an inter-processor communication (IPC) link between two (or more) independently operable processors.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of re-ordering an out-of-order transaction of digital data received via a baseband processor in data communication with an application processor, the method including: receiving a plurality of packets via a first interface. The method also includes receiving one or more TDs (transfer descriptors), where each of the one or more TDs is associated with a corresponding tag. The method also includes writing the plurality of packets into data buffers identified by the one or more TDs. The method also includes determining an order for the plurality of packets. The method also includes providing the order via one or more CDs (completion descriptors). The method also includes causing the application processor to retrieve the plurality of packets from the data buffers identified by the one or more TDs. The method also includes where the application processor re-orders the plurality of packets based on the order. Other embodiments of this aspect include corresponding computer systems, apparatus, and computer programs recorded on one or more computer storage devices, each configured to perform the actions of the methods.

Implementations may include one or more of the following features. The method further including determining the order based on one or more headers of the plurality of packets. The method where the providing the order via the one or more CDs includes providing a single CD that completes multiple TDs. The method where the providing the single CD that complete the multiple TDs includes identifying a common completion status for one or more outstanding TDs up to and including a single TD. The method may also include providing the common completion status and the corresponding tag associated with the single TD. The method further including requesting a retransmission of one or more missing packets. The method may also include responsive to receiving a retransmitted plurality of packets via the first interface. The method may also include writing the retransmitted plurality of packets into data buffers identified by one or more subsequent TDs. The method may also include causing the application processor to retrieve the retransmitted plurality of packets from the data buffers identified by the one or more subsequent TDs. The method where determining the order for the plurality of packets includes determining the order for the retransmitted plurality of packets. The method where the causing the application processor to retrieve the plurality of packets from the data buffers identified by the one or more TDs frees the one or more TDs. The method may also include writing another plurality of packets into the data buffers of the one or more TDs that were identified. Implementations of the described techniques may include hardware, a method or process, or computer software on a computer-accessible medium.

One general aspect includes a user device including: a first processor and a second processor. The user device also includes the first processor coupled to a first interface. The user device also includes a shared memory structure including a first memory structure and a second memory structure; and a non-transitory computer-readable apparatus including a storage medium having a computer program stored thereon. In one exemplary embodiment, the computer program includes instructions configured to, when executed, cause the first processor to: read a plurality of packets from data buffers identified by the first memory structure; transmit the plurality of packets; receive acknowledgements that identify one or more packets that were successfully transmitted; determine an order for the one or more packets that were successfully transmitted; provide the order via the second memory structure; and where the second processor frees the plurality of packets based on the order provided via the second memory structure. Other embodiments of this aspect include corresponding computer systems, apparatus, and computer programs recorded on one or more computer storage devices.

In one variant, the instructions are further configured to, when executed, cause the first processor to: identify one or more packets that were unsuccessfully transmitted; and retransmit the one or more packets that were unsuccessfully transmitted.

In another variant, the instructions are further configured to, when executed, cause the first processor to: responsive to successful retransmission of the one or more packets that were unsuccessfully transmitted, determine a retransmitted order; and provide the retransmitted order via the second memory structure.

In another variant, the first memory structure is composed of a plurality of TDs (transfer descriptors) and the second memory structure is composed of a plurality of CDs (completion descriptors). In one such variant, a single CD of the second memory structure completes multiple TDs of the first memory structure. For example, a single CD of the second memory structure includes a tag associated with a single TD. Implementations of the described techniques may include hardware, a method or process, or computer software on a computer-accessible medium.

One general aspect includes a system configured to re-order data transactions via an inter-processor communication (IPC) link between two or more independently operable processors, the system including: a shared memory structure including a transfer descriptor ring and a completion descriptor ring, the shared memory structure being accessible to a first processor and second processor via the IPC link, where the first processor is configured to: allocate a plurality of transfer descriptors to the transfer descriptor ring, the plurality of transfer descriptors configured to describe buffers of data of the second processor; responsive to a doorbell interrupt, retrieve a corresponding first set of buffer data corresponding to a first set of the plurality of transfer descriptors; and re-order the corresponding first set of buffer data based on a first order provided within a first set of completion descriptors. Other embodiments of this aspect include corresponding computer systems, apparatus, and computer programs recorded on one or more computer storage devices, each configured to perform the actions of the methods.

In one variant, the first processor includes an application processor; the second processor includes a wireless modem; and the wireless modem is configured to receive data from an external wireless-enabled device. In some variants, the wireless modem is configured to transact and receive data over the IPC link. In a variant, the first processor retrieves a corresponding second set of buffer data based on a second set of transfer descriptors in a second order provided within a second set of completion descriptors responsive to another doorbell interrupt by the second processor. In a variant, the first and second order describe a sequence of the first and second set of buffers of data.

In one variant, a single completion descriptor completes multiple transfer descriptors. In some such variants the single completion descriptor includes a tag associated with a single transfer descriptor. In still other variants, the single completion descriptor includes a distributive status for the multiple transfer descriptors. Implementations of the described techniques may include hardware, a method or process, or computer software on a computer-accessible medium.

In one aspect of the present disclosure, a method is disclosed. In one embodiment thereof, the method is for re-ordering an out-of-order transaction of digital data received via an independently operable processor in data communication with another independently operable processor is disclosed.

In another aspect, a user device is disclosed. In one embodiment, the user device includes: a first processor and a second processor; a shared memory structure including a first memory structure and a second memory structure; and a non-transitory computer-readable apparatus including a storage medium having a computer program stored thereon. In one exemplary embodiment, the computer program includes instructions configured to, when executed, cause the second processor to indicate an order for re-ordering an out-of-order transaction of digital data.

In another aspect, a user device is disclosed. In one embodiment, the user device includes: a first processor and a second processor; a shared memory structure including a first memory structure and a second memory structure; and a non-transitory computer-readable apparatus including a storage medium having a computer program stored thereon. In one exemplary embodiment, the computer program includes instructions configured to, when executed, cause the first processor to re-order an out-of-order transaction of digital data, based on an order provided by the second processor.

In another aspect, a system configured to enable correction of a data transaction via an inter-processor communication (IPC) link between two or more independently operable processors is disclosed. In one embodiment, the system includes: a shared memory structure including a transfer descriptor ring and a completion descriptor ring, the shared memory structure being accessible to a first processor and second processor via the IPC link, wherein the completion descriptor ring describes an order of use for the transfer descriptor ring.

In another aspect, a non-transitory computer-readable apparatus is disclosed. In one embodiment, the non-transitory computer-readable apparatus includes a storage apparatus having at least one computer program having instructions.

In another aspect, a system on chip (SoC) is disclosed. In one embodiment, the SoC includes: a first independently operable processor and a second independently operable processor coupled with an inter-processor communication (IPC) link there between, and a shared memory apparatus.

In another aspect, an inter-processor communication (IPC) link is disclosed. In one embodiment, the IPC link interconnects a first independently operable processor and a second independently operable processor.

In another aspect, an independently operable processor is disclosed. In one embodiment, the independently operable processor includes a baseband processor, the baseband processor being in data communication with a wireless modem. In one exemplary variant, the baseband processor includes the wireless modem. In another embodiment, the independently operable processor includes an application processor.

Other features and advantages of the present disclosure will immediately be recognized by persons of ordinary skill in the art with reference to the attached drawings and detailed description of exemplary embodiments as given below.

Figure 1:
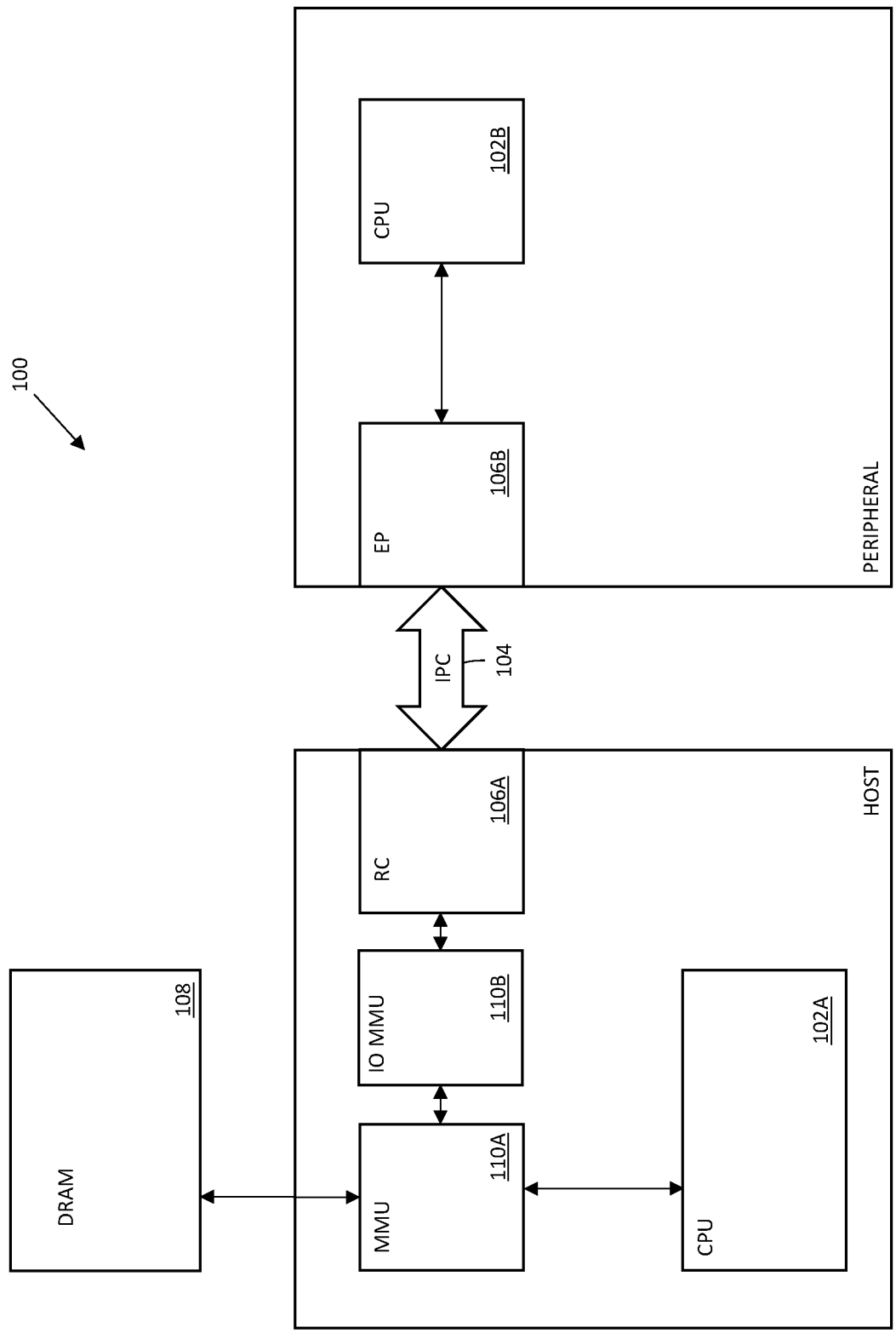
FIG. 1 illustrates an exemplary apparatus, useful for illustrating various principles described herein.

All figures © Copyright 2018 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link (for example, of the type described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015, previously incorporated by reference in its entirety), it will be recognized by those of ordinary skill that the present disclosure is not so limited. In fact, the various aspects of the disclosure are useful in any device or network of devices that is configured to incorporate and coordinate multiple independently operable processing elements, as is disclosed herein.

Exemplary Inter-processor Communications Link

As previously noted, bus techniques have evolved which are able to handle faster data rates and provide higher levels of data throughput. One such example bus technology is referred to as a so-called Peripheral Component Interconnect Express (PCIe) bus. PCIe has historically been used as a high-speed serial computer expansion bus technology; PCIe is based on point-to-point connectivity with separate serial links connecting every endpoint component (e.g., graphics card, memory, etc.) to the root complex (e.g., host processor). However, existing PCIe technologies consume significant power and are unsuitable for relatively low-power and low-latency communication protocols used in consumer electronics applications. Current PCIe bus protocols perform operations involving data transactions that are more appropriate for bulk, high-throughput data communication between a "peripheral" processor and the "host" processor.

Within this context, exemplary methods and apparatus are now described which support an inter-processor communication (IPC) link between two (or more) independently operable processors. The following discussions will be described in reference to a "root complex" (RC) or host processor, and an "endpoint" (EP) or peripheral processor. For reasons which will become apparent below, it is appreciated that the designation as to host or peripheral processor is used to simplify and/or clarify the following explanations, and does not imply existing host or peripheral functionality, or that such roles cannot be reversed. Moreover, those of ordinary skill in the related arts will readily appreciate that the various principles described herein, may broadly apply to any network of two (or more) independently operable processors. Further, the various principles described herein may apply to transactions from a host processor to a peripheral processor and vice versa.

As used herein, the term "independently operable processor" refers to a processing system having one or more of the processor clock domain, processor power domain, processor code base, arithmetic units, registers, and/or memory, capable of being isolated to allow the processor to operate without other processors in the processing system. In one exemplary embodiment, an independently operable processor can transition into various power-conserving modes independent of the power-conserving modes of other ones of the plurality of sub-systems. In another embodiment, an independently operable processor can adjust its clock frequency, phase, and/or amplitudes, independent of the power-conserving modes of other ones of the plurality of sub-systems. In still another embodiment, an independently operable processor can reboot and/or update its firmware or software independent of the software execution of other ones of the plurality of sub-systems.

As used herein, a "processor" or "processor apparatus" refers generally to any logic or circuitry or a group thereof that responds to and processes computer-readable instructions or firmware that are stored within, for example, a non-transitory computer-readable medium, e.g., a memory. A processor may be embodied in hardware (e.g., an integrated circuit (IC)) that performs logical operations according to the instructions. Examples of processing alternatives include, without limitation, reduced instruction set computer (RISC) processors, complex instruction set computing (CISC) processors, field-programmable gate arrays (FPGAs), application specific integrated circuits (ASICs), and programmable logic devices (PLDs).

As used herein, a "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth (IEEE Std. 802.15.1) or IEEE Std. 802.15.4, "ZigBee", Short Messaging Service (SMS), near field communication (NFC) or radio-frequency identification (RFID), WiMAX (IEEE 802.16), WMANs, 3G cellular (e.g., WCDMA, 3GPP, 3GPP2, and GSM and improvements thereon, and ISM band networks.)

As used herein, the term "application processor" is a processor that is configured to execute an operating system (OS) environment that delivers primary system capabilities. Many application processors also execute software for primary application and data processing. In some cases, the applications may also execute first party applications (applications provided by the manufacturer), second party (applications provided by trusted software developers), and/or third party applications (applications provided by untrusted software developers). Application processors may be particularly useful in mobile client devices. In some embodiments, application processors utilize one or more processor cores and are incorporated on a system on a chip (SoC).

In one aspect, the IPC protocol may be based on a "shared" memory interface for run-time processing. That is, the independently operable processors may each share, either virtually or physically, a common memory interface. In one such embodiment, the shared memory interface provides a multi-channel IPC link for high throughput transfers. In one exemplary implementation, the shared memory interface remains functional when any one of the independently operable processors is active, even when one or more of the remaining independently operable processors are asleep, powered down, powered off, etc.

As used herein, the term "logical" or "virtual" are interchangeably used to refer to, without limitation, an abstraction (typically performed in software or machine logic) to represent physical mechanisms, attributes or functionalities as a data structure. For example, as used herein a "logical bus interface," "virtual bus interface," etc., refer generally to an abstraction or representation of a bus interface as a series of data structures. In contrast, a "physical bus interface" as used herein refers to the physical mechanisms, attributes or functionalities of a physically tangible bus interface.

FIG. 1 illustrates exemplary apparatus 100 useful for illustrating various principles described herein. As shown, the apparatus 100 includes first and second independently operable processors 102A, 102B, and a physical bus interface 104 that is configured to implement an inter-processor communication (IPC) link between the two (or more) independently operable processors.

In one exemplary embodiment, the first and second processor are connected via a bus interface. As used herein, the term "bus interface" refers to any communication system that transfers data between processors and/or peripheral components. A bus interface may include, in part or whole, hardware components (wiring, optical fiber, and other transmission mediums) and/or associated software (including communication protocols and hardware drivers).

As used herein, an "inter-processor communication link" or "IPC link" refers to any communication bus between two (or more) processors, whether the processors are operating independently, not independently, or a combination thereof. An IPC link may include one or more data pipes that are configured to transfer data from one processor to another, for example, between a host side (e.g., root complex) and peripheral side (e.g., endpoint) of the link. A given data pipe of an IPC link may be configured to transfer the data in a unidirectional or bidirectional fashion.

As used herein, "unidirectional" relates to transmission or reception of data (e.g., instructions, packets, signals) in one direction such that the data is only configured to be transferred from a given computing entity (e.g., logic, circuitry, processor) to another computing entity, but not in the other direction (i.e., from the other computing entity back to the given computing entity).

On the other hand, "bidirectional" or "multidirectional" relates to transaction of data (e.g., instructions, packets, signals) in two or more directions such that the data may be configured to be transferred between a given computing entity (e.g., logic, circuitry, processor) to another computing entity (and vice versa).

In one implementation, the first processor 102A includes an application processor. As shown in FIG. 1, the first processor 102A is coupled to a root complex (RC) 106A which functions as the host of the IPC bus.

In one implementation, the second processor 102B includes a wireless modem. In various embodiments, the second processor 102B includes a Wi-Fi modem, cellular modem, mobile broadband modem, Bluetooth modem, NFC modem, and/or RFID reader, and/or other short-range and long-range protocols so as to include a wireless communication chipset. Other examples of wireless modems include, without limitation devices implementing, e.g., IEEE Std. 802.11 (any variants thereof, including Wi-Fi and wireless local area network (WLAN)), PAN and WPAN technology such as, e.g., Bluetooth (including Bluetooth Low Energy (BTLE)) or IEEE Std. 802.15.3 and 802.15.4, "ZigBee", NFC or RFID, WiMAX (IEEE 802.16), WMANs, 3G or 4G cellular (e.g., Long Term Evolution/Advanced (LTE, LTE-A, LTE-U, and LTE-LAA), WCDMA, 3GPP2, and GSM and improvements thereon), other 3GPP-based protocols (e.g., 5G New Radio (NR) or hybrid 4G/5G-based protocols), and ISM band devices.

In other embodiments, the second processor 102B may be, e.g., a media processor or other network processing element.

As shown in FIG. 1, the second processor 102B is coupled to an endpoint (EP) 106B which functions as the peripheral of the IPC link.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power. The non-transitory computer readable medium is configured to store computer readable instructions for execution. Such computer-readable instructions may alternatively or additionally be stored on a local cache associated with at least one of the processors.

As used herein, the term "buffer" refers to a device, circuit, logic, or an area of a computing environment that is used to store data temporarily. Typically, buffered data is stored until instructions are given or received to move the stored data to another entity (e.g., processor, memory, another buffer), or "flush" (empty) the buffer. The term "buffer" may be interchangeable with similar terms such as "cache," "queue," "shared memory," or "local memory" depending on the context. In one embodiment, a buffer may be a type of memory. Examples of types of buffers may include, circular or ring buffer, FIFO (first in, first out), LIFO (latest in, first out), round robin, shortest job first, shortest remaining time, dynamic array. In another embodiment, a buffer may refer to a data structure or memory allocation, e.g., data represented by a so-called transfer descriptor (TD), completion descriptor (CD), transfer descriptor ring (TR), completion descriptor ring (CR), or any other such scheme for storing and/or organizing data. Persons of ordinary skill in the relevant art will recognize various other structures and operations related to buffering and temporary data storage.

Moreover, as used herein, "shared memory" refers to a memory device that is accessible by two or more processor apparatus. In some contexts, a "shared memory" may operate as a cache or buffer. In one embodiment, shared memory is configured to allow a processor to write data thereto, so as to enable a different processor to read the data. For example, a processor (e.g., an independently operable processor) may write so-called transfer descriptors (TDs) to a so-called transfer descriptor ring (TR) residing on the shared memory (or vice versa). Another processor (e.g., a different independently operable processor) may read the TDs on the shared memory. In one embodiment, a processor may write so-called completion descriptors (CDs) to a so-called completion descriptor ring (CR) residing on the shared memory, for another processor to read. Functions of TD, TR, CD and CR will be described in greater detail below. While the foregoing envisions at least three separate entities (two or more processors and a shared memory device), artisans of ordinary skill will recognize that a given shared memory device may reside on one (or each) of the processors, and/or stand alone as an apparatus that is separate from the processors and accessible by one or more processors.

As shown in the exemplary embodiment of FIG. 1, both the first and the second processors (102A, 102B) are each coupled to a non-transitory computer readable medium (e.g., dynamic random access memory (DRAM) 108) and one or more memory management units (MMUs). An MMU translates virtual memory addresses (which are allocated within a processor's memory map) to physical addresses in the DRAM 108. In one exemplary embodiment, the MMU is further subdivided into an MMU 110A and an Input Output MMU 110B thereby allowing for the host and peripheral to have distinct memory maps (e.g., virtual memory addresses for the host and virtual IO addresses for the peripheral). While the foregoing split MMU configuration is illustrated, artisans of ordinary skill in the related arts will readily appreciate that a single MMU or more MMUs (three, four, etc.) may be substituted with equivalent success given the contents of the present disclosure.

Figure 1A:
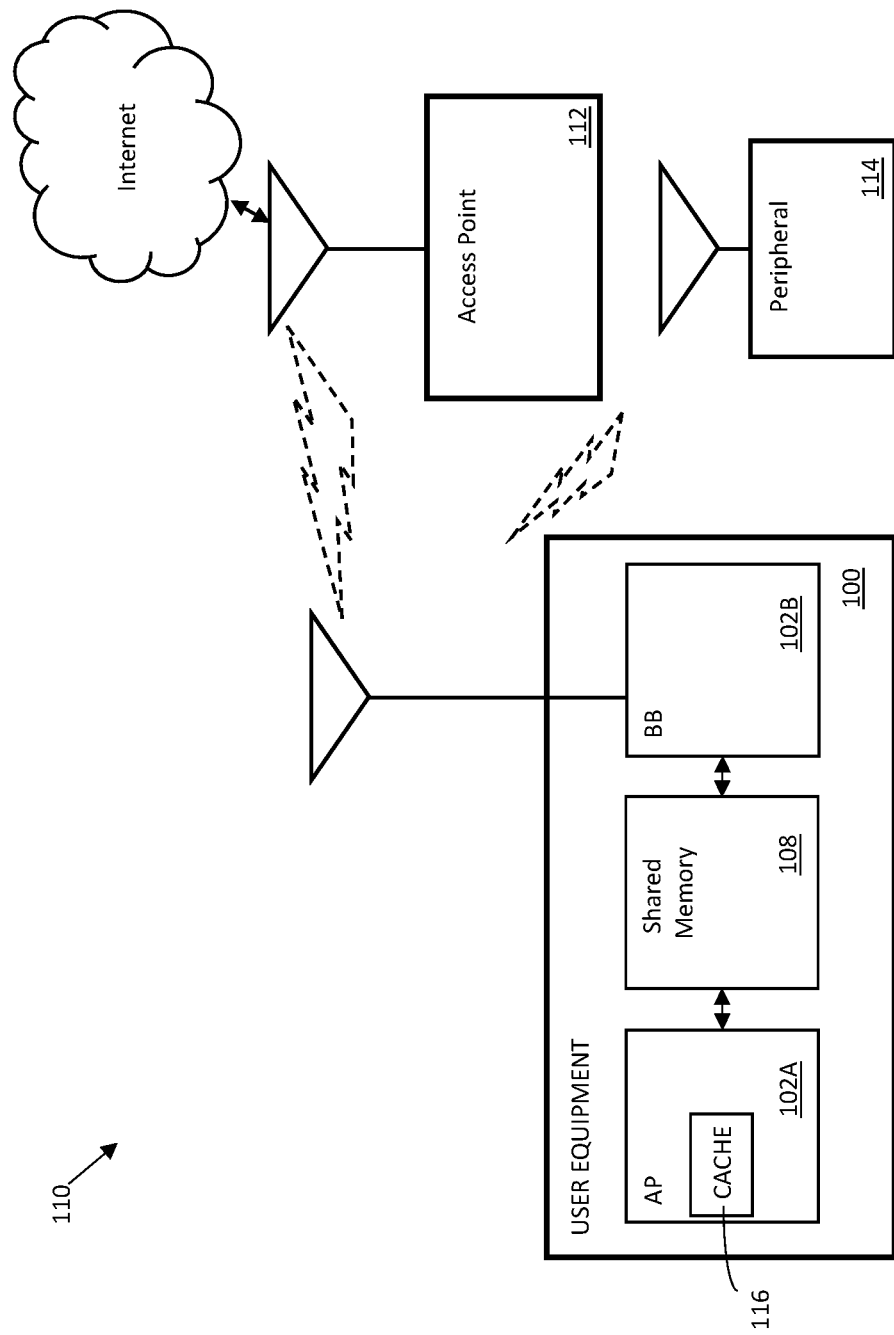
FIG. 1A illustrates an exemplary network architecture, useful for illustrating various principles described herein.

FIG. 1A illustrates an exemplary network architecture 110 useful for implementing various principles described herein. In an exemplary embodiment, the architecture 110 includes user equipment 100 that includes a host-side processor (e.g., application processor 102A), a peripheral-side processor (e.g., baseband processor 102B), and a shared memory module (e.g., DRAM 108) between the application processor and the baseband processor. The application processor and baseband processor may include independently operable processors in data communication via an IPC link. The shared memory module 108 may include memory structures (including designated memory slots) for writing and reading data by the application processor and the baseband processor according to the principles described herein.

In various embodiments, the user equipment 100 may house the independently operable processors and use the functions thereof. In one exemplary embodiment, the user equipment 100 may be a mobile computing device or system for the consumer or end user, such as a smartphone, smartwatch, tablet, or laptop. The user equipment 100 may be configured for wireless connectivity and/or wired connectivity via at least the baseband processor 102B. In one variant, the processors include integrated circuits (IC) disposed on a semiconductor die for operation of the user equipment. For example, the baseband processor may include (or be in data communication with) a wireless modem for cellular or Wi-Fi connectivity (or any other means of connectivity, such as Bluetooth, RFID, Global Positioning System (GPS), or other long- or short-range protocols noted above).

In some embodiments, as shown, the user equipment 100 may be in data communication with other external devices. In one embodiment, the application processor 102A may be connected to an access point 112, by wired or wireless means, via the baseband 102B (via implementations of Wi-Fi, cellular, Bluetooth, NFC, etc.). The access point 112 may in turn enable exchange of data to and from local intranets, the Internet, and/or other networks including wireless networks. In another embodiment, the user equipment may be in data communication with a peripheral device 114. Exemplary peripheral devices include, but are not limited to, wireless keyboards, mice, audio equipment (e.g., earbuds, headset, speakers), home and office equipment (e.g., wireless printers), gaming consoles or devices, smart home devices enabled to communicate with other devices based on the so-called Internet of Things (IoT) paradigm, and other user equipment. In some embodiments, the peripheral device may also be in data communication with other networks or devices (e.g., the access point 112 and/or intranets, the Internet) to receive and send data.

In the exemplary embodiment, the data exchanged via the baseband processor 102B may be generated by the application processor 102A and sent "upstream" to the access point 112, or the data may be transmitted from the access point "downstream" to the application processor 102A via the baseband processor 102B. Each of the application processor and the baseband processor may generate its own data for the other processor(s) to process. Furthermore, each of the processors may transmit (and/or receive) related data represented by or encapsulated directly in transfer descriptors (TDs) and/or completion descriptors (CDs), as will be detailed further herein.

Figure 2:
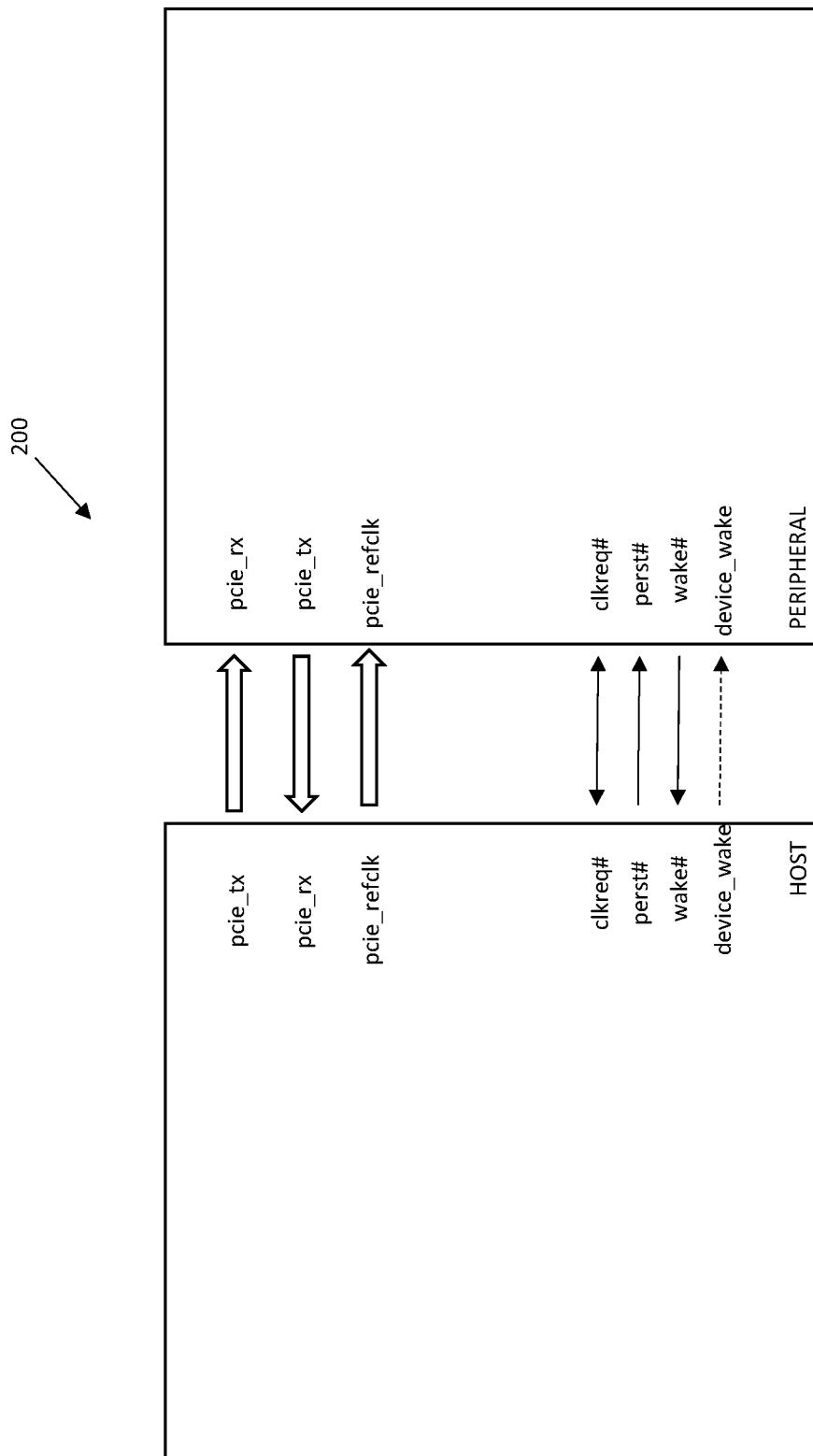
FIG. 2 illustrates an exemplary inter-processor communications link, useful for illustrating various principles described herein.

Now referring to FIG. 2, the physical bus interface 200 includes an IPC link that may be loosely based on the Peripheral Component Interconnect Express (PCIe) standard in one exemplary embodiment (e.g., the aforementioned PCI Express Base Specification Revision 4.0 dated Oct. 5, 2017, previously incorporated by reference in its entirety). Those of ordinary skill in the related arts, given the contents of the present disclosure, will readily appreciate that other bus interface standards may be substituted with equal success. Various modifications to the underlying physical bus interface 200 (and protocols used therewith) to improve IPC functionality with respect to optimizing data transactions, as well as acknowledgments and verifications for completions thereof between independently operable processors are described in greater detail hereinafter.

In the exemplary embodiment, the physical bus interface 200 may be a point-to-point communication channel between two IPC ports (e.g., the RC and EP) allowing both to send and receive access requests (e.g., configuration read/write, I/O read/write, memory read/write) and interrupts. At the physical level, a link is composed of one or more lanes, each lane having receive and transmit component (e.g., pcie_rx and pci_tx). Each lane is a full-duplex byte stream, transporting data packets in eight-bit 'byte' formats, between the RC and EP of a link, in both directions simultaneously. The physical bus interface 200 may support multiple logical links (or virtual bus interfaces) representing multiple ongoing data sessions.

In one such embodiment, each virtual bus interface may further include one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

In-Place Protocol

Figure 3:
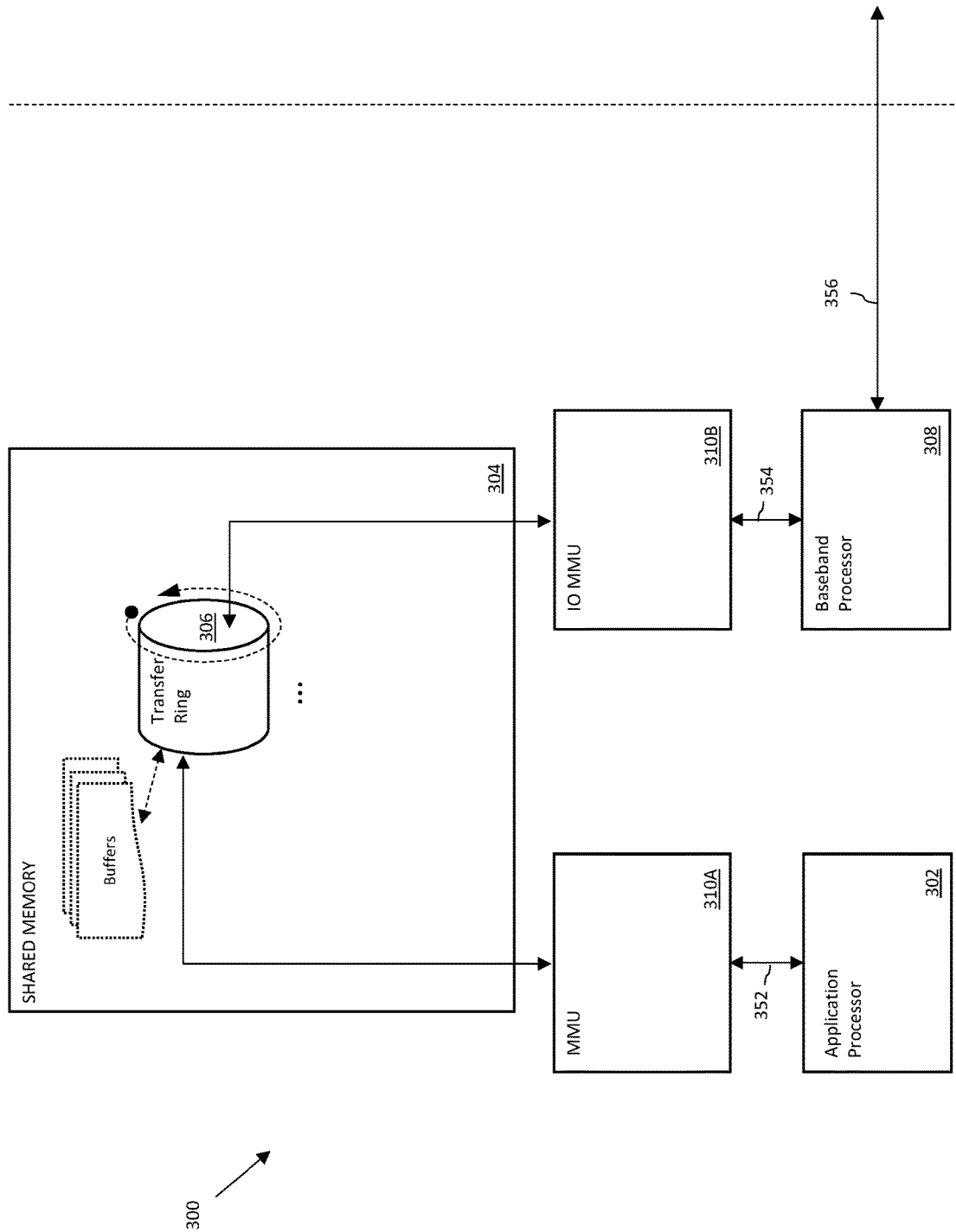
FIG. 3 illustrates an exemplary memory layout, useful for illustrating in-place completion described herein.

FIG. 3 illustrates an exemplary "in-place" transmission protocol for data transactions between two or more independently operable processors. The exemplary in-place scheme uses transfer descriptors (TDs) in a shared memory to imply transfer status without express signaling.

As a brief aside, an IPC link may include at least one pair of unidirectional pipes. In some variants, the IPC link may alternatively or additionally include at least one pair of bidirectional or multidirectional pipes. In various other embodiments, one processor may be in data communication with a plurality of other processor apparatuses via one or more IPC links. For example, in some embodiments, the host may be connected to multiple peripheral processors. In other embodiments, multiple host processors may be connected to a given peripheral processor. More generally, any number of hosts and any number of processors may be connected together according to the aforementioned IPC bus.

Data transactions (e.g., input/output (I/O) transactions) associated with one or more data pipes may be composed of at least one "transfer descriptor" (TD) that may be identified within a "transfer descriptor ring" (TR) described infra. In one embodiment, a single TD may describe a physically contiguous memory buffer, accessible by the host and/or the peripheral processors over the communication link. A TD may include various fields, such as the type of the descriptor, size of the buffer, address of the buffer, tag unique to the buffer described by the TD, remaining count indicating the number of TDs remaining in a packet transfer, a header with information at the beginning of the TD, or a footer and/or a header field containing data such as metadata or data associated with each TD.

Each "pipe" (data stream) may be associated with one "transfer descriptor ring" (TR), also called "transfer ring." During, for example, an exemplary in-place operation, TDs sit inside a TR data structure that resides in a memory structure (e.g., a DRAM coupled to the host processor that is a shared memory also accessible by the peripheral processor). Each TR is configured to encompass multiple TDs. Each TR may be described by a TR head index (also referred to as a head pointer) and/or a TR tail index (also referred to as a tail pointer). The TR head index points to the next empty slot in the TR the host may process (e.g., write and/or read a TD), whereas the TR tail index points to the address of the next TD which the peripheral processor may process. The TR head index may be written by the host and read by the peripheral. The TR tail index may be read by the host and written by the peripheral. When the head pointer of the TR is equal to its tail pointer, the TR is empty.

Processing a TR may be either a read or a write. For example, in order to perform a write, the host processor allocates a buffer for the write that is defined by a TR. The size of the write determines the number of TDs in the TR. The host writes data to the buffer, and provides the buffer to the peripheral. Thereafter, the peripheral can read from the buffer to effectuate the write. Similarly, in order to perform a read, the host processor allocates a buffer for the read; the size of the read is determined by the number of TDs in the TR. The buffer (still empty) is provided to the peripheral and the peripheral fills the buffer. When the buffer is full, the peripheral notifies the host and the host reads the data stored in the buffer.

The TD/TR data structure, particularly when used with independently operable processors, enables independent queue processing for both the host and peripheral processors. For example, the peripheral can read from one area of memory described by a first TD while the host writes to a different area of memory to prepare a different TD. Processing may be performed on a, e.g., best-effort, prioritized, round robin, weighted round robin, or any number of other ordering basis. In some cases, TDs may be queued and/or flushed according to ongoing flow control and/or other bandwidth management. Various other schemes for TD processing will be readily appreciated by those of ordinary skill, given the contents of the present disclosure, for example, as used for the various data transmission schemes over an IPC link as described in U.S. patent application Ser. No. 15/865,638 entitled "METHODS AND APPARATUS FOR REDUCED-LATENCY DATA TRANSMISSION OVER AN INTER-PROCESSOR COMMUNICATION LINK BETWEEN INDEPENDENTLY OPERABLE PROCESSORS" and filed Jan. 9, 2018, incorporated supra.

As shown in the exemplary "in-place" mechanism of FIG. 3, a first processor 302 (e.g., a host or application processor) first writes data to a shared memory 304. Specifically, the first processor 302 may write one or more TDs to a transfer descriptor ring (TR) 306 that resides on the shared memory 304. Each TD may include data, or point to data (e.g., residing on a separate memory module) to be delivered to/from another second processor 308 (e.g., a peripheral or baseband processor) and/or to another device (e.g., a peripheral device or an access point). After allocating the TDs to the TR 306, the first processor 302 updates a head index residing in shared memory 304. For write accesses, external memory (e.g., DRAM 108 as shown in FIG. 1) and/or the backing buffers associated with the allocated TDs are filled with data by the first processor 302; for read accesses, the DRAM and/or backing buffers are allocated by the first processor 302, but reserved for the second processor 308 to write into.

In various embodiments, the data included in the TD may broadly refer to a payload for delivery to/from the second processor 308 or another device. Artisans of ordinary skill in the related arts will readily appreciate that a "payload" as used herein broadly refers to a portion of transmitted packetized data that includes an intended message. The payload excludes protocol information used for, e.g., routing the message, error correction, flow control, and other transactional overhead. For example, in addition to the payload, a data packet (including, e.g., a transfer descriptor) may include metadata or other fields sent solely to facilitate the delivery of the payload. In another example, the payload may be included with a segment of a packet that is typically not used for payload delivery, such as a header or footer component of a transfer descriptor.

As a brief aside, there are a wide variety of "data types" used in the computing arts. As used herein, "data types" refer to specific formats or constructions of data that can be classified and/or used by logic (e.g., hardware, firmware, compiler or software, processor, programmable logic, etc.) to identify how the data is being used. Data types are not limited to "natively" understood data types or generic data types; some data types may be dynamically defined in software, and specialized or specifically designed for a particular function or operation.

So-called "value" data types are data types that signify one or more values to the compiler. Common examples of value data types include, without limitation: Booleans, characters, integer numbers, floating-point numbers, and fixed-point numbers. Another family of commonly used data types are so-called "reference" data types; reference data types are interpreted by logic to "refer" to other data. Common examples of reference data types include without limitation, references and pointers. Some hybrid data types may take on the characteristics of either value or reference data types, depending on how they are handled by the logic; such hybrid data types include, without limitation: arrays, multi-dimensional arrays, lists, dictionaries, sets, stacks, queues, and enumerations. For example, a list may be treated as a value and compiled "in-line" (i.e., a compiler copies list values at each instance of the list), or treated as a reference (i.e., the complier references a memory location for each instance of the list).

Within the context of the present disclosure, as used herein, the term "pointer" refers to a specific reference data type that "points" or "references" a location of data in memory. Typically, a pointer stores a memory address that is interpreted by a compiler as an absolute location in system memory or a relative location in system memory based on, e.g., a base address, reference address, memory window, or other memory subset. During operation, a pointer is "dereferenced" to recover the data that is stored in the location of memory.

As used herein, the term "descriptor" refers to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

As used herein, the term "metadata" refers to data that describes data. Metadata varies widely in application, but generally falls into one of the descriptive, structural, and/or administrative categories. Descriptive metadata describes data in a manner to enable, e.g., discovery and/or identification. Common examples include without limitation, e.g., type, size, index tags, and keywords. Structural metadata describes the structure of the data, e.g., how compound objects are put together. Common examples include without limitation, e.g., prefix, postfix, table of contents, order, and/or any other information that describes the relationships and other characteristics of digital materials. Administrative metadata provides information to help manage a resource; common examples include, e.g., authorship and creation information, access privileges, and/or error checking and security based information (e.g., cyclic redundancy checks (CRC), parity).

As used herein, a "footer" component refers to data associated with, and following, a data structure or a portion thereof (e.g., following a transfer descriptor, completion descriptor). As used herein, a "header" component refers to data associated with, and preceding, a data structure or a portion thereof (e.g., preceding a transfer descriptor, completion descriptor). In some embodiments, a header or footer may be an optional component of a transfer descriptor or a completion descriptor. Similarly, a header or footer may include data (e.g., a payload) or metadata that describes the descriptor, packet, and/or payload.

Referring back to FIG. 3, the shared memory 304 is accessible by the first processor 302 via a memory management unit (MMU) 310A and is also accessible by a second processor via an IO MMU 310B. In one variant, the shared memory may reside on one of the processors (e.g., the first processor 302), such that data can be read from or written to the shared memory via the internal busses of the processor. The second processor 308 may access the shared memory via an external memory bus interface. In another variant, the application processor 302 and baseband processor 308 are each separately coupled to a shared memory (e.g., a two-port (both read/write) or dual port (one read, one write) RAM). In other variants, the processors share an interface to the shared memory (e.g., a single port RAM), and accesses are multiplexed. Still other shared memory topologies may be readily implemented by those of ordinary skill, given the contents of the present disclosure.

During operation, the first processor 302 allocates the one or more TDs to the TR 306 via link 352 and notifies the second processor 308 by, e.g., ringing a doorbell, or writing to an array or message signaled interrupt (MSI). At a later point in time, the second processor 308 may read the TDs that are queued for processing in the TR via link 354. The second processor reads the TDs and/or de-references the TDs to the corresponding locations of the backing buffers which are pointed to by the TDs. After the second processor reads/writes the data or payloads into/from the backing buffers, the second processor updates a tail index of the TR. In some embodiments, the second processor also updates a status associated with the transaction (e.g., indicating a success, fail, or overflow) on the TR. The status merely refers to the status of transfer between the first and second processor.

In various embodiments, the data may be consumed and/or transferred elsewhere "upstream" via a communication link 356 (e.g., another IPC link, a wireless or wired interface) toward an intended destination, e.g., a peripheral device or an access point. In some variants, the data may be consumed, rendered, or otherwise processed or used by the baseband rather than further transferred upstream to the peripheral device or access point. For example, the transferred data may include text, audio or video data that is played by the user equipment 300. In yet other variants, the data is transferred to another, third independently operable processor (not shown), which may reside in the user equipment 300, or in another user equipment (not shown).

FIGS. 4A-4D depict exemplary implementations of in-place transactions and/or exemplary data structures, for an inter-processor communication (IPC) link.

Figure 4A:
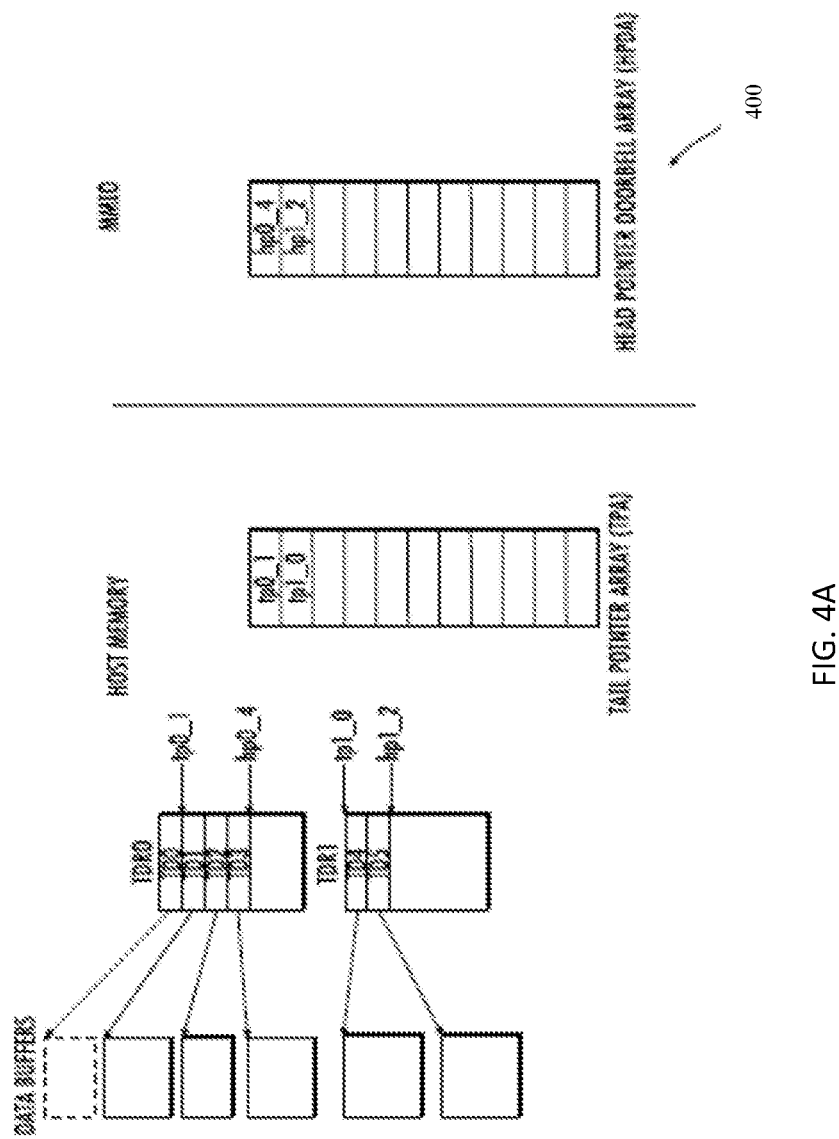
FIG. 4A-4C illustrates exemplary data structure used in inter-processor communication (IPC) link operation, useful for illustrating various principles described herein.

Referring now to FIG. 4A, in exemplary implementation 400, one exemplary data structure includes a first pipe (TDR0) in the uplink direction from a host to a peripheral, and a second pipe (TDR1) in the downlink direction from the peripheral to the host. As shown, the host processor has queued four (4) TDs in TDR0 for uplink transfer and informed the peripheral processor by writing the next-available address (hp0_4) at the TDR0 head pointer offset in the head pointer doorbell array (HPDA) slot 0 (topmost slot). After the peripheral processor has read the data buffers associated for TD0, it updates the tail pointer array (TPA) entry (at the topmost slot 0) by writing a new tail pointer address (tp0_1) corresponding to the TDR0 slot immediately after TD0. When the peripheral processor updates the appropriate TPA entry, the host infers that the data buffer has been read and can free the corresponding data buffer from memory, indicated by the dashed box.

Similarly, as shown, the host has queued two (2) TDs in TDR1 for downlink transfer and informs the peripheral processor by writing hp1_2 at offset slot 1 in the HPDA. Once the peripheral processor fills the data buffers associated with these TDs, it will update the TPA to inform the host by writing tp1_0 in offset slot 1. Thereafter the host infers that the data buffers have been filled and can read the corresponding data buffers. After the host has read the data buffers, it may free their memory allocations.

In some implementations, the TDs may be "aggregated" into a larger scatter-gather TD to support so-called "scatter-gather" behavior for large I/O transfers (e.g., each procedure call sequentially writes data from multiple buffers to a single data stream or reads data from a data stream to multiple buffers; the "scatter-gather" refers to the process of gathering data from, or scattering data into, the given set of buffers.)

Figure 4B:
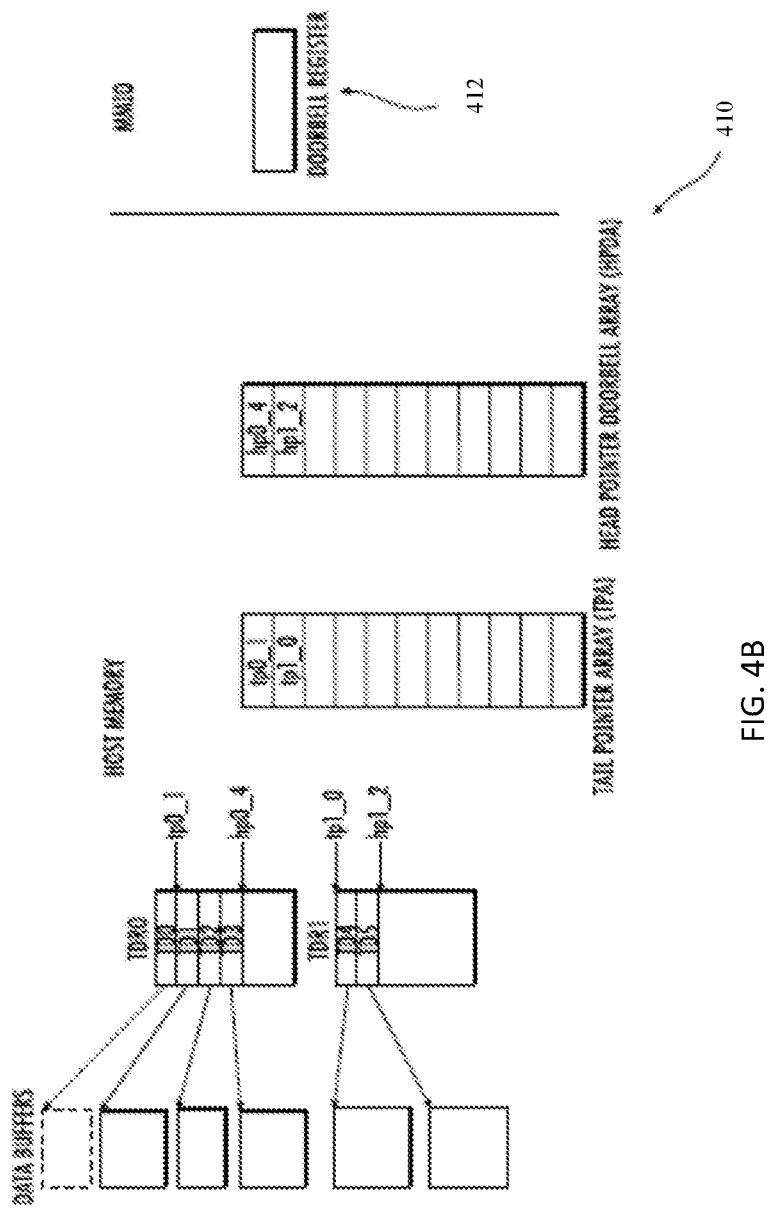

FIG. 4B illustrates an alternate exemplary data structure 410, with a so-called "doorbell register" 412 disposed in the memory-mapped input/output (MMIO) memory space (e.g., peripheral memory map), and the TPA and HDPA arrays disposed in the host processor (e.g., application processor).

Figure 4C:
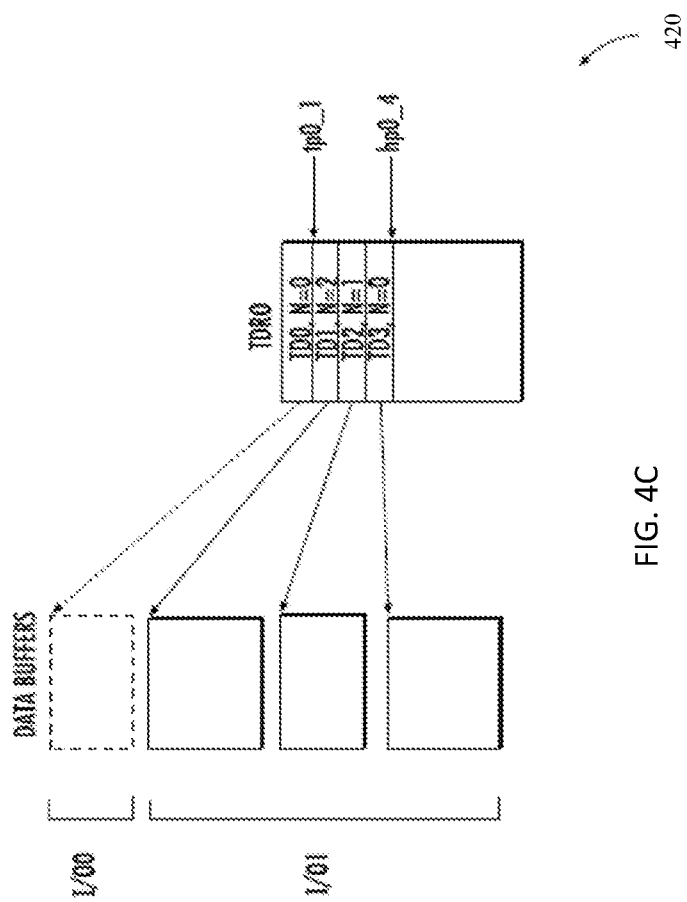

FIG. 4C illustrates one exemplary scatter-gather TD 420 which is described by three (3) TDs according to an exemplary "scatter-gather" scheme. Each TD indicates the remaining count of TDs in the aggregate scatter-gather TD. For example, as shown, I/O1 includes TD1 which continues to TD2 (two (2) TDs remain; N=2), and TD2 continues to TD3 (one (1) TD remains; N=1), which is the last descriptor in the transfer (N=0, no remaining TDs). Each TD contains a pointer to the data buffer in host memory (indicating the address to be accessed by the peripheral to perform the data transfer) and a size field (indicating the size of the data transfer). For uplink TRs, the size field is read-only for the peripheral, whereas for downlink TRs the size field may be read/write for the peripheral. For example, during a downlink transfer, the peripheral reads the size field to determine the maximum size of the buffer available. After the downlink transfer, the peripheral may update the size field with the actual size of data written into the buffer.

In the foregoing "in-place" mechanisms, the host processor infers that the access of data has been completed by reading the updated tail index and/or status generated by the peripheral processor. Notably, the in-place mechanism is a "fire-and-forget" scheme. That is, the host may send the TDs to the shared memory, and the peripheral may process the TDs from the shared memory without further coordination. In-place transfer can provide lightweight, efficient data transfer where the processors do not need to coordinate data transfer.

However, some data applications require coordination between the processors. For example, the host processor may need to guarantee a particular transaction time and/or transaction order. For such scenarios, the in-place scheme does not provide enough information to the host processor. More directly, there is no explicit completion acknowledgment mechanism with the in-place scheme, and thus the host does not receive affirmative knowledge that the TDs were received and processed by the peripheral processor, that the TDs (and hence, the corresponding data) were received in order, received completely, and/or received with no corruptions. In other words, in-place completion assumes a First-In-First-Out (FIFO) memory buffer allocation; i.e., the buffers are freed in the order that they were first allocated. FIFO-based operation is simple and efficient to implement, but is not suitable for all applications.

Out-of-Order Completion Protocol

Explicit completion signaling is used to explicitly acknowledge that data is ready for transfer. Under normal circumstances, data is received in sequence (in-order) and so completion signaling can use default completion group signaling such as is described in commonly owned and/or commonly pending U.S. patent application Ser. No. 16/049,624 entitled "METHODS AND APPARATUS FOR VERIFYING COMPLETION OF GROUPS OF DATA TRANSACTIONS BETWEEN PROCESSORS" and filed Jul. 30, 2018, previously incorporated supra. However, the following discussion describes exemplary embodiments of protocols for acknowledgement of completion of transaction of data received out-of-order (e.g., non-sequentially) over an inter-processor communication (IPC) link between two (or more) independently operable processors. As described in greater detail hereinafter, out-of-order completion enables a processor to correctly receive out-of-order data transmissions without extensive memory for re-ordering.

In one exemplary embodiment, a completion ring of completion descriptors (CR/CDs) can be used to correctly re-order data transmissions which are queued out-of-order. As a result, the host processor may specify whether the peripheral processor can queue completions out-of-order for I/Os e.g., when opening a pipe. In other words, only pipes that allow out-of-order completions may be associated with a specific completion group (non-default completion group).

In the exemplary embodiment, transactions of data are measured in protocol data units, e.g., media access control protocol data units (MPDUs). However, it will be appreciated that the present disclosure may be implemented for the transaction of other types of units of data, e.g., packets, bits, frames, symbols, segments, and the aforementioned datagrams.

In the exemplary embodiment, the acknowledgement of completion includes multiple acknowledgements. More specifically, the following discussion is directed to bus transactions that optimize completion mechanisms so as to indicate completion of multiple data transactions by e.g., utilizing completion descriptors (CDs) for groups of transfer descriptors (TDs), re-ordering MPDUs that were received out-of-order into the correct order, and ensuring the integrity of the transferred and received data. In one variant thereof, the presently described completion mechanism ensures that an error count and/or a bit error rate is below a threshold to ensure integrity of the data transaction.

In one exemplary variant, the completion mechanism can indicate that the transfer of data completes e.g., confirms that all parts of the transmission are received. Additionally, in some implementations, the out-of-order completion can also be used to signal when the transmission is terminated (even when incomplete). In other words, when one or more data transactions are to be skipped, the skipped data transactions will not be retransmitted later.

"Out-of-order" completion offers different capabilities over in-place transfer (discussed above with respect to FIG. 3). Specifically, in-place transfer (e.g., FIG. 3) efficiently performs data transactions by allowing the first processor to independently infer that the information contained in the transmitted TDs has reached its intended destination without requiring explicit overhead for confirmation by the second processor. In contrast, out-of-order completion provides certainty that the data sent by a first processor has been processed to completion via a second processor, as noted above and discussed below. Further, in order to reduce messaging overhead, an exemplary variant further groups completion descriptors together (rather than individually signaling each completion.)

General Architecture

Figure 5:
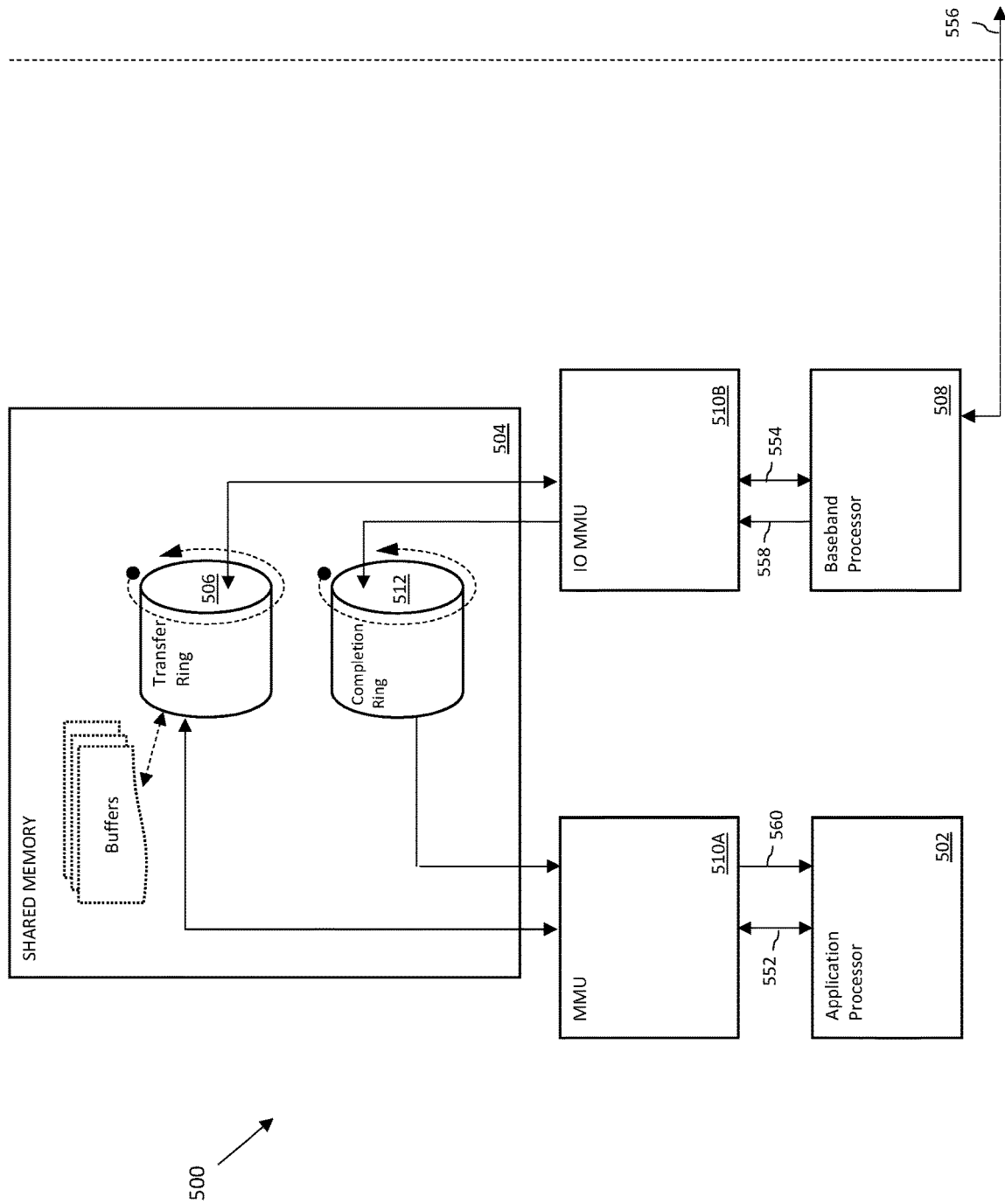
FIG. 5 illustrates an exemplary memory layout, useful for illustrating out-of-order completion operation, in accordance with the principles described herein.

FIG. 5 illustrates an exemplary transmission protocol for transactions of data over an IPC link between two or more independently operable processor apparatus. The first and second processors (502, 508) read data from and/or write data into buffers described by TDs of a transfer ring (TR) 506 via communication links 552 and 554 (via MMU 510A and IO MMU 510B). In one exemplary embodiment, communication links 558 and 560 enable the first and second processors (502, 508) to transact completion signaling via a completion ring (CR) 512.

In one exemplary embodiment, the first and second processors (502, 508) transact transfer descriptors (TDs) and completion descriptors (CDs) in a shared memory. More specifically, in one exemplary embodiment, a first processor (e.g., application processor 502) is in data communication with at least a second processor (e.g., baseband processor 508) via a shared memory module 504 through the IPC link. A transfer descriptor rings (TR) 506 and a completion descriptor ring (CR) 512 may be utilized to re-order buffers that are not sequentially referenced by TDs. More directly, sequence information can be indicated with CDs.

Downstream data may be stored in or written into backing memory buffers that are represented by one or more TDs, or in some cases the TDs themselves. First, the TDs are allocated from the shared memory 504 by the host via communication link 552 (e.g., an IPC link and corresponding MMU 510A). Specifically, the data allocation may be sized according to a payload or information that is to be delivered by the peripheral (received from the network). The TDs are arranged within a transfer descriptor ring (TR) data structure 506 that resides in the shared memory 504. In one implementation, the first processor 502 may write to a head index that resides in the TR 506, indicating that the TDs have been allocated.

At a later point in time, the second independently operable processor 508 (e.g., a peripheral processor or baseband processor) reads the TDs on the TR 506 via communication link 554 (e.g., via IO MMU 510B), and writes data into the backing buffers associated therewith. For example, the second processor 508 reads the TDs and/or de-references the TDs to the corresponding memory buffers that are pointed to by the TDs. The second processor 508 writes downstream data into the TD allocations. Thereafter, the second processor 508 uses explicit completion descriptors (CD) in a completion descriptor ring (CR) 512 to indicate completion status. More directly, in the embodiments described herein, the memory or buffer that is pointed to by the CD/CR explicitly identifies the TDs/TR that have downstream data for the first processor 502.

While the foregoing discussion describes a downstream transaction, the various techniques described herein may be used with equal success in the reverse direction as well ("upstream"). For example, upstream data may be stored in or written into backing memory buffers that are represented by one or more TDs by the first processor 502, thereafter the first processor 502 may write to a head index that resides in the TR 506, indicating that the TDs have been written to. At a later point in time, the second independently operable processor 508 (e.g., a peripheral processor or baseband processor) reads the TDs from the TR 506 via communication link 554 (e.g., via IO MMU 510B), and reads data from the backing buffers associated therewith. In other words, the second processor 508 may consume out-of-order data as well.

As previously indicated, completion signaling (CD/CR) is an explicit indication to the first processor 502 that the second processor 508 has finished processing the corresponding data allocation (TDs/TR). Responsive to receiving the completion signaling for downstream data, the first processor 502 may read the TDs from the TR 506 corresponding to the CDs of the CR 512 to retrieve the downstream data. Similarly, responsive to receiving the completion signaling for upstream data, the first processor 502 can free the buffers associated with TDs from the TR 506 corresponding to the CDs of the CR 512.

Various embodiments of the present disclosure further aggregate multiple transfer completions into a single CD. In other words, the peripheral processor may decide not to generate a completion for a buffer even upon successful transfer completion. For example, when the peripheral processor reads and processes TD0, the peripheral processor may elect not to immediately generate CD0 indicating completion. Instead, the peripheral processor may aggregate the completion acknowledgement with other TDs. In this "optimized" manner a single CD can correspond to many TDs. In one such variant, a single CD can complete all of the sequentially ordered TDs which have not yet been completed (e.g., CD[1000] may complete TD[1000] and any TDs that have not yet been completed sequentially).

Various embodiments of the present disclosure process the TR and CR sequentially. In other words, the first processor queues one or more TDs within the TR in a specific order. The second processor retrieves and completes the queued TDs in the same order. In other words, the second processor completion mechanism ensures that the second processor has completed the transactions of TDs in the same order that the first processor placed them in the TR. In a situation where data is received out-of-order, however, the completion mechanism may also be configured to modify the order of completion, as will be described elsewhere herein.

While the present discussion is presented within the context of a successful completion for illustrative clarity, completions may not always be successful. Common examples of other types of completion information include, without limitation: invalid, partial transfer (PT), end transfer (ET), overflow, block overflow, abort, and/or error.

Variants which utilize aggregated completions may be "distributive" in nature; for example, a CD that completes multiple TDs may distribute the status to all of the TDs (e.g., a success status indicates that all TDs succeeded, a fail status indicates that all TDs failed). Another variant may treat aggregated completions as "conditional" in nature; for example, a CD that completes multiple TDs with an overflow or a partial transfer status may indicate that the associated TDs are completed (and can be immediately freed) but the status of the transfer may be conditional on e.g., a subsequent CD. In some cases, the subsequent CD can be sent later, i.e., non-sequentially, allowing for intervening transfers to be sequentially completed. More directly, it is appreciated that completion status and reclamation of completed buffers can be decoupled and handled independently.

Still other types of completions may correspond non-sequentially to TDs within the TR. For example, consider a set of TDs that are grouped together sequentially but where a CD includes an "abort status" mid-set. Every TD that corresponds to the remaining TDs of the set can be immediately reclaimed (even though not all TDs have been sequentially processed). In another such example, an "error status" CD returned mid-set may allow the host processor to either immediately reclaim (treated as an abort), or attempt to queue more TDs for a retry attempt.

Figure 6:
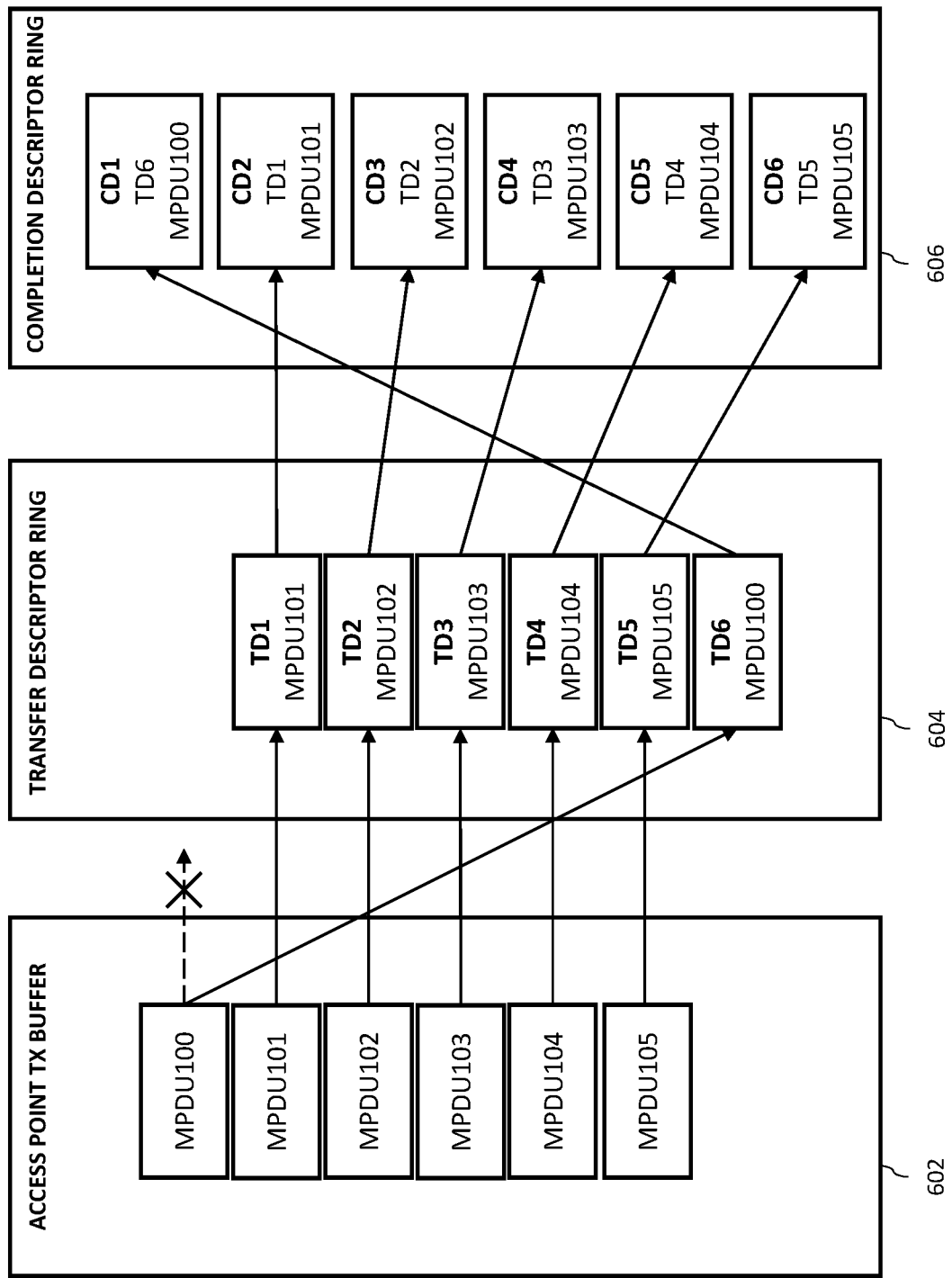
FIG. 6 illustrates an exemplary block diagram for rearrangement of data transmissions received out-of-order, in accordance with the principles described herein.

FIG. 6 illustrates an exemplary block diagram for rearrangement of data transmissions received out-of-order, in accordance with the principles described herein. As previously noted, most transmission protocols assume that data is relayed by an intermediate node in the same order that it was received. The IPC bus technology introduces the possibility that very large amounts of data may be received out-of-order.

As shown therein, an external access point transmits downstream data from a transmit buffer 602 to a second processor (such as the baseband processor 508 of FIG. 5). The second processor writes the received downstream data into backing buffers that correspond to transfer descriptors (TDs) of a transfer ring (TR) 604. The order of completion is written into a completion ring (CR) 606. In the illustrated example of FIG. 6, the transmission of at least one MPDU (MPDU100) fails. Hence, the MPDUs are received by the second processor out-of-order over the wireless air interface, and stored into buffers according to the transfer descriptor (TD) allocation of the transfer ring (TR) 604. As shown in FIG. 6, five (5) MPDUs MPDU101 through MPDU105 have been written into the backing buffers corresponding to TDs of TR 604 by the second processor, followed by MPDU100 corresponding to the retransmission of failed MDPDU100.

The second processor then writes CDs to the CR 606 to indicate the correct order of the six MPDUs. For example, each TD or CD may correspond to one MPDU, such that a given TD may include an identifier for backing buffer that contains the corresponding MPDU, and such that a given CD may include the corresponding MPDU identifier and/or the corresponding TD, as described with respect to FIG. 6. As shown in FIG. 6: CD1 completes TD 6, which points to the buffer for MPDU100; CD2 completes TD 1, which points to the buffer for MPDU101; CD3 completes TD2, which points to the buffer for MPDU102, etc. In other words, the TD MPDU100 is now the sixth TD (TD6) when it would have been the first TD if it had been transmitted properly.

The peripheral may detect the intended, correct order by reading metadata associated with each MPDU, such as a sequence number or fragment number included with the MPDU. For instance, an order associated with a group of MPDUs transmitted by the access point may be determined based on reading corresponding MPDU sequence numbers in numerical order (e.g., 0, 1, 2 . . . ), MPDU identifiers in numerical order (e.g., MPDU100, MPDU101, MPDU102 . . . ), or another sequence (e.g., sequence number 000 fragment 0, sequence number 000 fragment 1, sequence number 000 fragment 2, sequence number 000 fragment 3, sequence number 001 fragment 0, sequence number 001 fragment 1 . . . ). Ordering may be based on various other systems, such as alphabetical, hexadecimal, binary, or a combination thereof. Hence, if a particular MPDU is missing from the expected sequence (e.g., received before or after the expected position), the peripheral processor may determine that the MPDU should be rearranged in the correct place and/or in the intended sequence as dictated by the determined order.

Referring again to FIG. 6, the CR 606 shows six CDs (CD1 through CD6) that are entered into the CR 606 in the intended order of MPDU100 through MPDU106. Two varieties are described in greater detail hereinafter: cached out-of-order completion, and non-cached out-of-order completion.

Cached Out-of-Order Completion—Processor Caches TDs

In one exemplary embodiment of cached out-of-order completion, the peripheral may cache TDs as they are allocated from the host; thereafter the peripheral can use its cached TDs (e.g., reading or writing into buffers described by the TDs) without referring again to the TR in host memory. During operation, data may be transmitted or received out-of-order; consequently the peripheral may additionally determine an ordering to the buffers, and provide this order via completion information. Subsequently thereafter, the host can re-order the buffers based on the order determined from the CDs. Since the peripheral uses locally cached TDs, the TDs can be removed from the TR. However, both host and peripheral must locally track the buffers associated with the delivered TDs (without the benefit of the TDs in the TR) until the CDs can provide the determined order. More directly, even though the TDs can be immediately removed from the TR, the buffers identified by the TDs cannot be cleared until the CDs are transferred and identify the buffer ordering.

This technique enables the peripheral to quickly deliver data and clear the TR, but requires the peripheral to cache the TDs and is referred to herein as "cached out-of-order completion." In some implementations, cached out-of-order completion can reduce TR size, potentially reducing host memory overhead. More directly, cached out-of-order completion enables systems that are TR constrained to allocate and cache TDs rather than keeping them in the TR; however, it can cause memory leaks if a cached TD is never completed (i.e., if a CD is never generated for a cached TD). Cached out-of-order completion can support multiple streams even with a commodity component by clearing the TR as soon as possible (so that other streams can use it). For example, an Airplay Wi-Fi stream to a TV can be quickly transacted (and cleared) concurrently with e.g., Safari Wi-Fi links to an access point (AP)).

Figure 7:
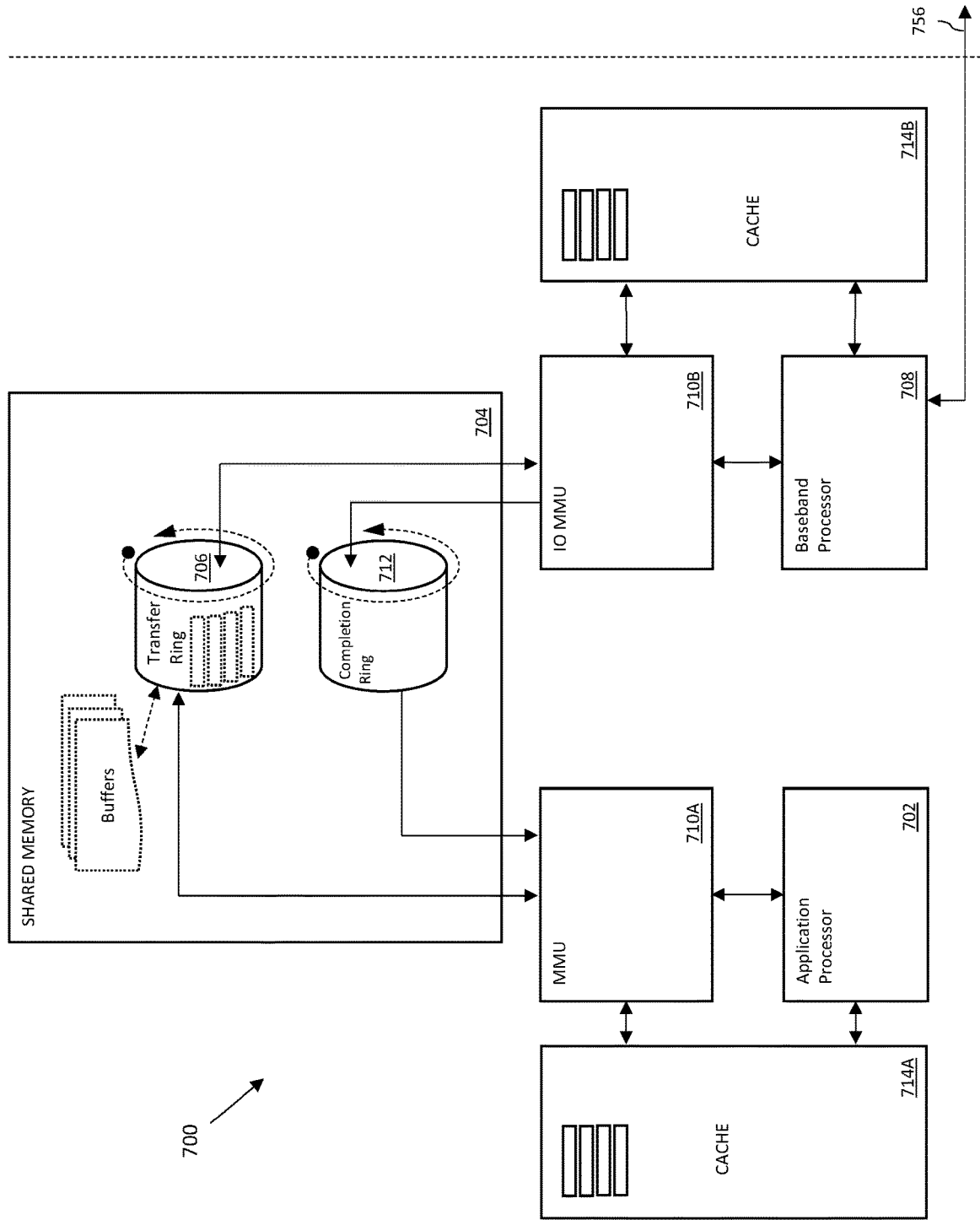
FIG. 7 illustrates an exemplary memory layout that enables data to be rearranged and locally cached at a processor, in accordance with the principles described herein.

FIG. 7 shows an exemplary configuration for a transmission protocol that enables out-of-order data transactions to be corrected by caching transfer descriptors (TDs) at a processor-side cache. As previously noted, this variant may be particularly useful in systems that are constrained by the size of the transfer descriptor ring (TR) 706 and/or require high performance. As shown in FIG. 7, cached operation may require one or more relatively large processor caches (e.g., 714A, 714B). For example, TDs in TR 706 can be cached into peripheral cache 714B, and removed from the TR 706.

Caching the TDs may provide significant benefits. First, cached TDs may be immediately cleared from the TR to make room for more TD allocations. For example, moving 1000 TDs to cache 714B, allows the TR to hold 1000 more TDs (e.g., 2000 TDs are in circulation). Caching TDs to expand TD allocations can be repeated many times, subject to the size of the caches (e.g., cache 714B). Secondly, locally cached TDs can improve performance by virtue of processor cache optimizations. For example, a processor 708 may be able to use its tightly coupled cache 714B to perform direct memory access (DMA) type operations with locally cached TDs (such capability may not be supported for TDs on the host DRAM). It should be noted that the foregoing benefits are distinct from one another; e.g., local cache optimizations and benefits may be present even when the TDs are not removed from the TRs, and vice versa.

The system of FIG. 7 includes a first processor (e.g., host processor) and a second processor (e.g., baseband processor), the first processor having a local cache memory apparatus 714A associated therewith. In some embodiments, the local cache memory apparatus 714A associated with the first processor 702 may be shared with the second processor 708 as well. In such a configuration where the TR size is constrained, the host may utilize the cache memory 714A rather than the TR 706 to immediately store and clear TDs as they are processed by the peripheral. More directly, this configuration enables the TR 706 to be flushed as soon as TDs are written to it so as to continuously accommodate new TDs. Usage of a local cache memory 714A may advantageously free up the limited space in the TR and/or provide host side cache optimizations as well.

In the exemplary embodiment, the second processor may receive data from an outside device such as an access point or another peer device via a wireless air interface. The data may be received out-of-order by the peripheral. The peripheral immediately writes the out-of-order data into buffers identified by the TDs of the TR 706. However, the host processor will not process the buffers until CDs are provided with appropriate completion order (i.e., the data may be stored into buffers out-of-order). The TDs may then be freed and used by the peripheral for subsequent data transfers. Both the host and the peripherals continue to track buffers by TD tag identifiers (even though the TD has since been freed and reclaimed). Since both the host and the peripheral are tightly coordinated to service TDs as quickly as possible, very small memory allocations can be used to transfer large amounts of data. Once the peripheral processor has received all packets, it can send the TD tag information. The hose can re-order the packets with the TD tag information provided via the CDs.

To support processing of multiple data structures (e.g., TDs, CDs, even MPDUs) with relatively low memory overhead, a configuration with a shared cache for the peripheral processor may be used. Such a configuration may be present in devices having certain wireless baseband modems, such as a Wi-Fi chip, which typically have a smaller cache that relies on a more capable application processor. However, other types of chipsets may be used in conjunction with larger cache sizes, including chips that may be used for buffering or storing other types of data. Moreover, different physical implementations may require use of different combinations of (i) baseband chip cache size, (ii) TR size and/or (iii) external memory size (e.g., backing buffers, DRAM) in order to achieve efficient wireless data operation, regardless of constraints and parameters and capabilities associated with the device. For example, the physical chassis size, data rate, functionalities present on one or more processors, functionalities selectively enabled on one or more processors (such as via the booting mechanisms for independently operable processors as described in U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" filed Oct. 8, 2015, incorporated here by reference in its entirety) may be optimized as desired by balancing the sizes of the cache, TR, and other memory.

FIGS. 8A-8F illustrate an exemplary sequence of memory layouts during an exemplary cached out-of-order completion operation according to the present disclosure, having a TR (TR_Z) and a CR (CR_C) represented as queues in unidirectional pipes. While the following example of FIGS. 8A-8F is presented in the context of a single completion for clarity, the various steps illustrated therein may apply to completions via multiple pipes, multiple TRs and/or CRs, and/or more than two independently operable processors.

Figure 8A:
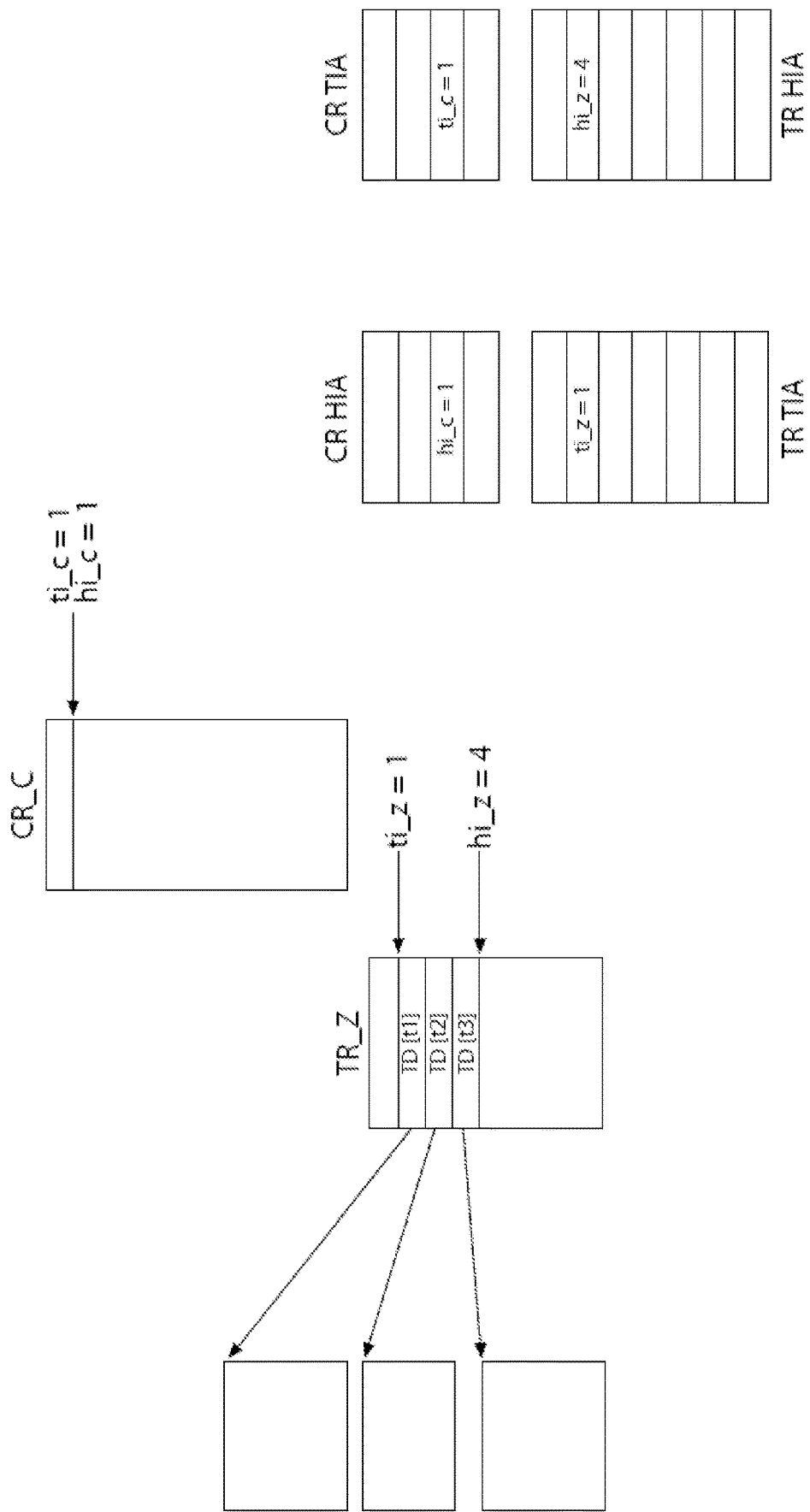
FIGS. 8A-8F illustrate various stages of an exemplary memory access within the context of the processor-cached system of FIG. 7, in accordance with the principles described herein.

FIG. 8A shows an exemplary embodiment of a steady state (initial state) of a transfer descriptor ring (TR) TR_Z for a data pipe Z and a completion descriptor ring (CR) CR_C. Also shown are corresponding index arrays: TR_Z is associated with a transfer ring head index array (TR HIA) and a transfer ring tail index array (TR TIA). CR_C is associated with a completion ring tail index array (CR TIA), and a completion ring head index array (CR HIA).

In one embodiment, the described memory structures reside within a shared memory apparatus; however, artisans of ordinary skill in the related arts given the contents of the present disclosure will recognize that the aspects are not so limited. The various data structures (e.g., index arrays and/or memory buffers) may be located on the host-side and/or peripheral-side memory. In other variants, some or all of the data structures may be located in any other memory accessible by both the host and peripheral processors (e.g., DRAM, processor cache).

The TR TR_Z of FIG. 8A contains three (3) transfer descriptors (TD), with data buffers that are identified by the tags $t_1$, $t_2$ and $t_3$. As shown, the host has written the corresponding indices to identify a TD for processing. The TR HIA entry "hi_z" is set to 4. This value indicates the start of the next TD, and the TR TIA indicates the first TD of the current TR to process. The TR TIA entry "ti_z" is written by the peripheral and is set to 1 to indicate that the first TD to process is at position 1 (the second slot location as shown).

The CR CR_C of FIG. 8A contains zero (0) completion descriptors (CD) at steady state. Specifically, the completion ring tail index array (CR TIA) "ti_c" is set to 1 by the host processor to indicate that the next CD to process is at slot location 1 of the CR. The value in the completion ring head index array (CR HIA) "hi_c" is set to 1 by the peripheral processor to indicate the next available CD slot location. Since ti_c and hi_c are set to the same value, it indicates that the peripheral has no outstanding completions for the host.

Figure 8B:
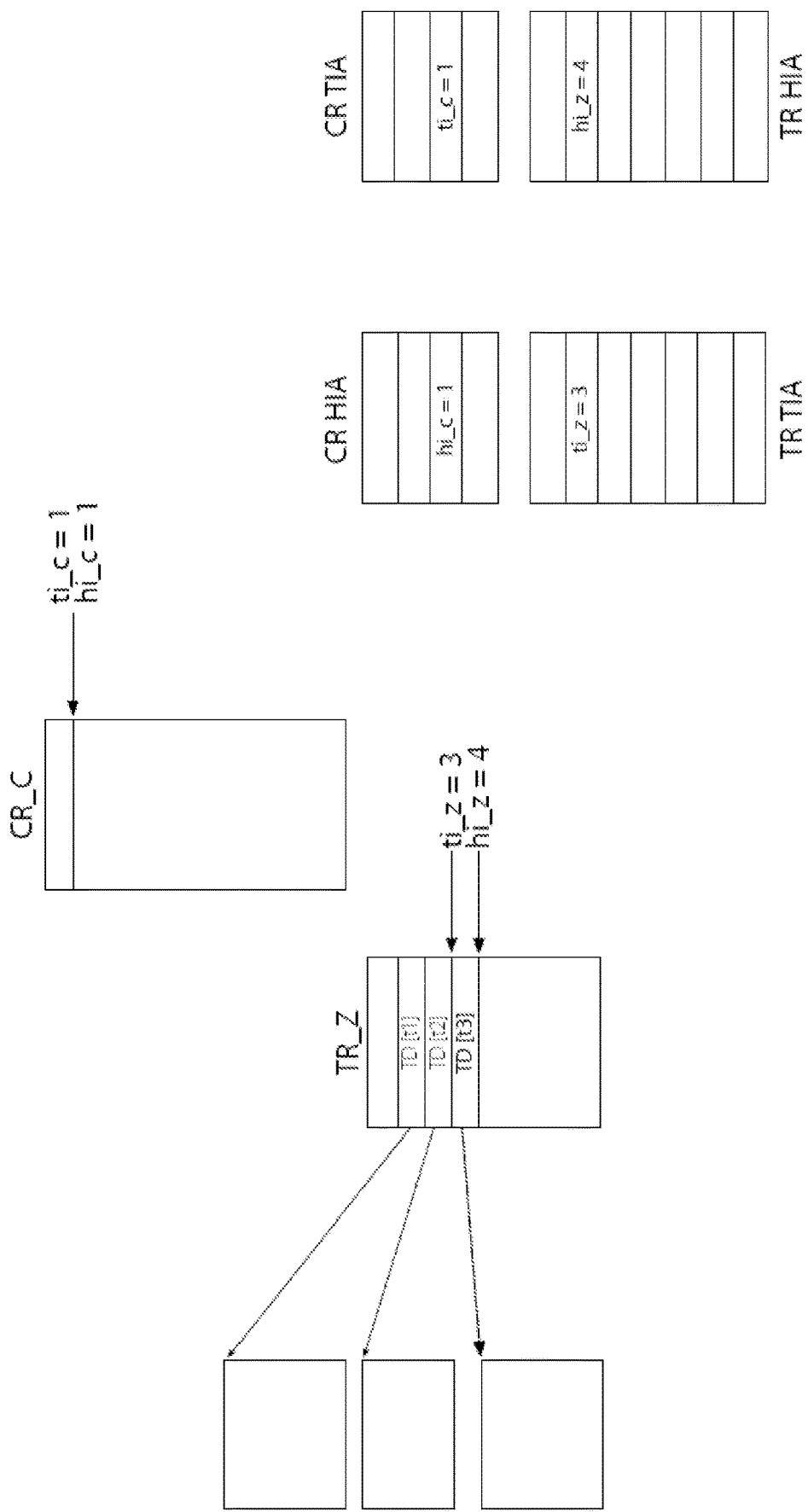

FIG. 8B shows an exemplary embodiment of a memory layout in which the peripheral processor (e.g., baseband processor 708 of FIG. 7) has cached some of the TDs (no data has yet been read/written to the memory buffers identified by the TDs). Specifically, the first two TDs describing data buffers $t_1$ and $t_2$ have been cached into the peripheral's local cache. In some variants, the cached TDs can be used by the peripheral to start e.g., DMA transfers (and free its own memory). To inform the host processor that the TDs and associated buffers have been cached, the peripheral processor updates the TR TIA value "ti_z" to 3 to indicate that the upcoming TD to process is at slot position 3 (fourth slot) of the TR. It should be noted that writing the TR TIA value for such implementations does not imply completion; more directly, completion must be explicitly signaled via CDs/CR. The peripheral processor may additionally generate a signal for the host, e.g., a message signaled interrupt (MSI), to inform the host and/or the update to the TR TIA value.

In some embodiments, rather than wait for an MSI, the host processor may check the TR TIA and/or other head or tail indices according to its own scheduling that may be tuned to improve performance, reduce processor churn, improve power consumption, or any number of other potential scheduling optimizations. In one variant, such scheduling may be based on predetermined intervals. In another variant, the scheduling may be dependent on system conditions, such as processor load, memory usage, or network usage. In another variant, the host processor may autonomously check the TR TIA after some amount of time has passed without an MSI. In different implementations, the amount of time may be predetermined and/or dynamically set based on system conditions.

As a brief aside, a message signaled interrupt (MSI) is a mechanism for a processor (e.g., a peripheral processor) to send an interrupt or signal to another processor (e.g., a host processor). In some variants, the MSI may be considered a "doorbell." As used herein, a "doorbell" signal refers to any signal, message, register, or interrupt that is used by one device (e.g., peripheral processor) to indicate to another device (e.g., host processor) that there is some work to be done (data processing, control flow, etc.). The reverse may also be applicable, where the host indicates work for the peripheral. For example, in one implementation, one processor (e.g., the peripheral processor) places data in one or more shared memory location(s), and "rings the doorbell" by writing to a designated memory location (the "doorbell region"). In another implementation, the data may be placed in the doorbell message itself. Responsively, the other processor (e.g., the host processor) can process the data. The designated memory location may include a shared memory structure, peripheral- or host-side buffer or cache, an external memory (e.g., DRAM), or some other mutually accessible data structure or location.

Figure 8C:
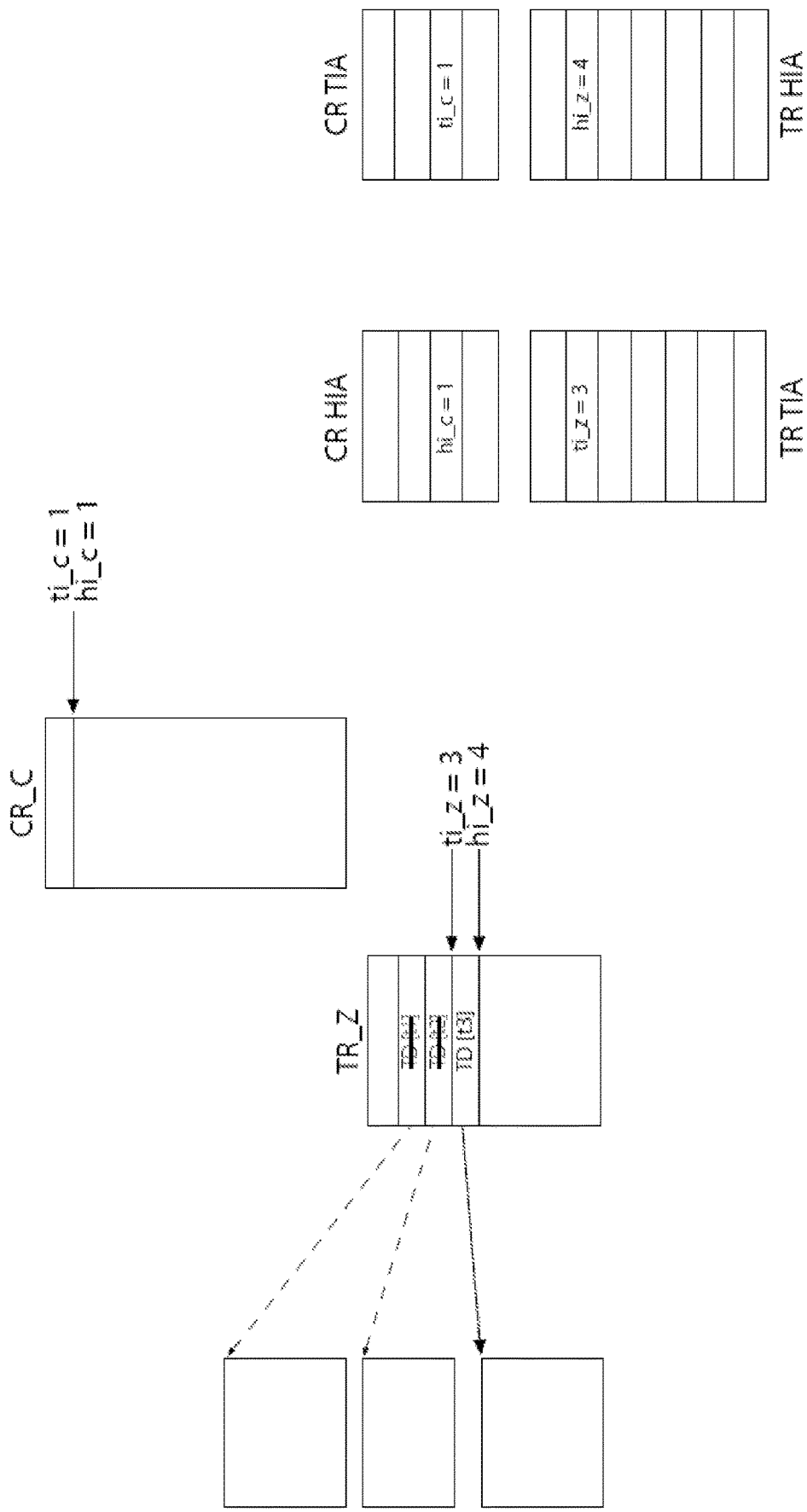

FIG. 8C shows an exemplary embodiment of the host processor processing the TR tail index as updated previously. Upon receiving the signal (e.g., MSI) from the peripheral processor indicating that the TDs have been processed, the host processor sees the updated TR TIA value "ti_z" now set to 3. Responsively, the host processor determines that multiple TDs have been cached at the peripheral and that the TDs of the TR may be freed. Specifically, the host processor may then remove the corresponding TDs from the TR (TR_Z), as shown by the strikeout of TD [$t_1$] and TD [$t_2$]. As noted above, since the peripheral processor has cached the TDs, they may be removed from the TR, and the TR may reuse the freed space. Nonetheless, for the TDs that are removed from the TR, the corresponding buffers (i.e., the data buffers identified by tags $t_1$ and $t_2$) still remain to be explicitly completed by the peripheral processor. That is, the peripheral processor must still provide CDs to indicate the receipt and/or transmission of the data buffers (which may be out-of-order in this scenario).

Figure 8D:
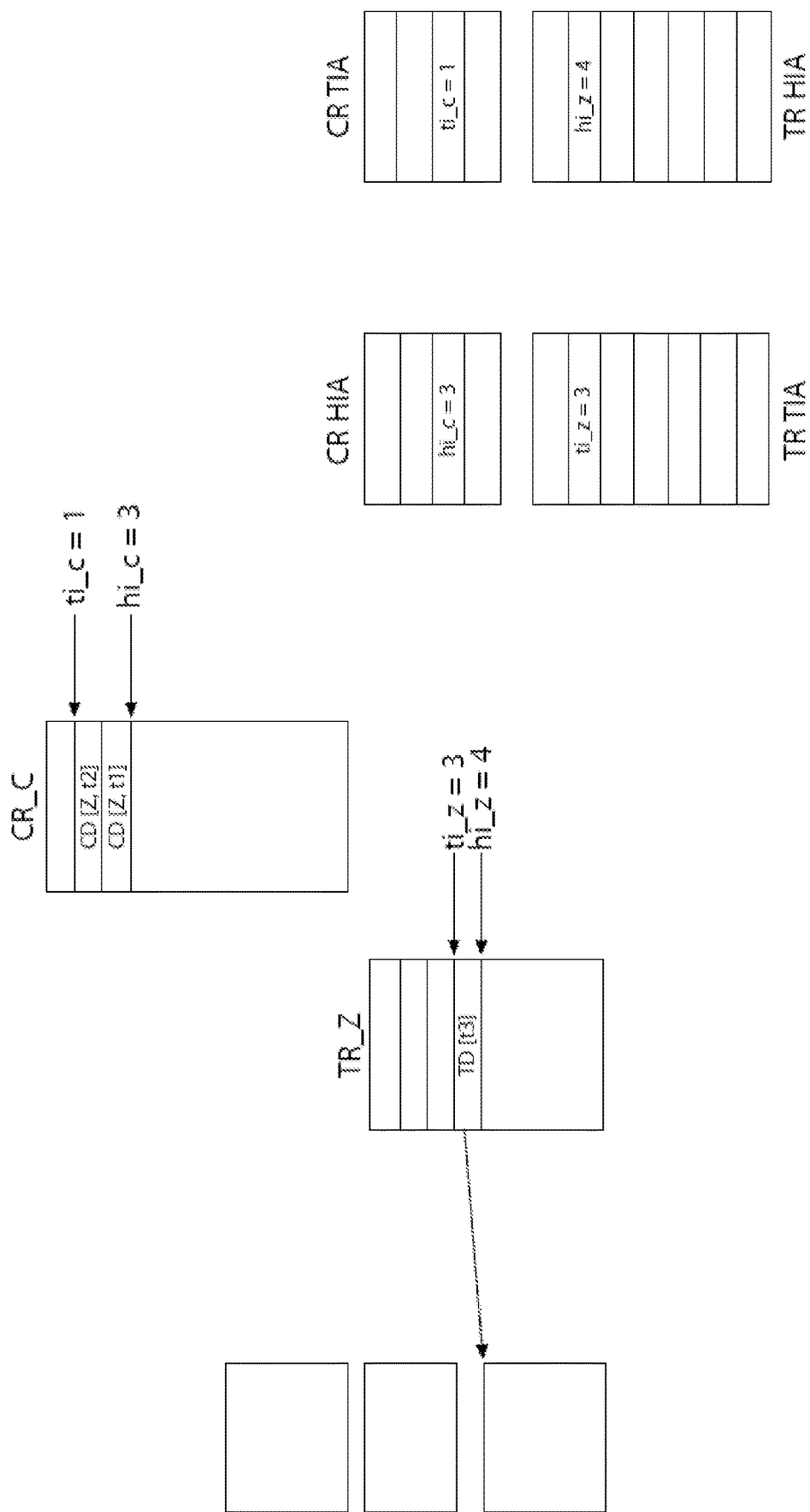

FIG. 8D shows an exemplary embodiment of the peripheral processor completing the data buffers $t_2$ and $t_1$ out-of-order. The peripheral processor creates two CDs corresponding to the two TDs which were previously cached. Each CD may include data associated with the cached TDs; for example, each CD created may contain an identifier of the TR and an identifier of the data buffer. The first CD created may include a TR identifier of "Z" (for TR_Z) and a tag of "$t_2$". The second CD created may include a TR identifier of "Z" and a tag of "$t_1$". These CDs are identified as "CD [Z, $t_2$]" and "CD [Z, $t_1$]" in FIG. 8D. Note that these data buffers (tagged as $t_1$ and $t_2$) were received out-of-order, where $t_2$ should have been received before $t_1$. Although the peripheral processor may have received the data out-of-order, the peripheral processor can indicate the proper order with CD data.

To inform the host processor about these CDs, the peripheral processor updates the CR HIA value of "hi_c" to 3 to indicate that new CDs are available. In addition, the peripheral processor may generate a signal e.g., a MSI, for the host processor to inform the host processor. The host processor retrieves the outstanding CDs to process from the CR.

In some variants, each CD may further include information about the completion of the data buffers. For example, a CD may include processing status (e.g., invalid, partial transfer (PT), end transfer (ET), overflow, block overflow, abort, error, and/or any other relevant parameters) as described in U.S. patent application Ser. No. 16/049,624 entitled "METHODS AND APPARATUS FOR VERIFYING COMPLETION OF GROUPS OF DATA TRANSACTIONS BETWEEN PROCESSORS" and filed Jul. 30, 2018, incorporated supra.

Figure 8E:
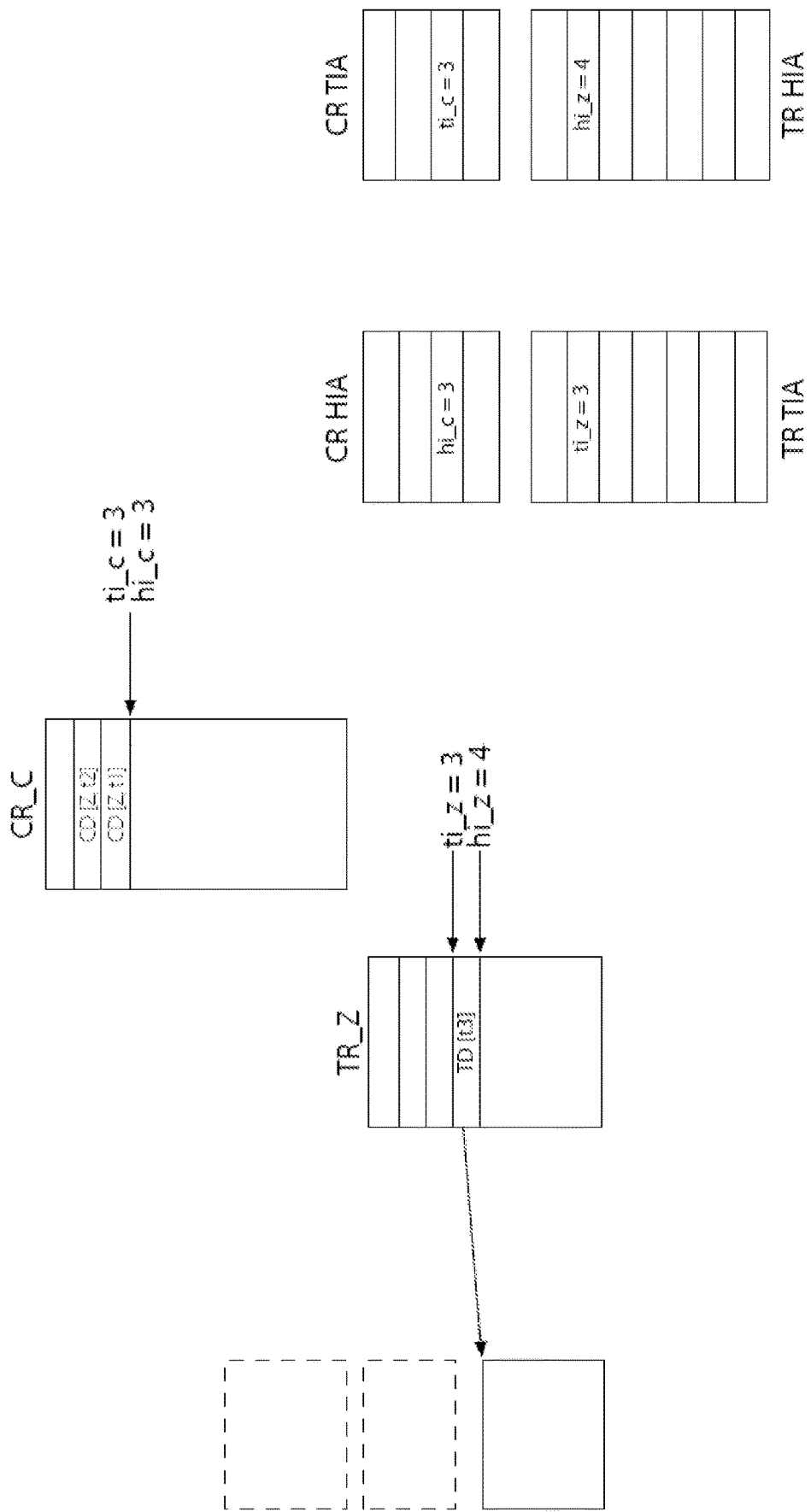

FIG. 8E shows an exemplary embodiment of the host processor processing the CDs in the CR. Upon receiving the signal (e.g., MSI) from the peripheral processor, the host processor processes the CDs from the CR. Processing of the CD by the host processor may include reading and/or removing the CD. In this scenario, the first CD points to buffer $t_2$, and the next CD points to buffer $t_1$. The host may then locally re-order its cached buffers. Processing the buffers may include retrieval and/or consumption of the data buffers in that order ($t_2$ then $t_1$).

Thereafter, the host processor updates the CR TIA value of "ti_c" to 3 to indicate that the CDs have been processed. This causes ti_c and hi_c to be equal again, which indicates that there are no outstanding CDs to process. In one variant, the host processor may further transmit a signal to inform the peripheral processor that the CDs are completed and that new CDs may be created at the next available location. In another variant, the host processor may write to a doorbell register to inform the peripheral processor.

Figure 8F:
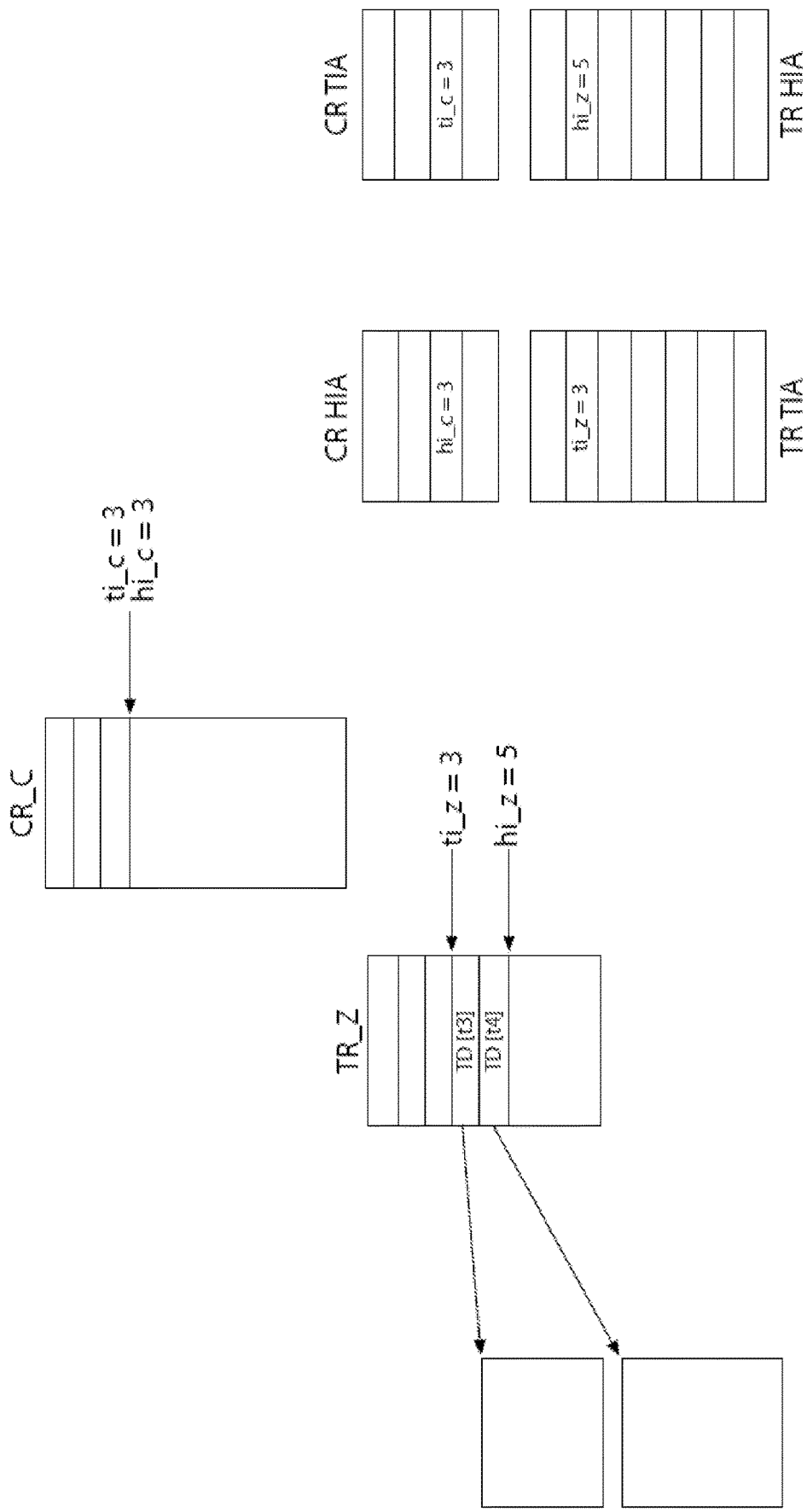

Lastly, FIG. 8F shows an exemplary embodiment of the host processor queuing a new TD ($t_4$). Upon receiving a new I/O or data buffer to be transferred (e.g., via a wireless interface of the device), the process is repeated. For example, the host processor checks to see whether space is available in the TR. If so, the host processor generates a TD that is placed in the next available slot (fifth slot in TR_Z as pointed to by the previous hi_z value of 4). The host processor updates the value of hi_z to 5 to indicate the next available slot for TDs and informs the peripheral processor, etc.

In the foregoing discussions of FIGS. 8A-8F, the peripheral processor and the host processor may write to some or all of the index arrays as well as read the values contained therein in order to indicate to each other which TDs or CDs to process and where to write subsequent TDs or CDs. Accounting for the values in the index arrays ensures the host processor that the data is completed in order (even if they were not received in the intended order), rather than relying on a "fire and forget" mechanism that does not provide completion acknowledgments from the peripheral processor (as in the aforementioned "in-place" protocol). For example, CDs in this exemplary out-of-order completion mechanism may contain information about which specific TDs and/or data were completed by the peripheral processor, and which order they were completed. Hence, accounting for the index values helps ensure that the host processor reads the correct CDs in the intended order.

Moreover, as noted above, cached out-of-order operation is advantageous for device configurations in which the processor cache is relatively larger than the shared memory. Some manufacturers may produce large "omnibus" chips that advantageously include numerous functionalities (which may be selectable by an application processor during boot or operation) and may thus have powerful processors and large caches associated therewith. Still other variants may cache data buffers on the peripheral-side cache rather than the host-side cache. In other embodiments, the data buffers may be cached at an external memory module (e.g., DRAM), the shared memory apparatus (where the CR and TR are located), or other types of dedicated memory to carry data. Using other caches in these ways may be advantageous in device configurations in which the host-side cache is momentarily or persistently overloaded and/or cost-sensitive modules.

Non-Cached Out-of-Order Completion—Processor does not Cache TDs

In one exemplary embodiment of "non-cached out-of-order completion", the host may retrieve data from the backing buffers that are identified by TDs of a TR, according to an order indicated with CDs. Non-cached operation can be useful where a peripheral does not have sufficient memory to cache the TDs in its local memory and instead uses the TR to cache TDs.

Figure 9:
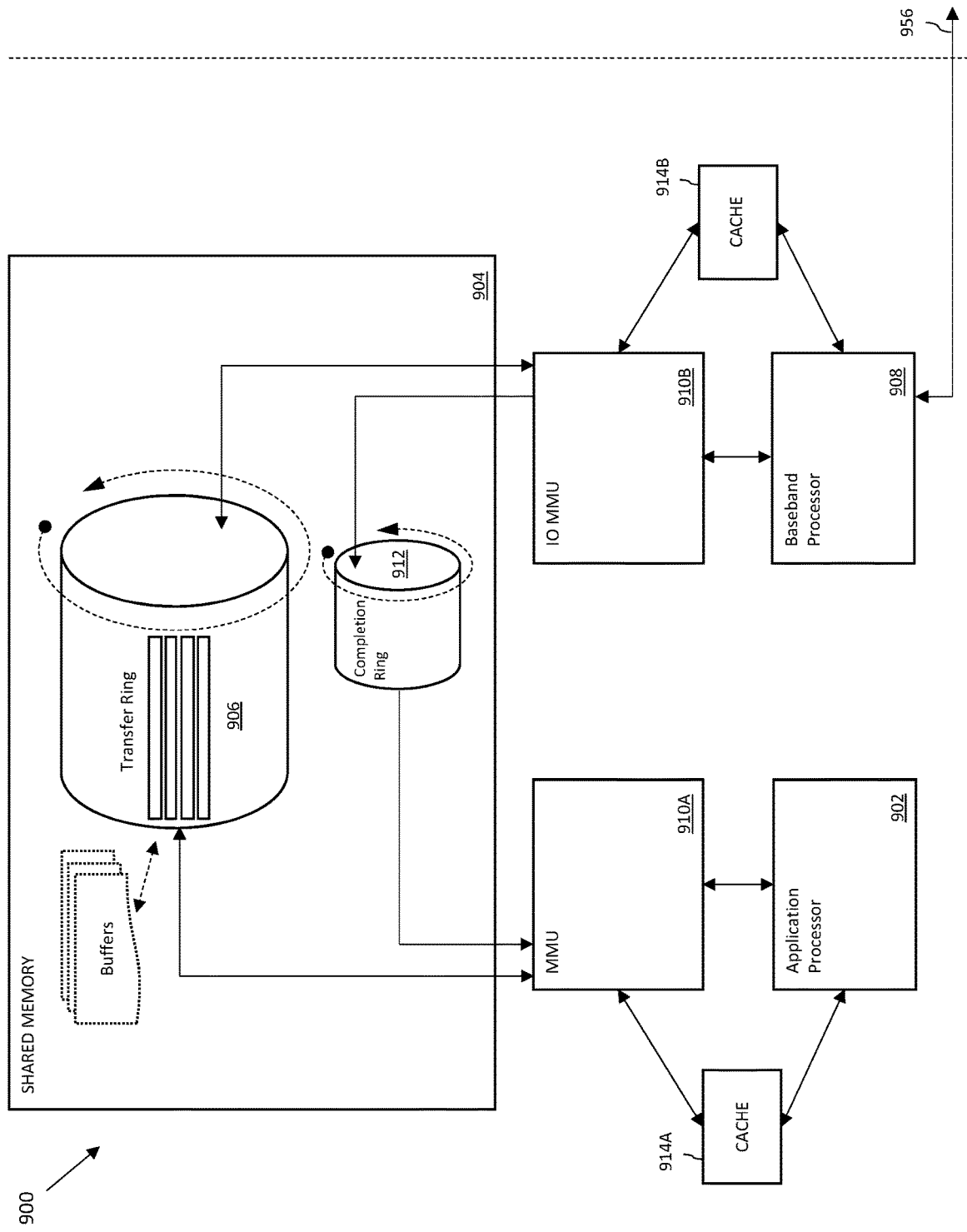
FIG. 9 illustrates an exemplary memory layout that enables data received out-of-order to be retrieved by a processor in a rearranged order (non-cached), in accordance with the principles described herein.

FIG. 9 shows an exemplary configuration for a transmission protocol that corrects out-of-order data transactions within the shared TR. This system uses explicit handshaking with the TR; where the CDs identify the order for TDs of the TR. Even though TR based re-ordering could result in a bottleneck when every TDs of a TR is used (no more data can be transmitted until a TD is freed), the host and peripheral explicitly handshake with the same TD/TR to prevent memory leaks.

As before, the system 900 (e.g., user device) includes a first processor (e.g., host processor) and a second processor (e.g., baseband processor), each having a local cache memory apparatus (914A, 914B) associated therewith. Unlike FIG. 7, the local cache memories (914A, 914B) associated with the processors (902, 908) are minimally used for non-cached operation and can be smaller sized and/or allocated for other tasks. Instead, the shared memory 904 holds the transfer descriptors, transfer descriptor ring (TR) 906, and associated backing buffers. More directly, in this configuration, the TR 906 should be sized sufficiently large enough to accommodate the maximum throughput for the IPC link. Usage of a large TR may advantageously free up the limited space in the processor-side local caches 914A, 914B (processor caches are more expensive to manufacture per unit memory than e.g., host DRAM).

In one exemplary embodiment, the second processor may transmit data to an outside device such as an access point or another peer device via a wireless air interface. The data may be acknowledged out-of-order by the outside device. The TR 906 holds the out-of-order data until the data is completed. When the peripheral determines the correct sequential order, the peripheral provides the completion order in CDs of the CR 912. Consider the following scenario: the peripheral reads three (3) TDs, and transmits the three (3) corresponding buffers of data. However, the peripheral only receives a successful acknowledgment for the second buffer. Responsively, the TD corresponding to the second buffer is completed via CD (t2) and the peripheral attempts to re-transmit the missing buffers (the first and third TDs). If the first buffer is completed, the TD corresponding to the first buffer can be completed via CD (t1) and the TR TIA can be updated accordingly.

Responsive to receiving the CDs/CR 912 the host processor can free the TDs of the TR 906 and can thereafter free the TDs/TR for subsequent data transfers.

Particularly, many Wi-Fi chipsets on the market may be developed to include a relatively small local cache memory, for cost-effective manufacturing. Moreover, systems with a smaller baseband may be a hardware requirement in consumer devices constrained by chassis size such as smartwatches. Cellular modems may be installed in such devices, but the local cache of peripheral processors in such devices may remain limited in size (caused at least in part to the limited physical size). One of ordinary skill in the art will appreciate that various types of chipsets and modems residing on the baseband (cellular, NFC, Bluetooth, etc.) may take advantage of this "non-cached" mechanism for completing out-of-order transactions of data.

Specific details as to the transfer of TDs and CDs using the TR and CR according to the above non-cached out-of-order completion of FIG. 9 will be described below.

FIGS. 10A-10F illustrate an exemplary sequence of memory layouts during an exemplary out-of-order completion operation according to the present disclosure, having a TR (TR_Y) and a CR (CR_B) represented as queues in unidirectional pipes. While the following example of FIGS. 10A-10F is presented in the context of a single completion for clarity, the various steps illustrated therein may apply to completions via multiple pipes, multiple TRs and/or CRs, and/or more than two independently operable processors.

Figure 10A:
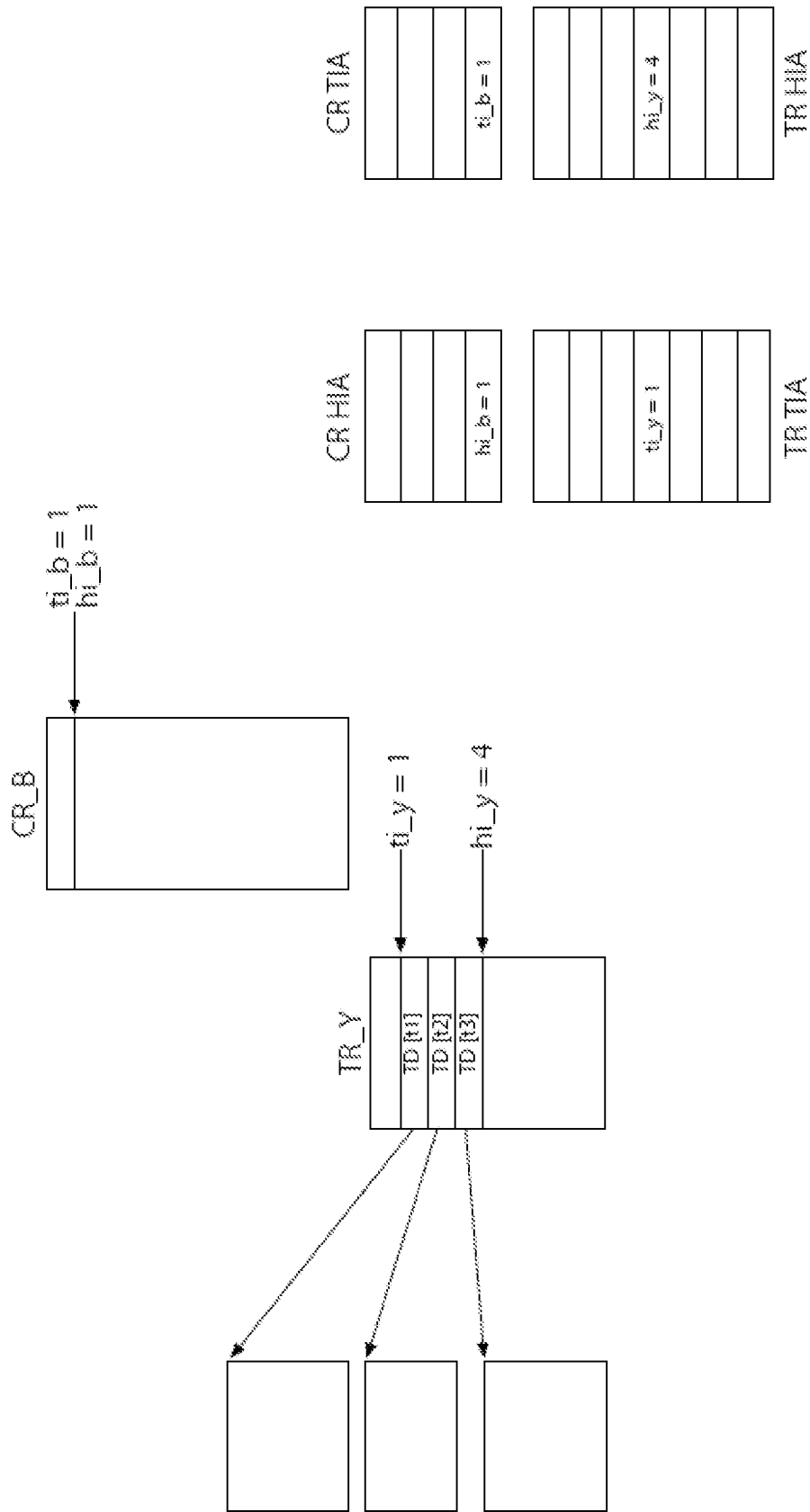
FIGS. 10A-10F illustrate various stages of an exemplary memory access within the context of the non-processor-cached system of FIG. 9, in accordance with the principles described herein.

Referring now to FIG. 10A, FIG. 10A shows an exemplary embodiment of a transfer descriptor ring "TR_Y" and a completion descriptor ring "CR_B" and their corresponding indices in index arrays. In one embodiment, the described memory structures reside within a shared memory apparatus; however, artisans of ordinary skill in the related arts given the contents of the present disclosure will recognize that the aspects are not so limited. The various data structures (e.g., index arrays and/or memory buffers) may be located on the host-side and/or peripheral-side memory. In other variants, some or all of the data structures may be located in any other memory accessible by both the host and peripheral processors (e.g., DRAM, processor cache).

As noted in previous discussions TR HIA and TR TIA identify the TDs of the TR and associated data buffers that are available for processing for each of the host and peripheral. Similarly, the CR HIA and CR TIA identify the CDs of the CR that have available completions.

As shown in FIG. 10A, the peripheral has received and written out-of-order data into buffers identified by the TDs of the TR_Y. As shown, the TR contains three TDs, with data buffers $t_1$, $t_2$ and $t_3$. The CR CR_B contains zero (0) completion descriptors (CD) at steady state. However, at the peripheral has not yet provided CDs having order information.

Figure 10B:
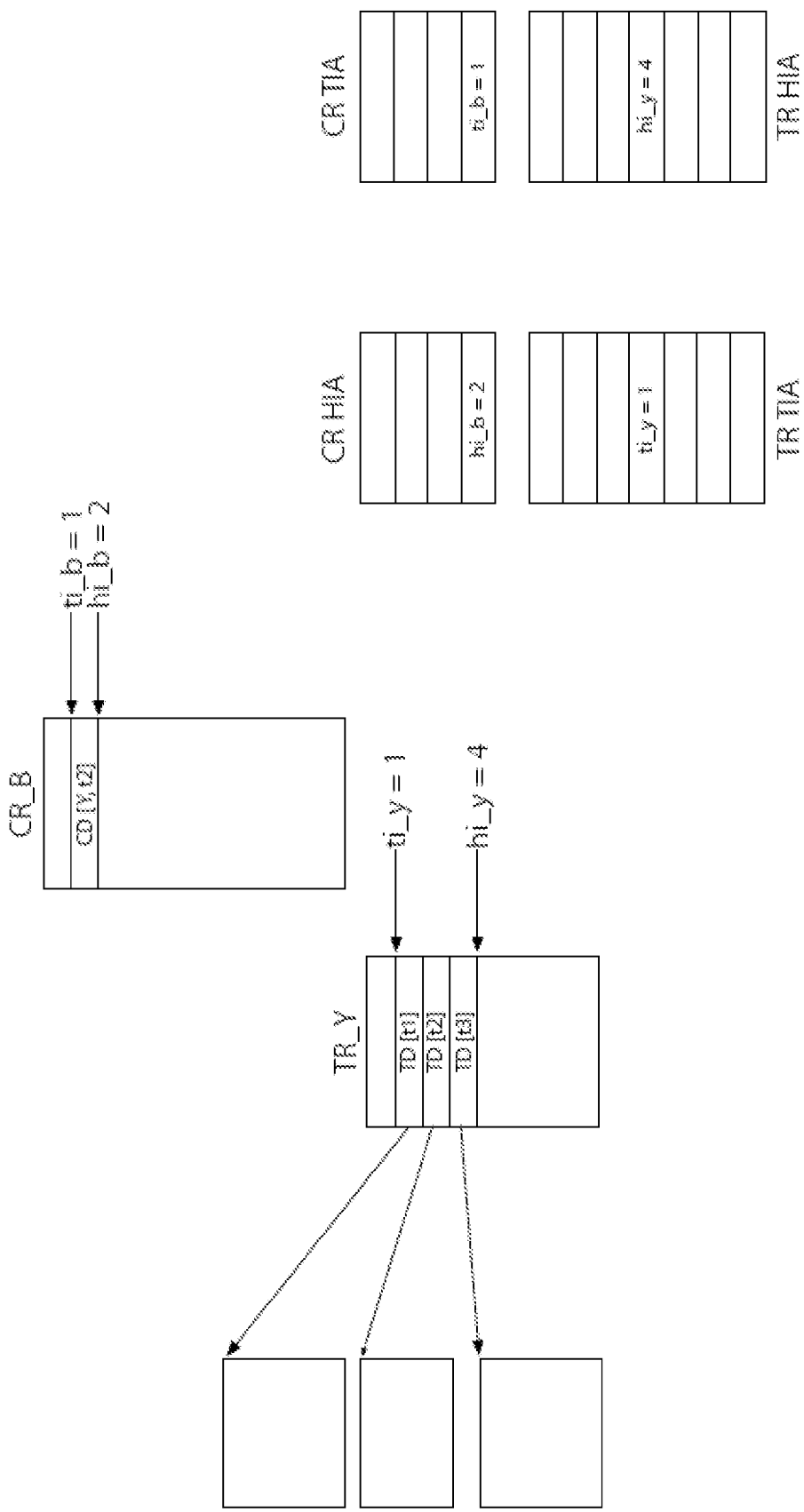

In FIG. 10B a peripheral processor (e.g., baseband processor 908 of FIG. 9) writes order to CD. This CD points to TR_Y and the buffer $t_2$, as indicated by the respective identifiers "Y" and "t2". This CD may be placed in the next available slot at index location 1 of the CR. More directly, as shown therein the peripheral processor is re-ordering buffer $t_2$ (for comparison: during in-order processing, $t_2$ should be accessed before $t_1$). For example, $t_2$ may have contained data that originally precedes $t_1$ but had to be retransmitted after $t_1$ because of, e.g., a transmission error, delay, corruption, resulting in the TD corresponding to $t_2$ being written after the TD for $t_1$.

Thereafter, the peripheral processor updates value of "hi_b" of CR HIA to 2 to indicate that a new CD is available. The peripheral may also generate an MSI or other signal for the host processor to indicate the presence of the new CD. In some embodiments, rather than waiting for an MSI, the host processor may check the CR HIA and/or other head or tail indices according to its own scheduling. In some alternative variants, a processor may provide an array of so-called doorbell registers, and a so-called head pointer doorbell array (HPDA) which is further indexed by pipe number.

The value of "ti_y" may not be updated yet, since not all TDs leading up to the TD for buffer $t_2$ have completed yet; the TD for buffer $t_1$ may still be active.

Figure 10C:
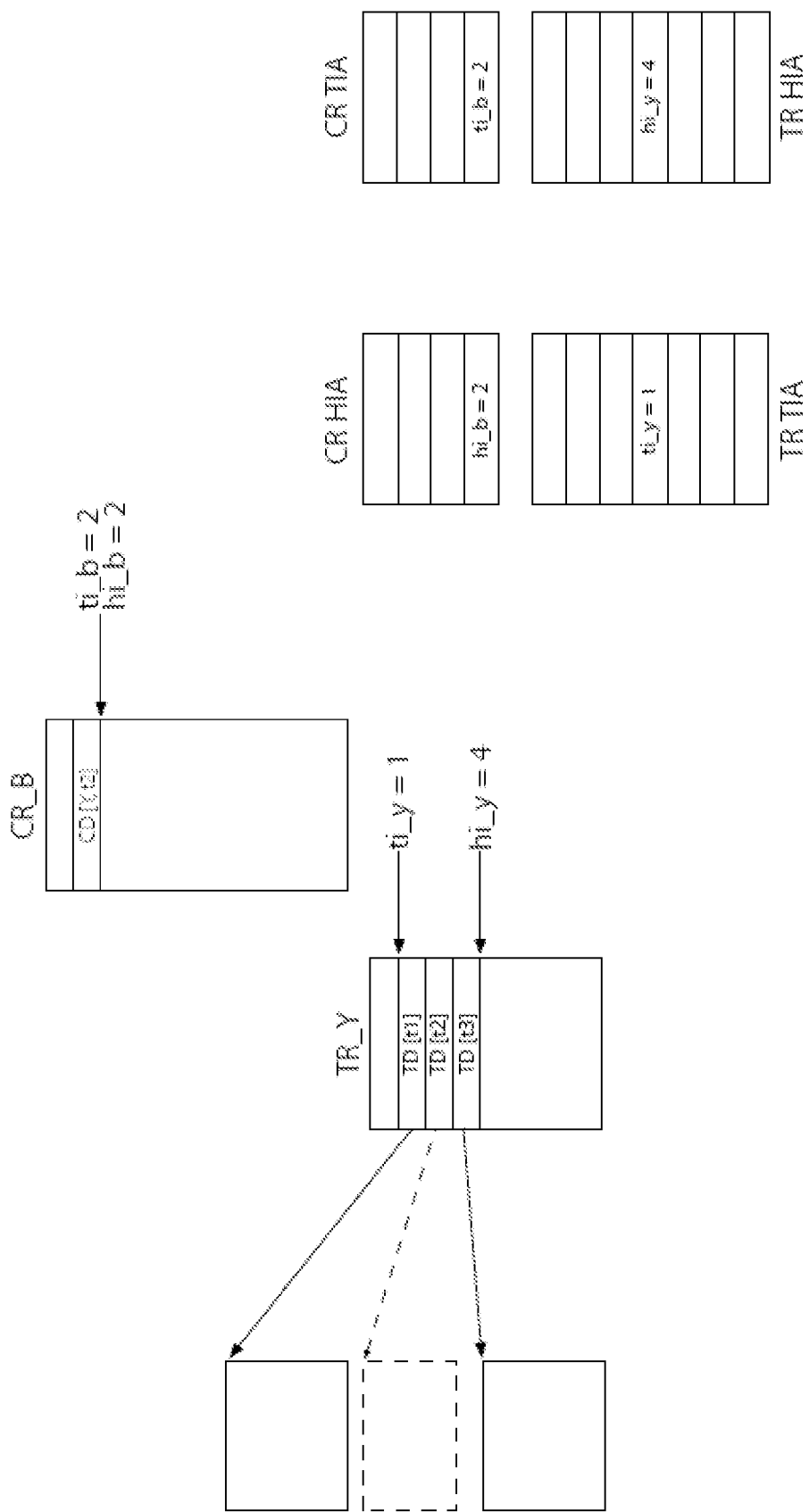

FIG. 10C shows an exemplary embodiment of the host processor (e.g., application processor 808 of FIG. 8) processing the CD (placed in slot position 1 in FIG. 10B). Upon receiving the MSI from the peripheral, the host processes the new completions. As noted above, the CD points to buffer $t_2$. Thus, in accordance with the identifier in the CD, the host may process (e.g., retrieve from memory) the data buffer $t_2$ (shown by dashed box linked to TD [$t_2$]), which had been placed out-of-order in TR_Y. The host may then update the value of "ti_b" to 2 to indicate that the CD and the corresponding data has been processed. In one variant, the host processor may further write to a corresponding doorbell register to indicate to the peripheral processor that the proper buffer (here, $t_2$) has been processed.

After the host processes the buffer, the corresponding TD space is freed, which results in a "hole" in TR_Y (the dotted buffer). In this embodiment, this space may not be reused by the host until all buffers queued prior to the completed buffer ($t_2$) are completed and the peripheral updates the value of "ti_y".

Figure 10D:
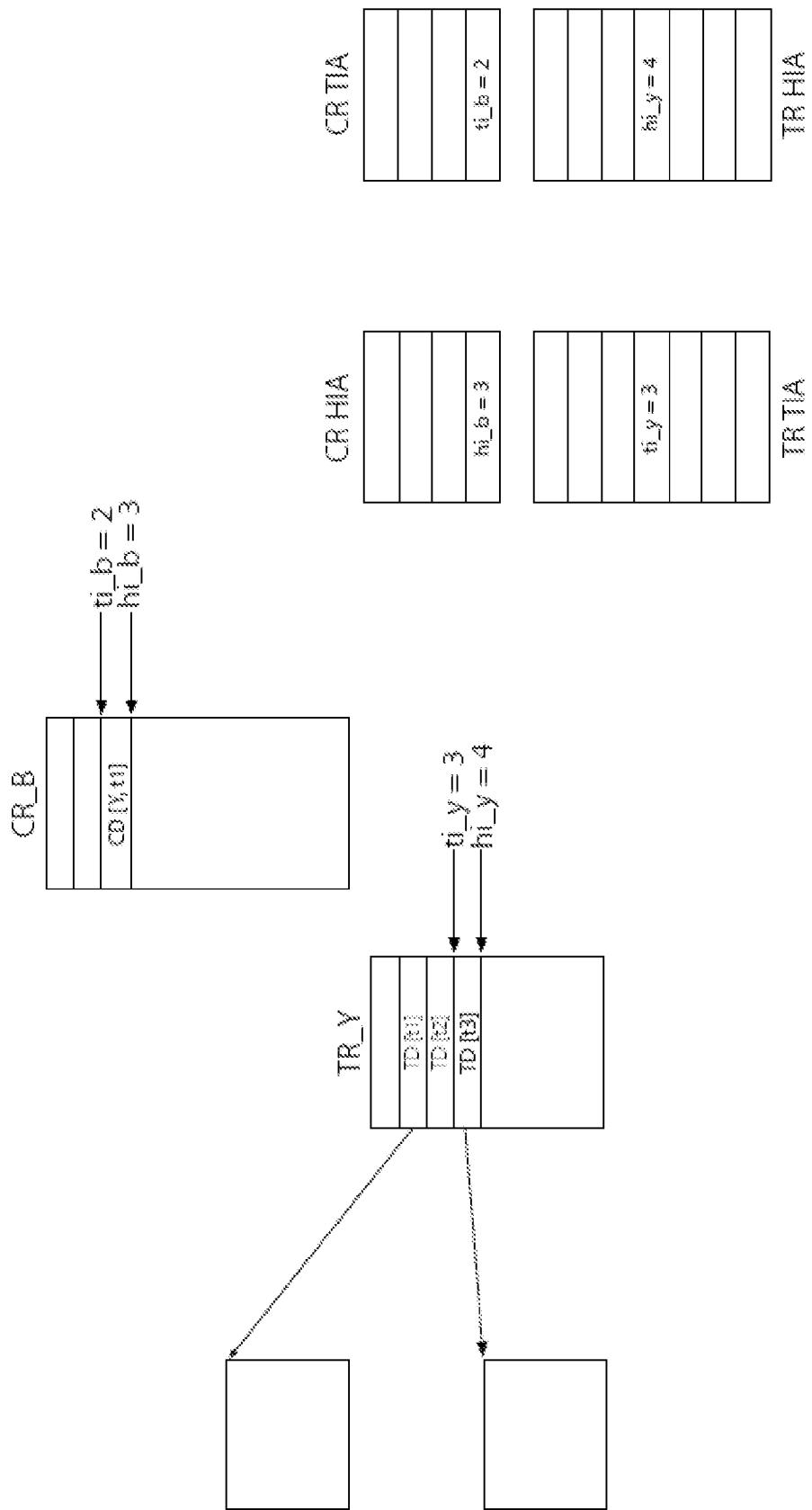

FIG. 10D shows an exemplary embodiment of the peripheral processor completing another buffer in the proper order, e.g., the next-in-line buffer $t_1$. Here, the peripheral processor creates another CD with identifiers of "Y" and "$t_1$" to indicate that TD [$t_1$] from TD_Y should be processed by the host. This CD may be placed in the next available slot (slot position 3) of the CDR. To inform the host processor about this CD (and thus the next TD to process), the peripheral processor updates the value of "hi_b" to 3 (indicating that a new CD is available) and the value of "ti_y" to 3 (indicating that the TDs at slot position 3 and above will be completed and the next TD will be after slot position 3). In one variant, the peripheral may further generate an MSI for the host.

Figure 10E:
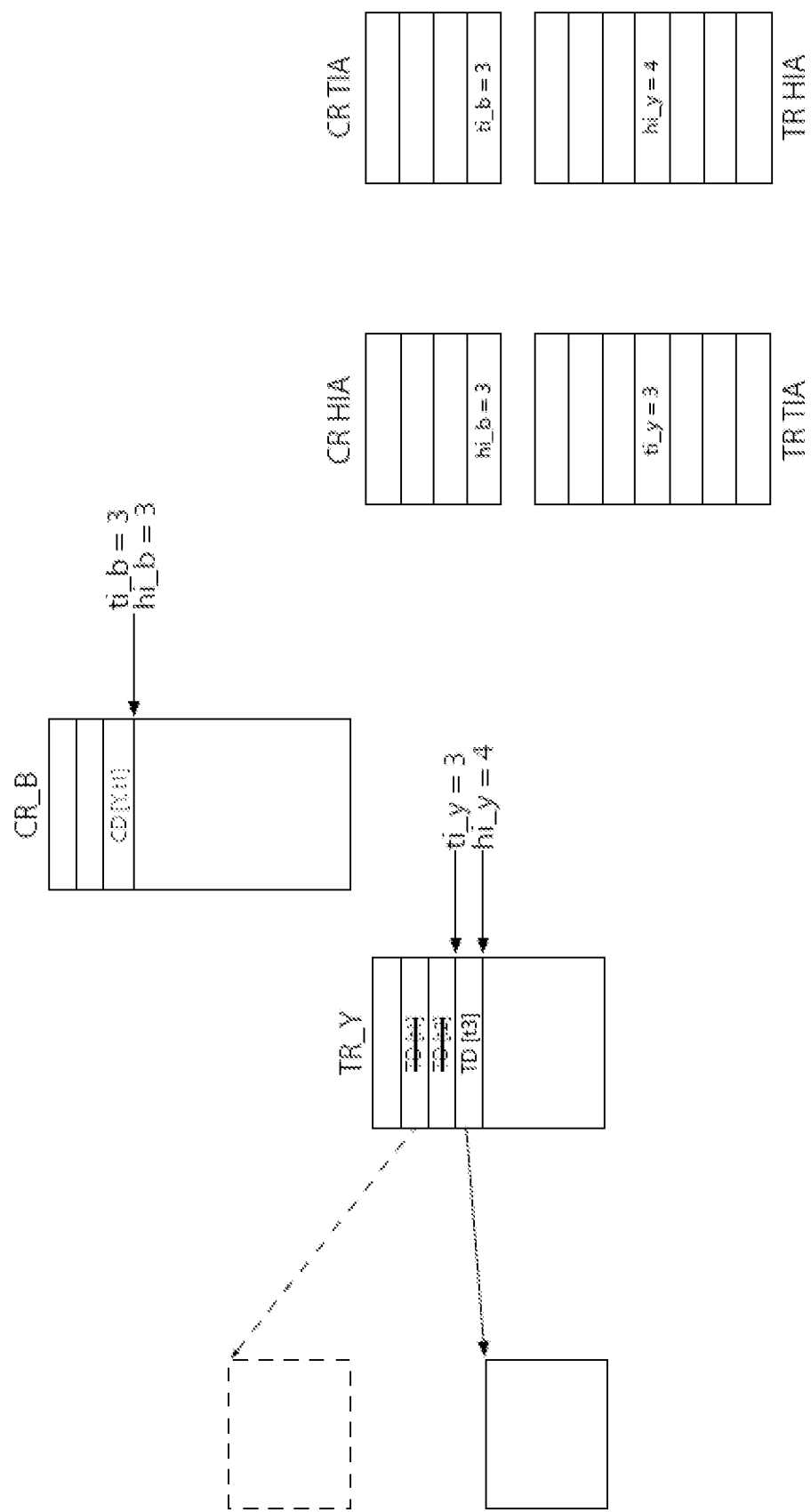

FIG. 10E shows an exemplary embodiment of the host processor processing the new CD upon seeing hi_b=3. In one variant, the host may additionally require a receipt of an MSI generated by the peripheral processor. In another variant, receiving the MSI alone may be sufficient to process the new CD. The second CD (created in FIG. 10D) points to data buffer $t_1$; this data is processed by the host (indicated by dashed box linked to TD [$t_1$]).

Once ti_y=3 (indicating that all of the prior TDs have been completed), the host may remove the corresponding TDs from TR_Y (indicated by strikeouts of TD [$t_1$] and TD [$t_2$]). The host may then update the value of "ti_b" to 3, indicating that the second CD has been processed. This causes ti_b and hi_b to be equal again, which indicates that there are no outstanding CDs to process. In one variant, the host processor may further transmit a signal to inform the peripheral processor that the CDs are completed and that new CDs may be created at the next available location (i.e., the fourth slot of CR_B according to the new hi_b value of 3).

In one variant, the may further write to a corresponding doorbell register, e.g., to indicate to the peripheral processor that the new CD has been processed. The TD space freed in the TR may allow the host processor to reuse the space previously pointing to buffers $t_1$ and $t_2$. Freeing the space that was previously designated for the TD for buffer $t_1$ means that all buffers queued prior to the last-slot buffer ($t_2$) were completed, removing the "hole" and allowing the host to reuse the contiguous free space for other TDs.

Recall that these data buffers (tagged as $t_1$ and $t_2$) were received out-of-order, where $t_2$ should have been received before $t_1$. Although the peripheral processor may have received the data out-of-order (where $t_2$ should have been received before $t_1$), the peripheral processor has placed the buffered data in the proper order by creating the CD for data buffer tagged as $t_2$ before the CD for data buffer tagged as $t_1$ and enabling the host processor to retrieve the data in that order.

Figure 10F:
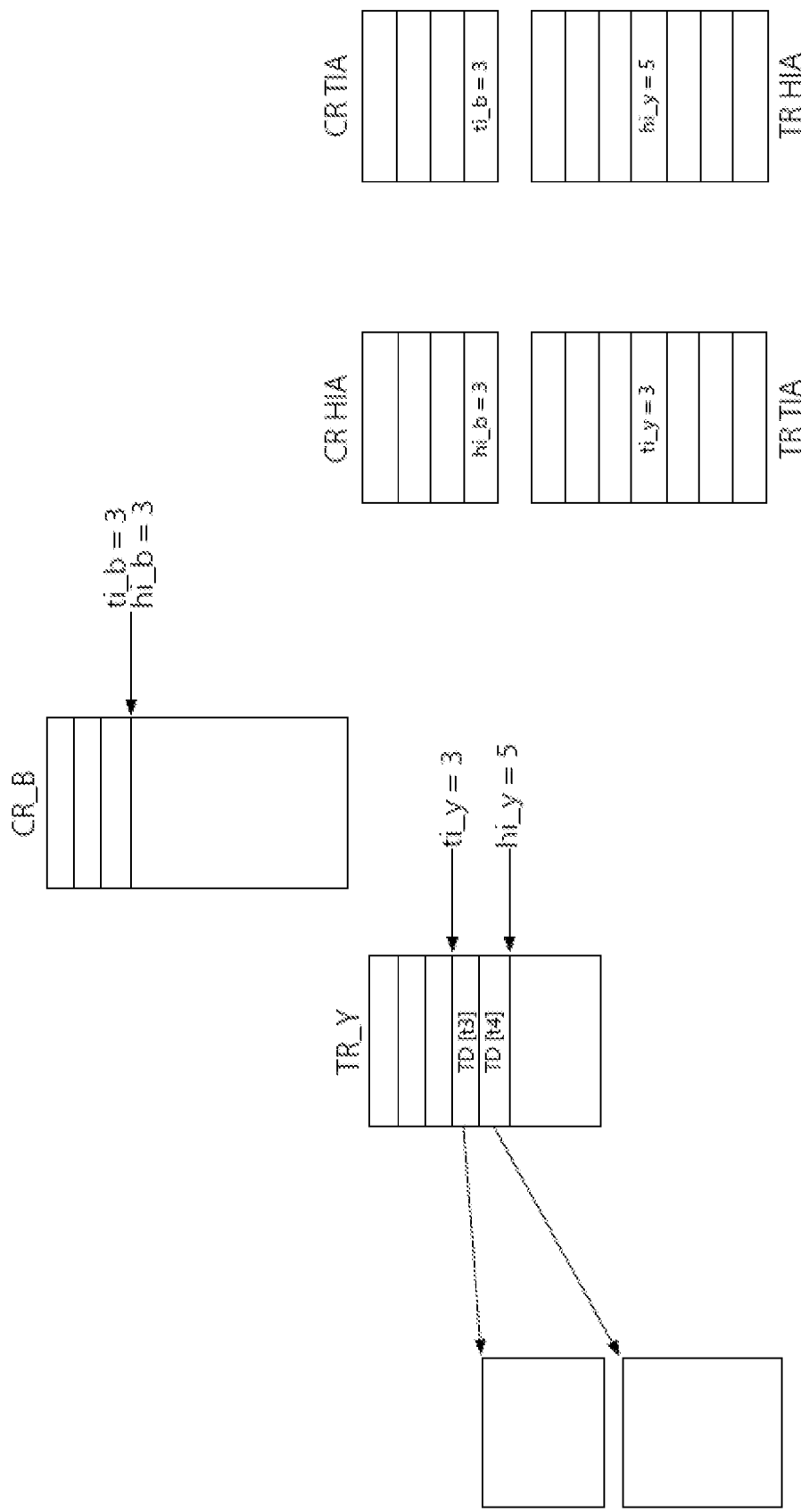

Lastly, FIG. 10F shows an exemplary embodiment of the host processor queuing a new TD ($t_4$). Upon receiving a new I/O or data buffer to be transferred (e.g., via a wireless interface of the device), the process is repeated.

The foregoing completion mechanism as discussed with respect to FIGS. 10A-10F may thereby allow out-of-order processing of TDs via usage of a TR in shared memory where processor-side memory apparatus does not cache the TDs.

Optimized Out-of-Order Completions

In some embodiments, a single CD may correspond to multiple TDs that were received out-of-order. More directly, while the foregoing illustrative examples showed completions of a small quantity of TDs (six or fewer), in practical terms, a user equipment may need to receive and handle data that result in TDs that reach upwards of multiple orders of magnitude greater than the illustrative examples described thus far. Hence, it is useful to incorporate a better-optimized completion scheme that consolidates groups of TDs according to one or more factors, e.g., sequence, presence of errors, corresponding TR (of multiple TRs), type of data, time of receipt, size of group.

In one embodiment, the optimized completion may complete all outstanding (TDs waiting for completion) up to and including the expressly completed TD. For example, consider a group of 1,000 TDs in a TR. In one such optimized completion scheme, TDs 11 through 1000 may be in the proper order, while TDs 1 through 10 correspond to data retransmitted as a result of corrupted data or failure of transmission. Thus, TDs may be improperly ordered as 11-1000, then 1-10. The peripheral processor may write CDs that correspond to each group, i.e., one CD with a tag for TD[10] to complete TDs up to and including TD [10] (e.g., 1-10), and one CD with a tag for TD[1000] to complete TDs 11-1000. By grouping multiple TDs in a continuous sequence, the peripheral processor efficiently completed 1000 TDs with only two CDs, even though the TDs are out-of-order.

In another exemplary implementation, completions may be "distributive" in nature; for example, a CD that completes multiple TDs may distribute the completion status to all of the TDs (e.g., a success status indicates that all TDs succeeded, a fail status indicates that all TDs failed). For example, consider the situation where data corresponding to TDs 1 through 900 was properly received, 901 through 910 failed, and 911 through 1000 was properly received. In this situation, TDs 901 through 910 and TDs 911 through 1000 were successful and can be used. The peripheral processor may write three CDs having distributive completion status. Specifically, one "success" CD with a tag for TD[900] to indicate successful completion of TDs up to and including TD [900], one "fail" CD with a tag for TD[910] to indicate failed completion of TDs from TD[901] up to and including TD [910], and another "success" CD with a tag for TD[1000] to indicate successful completion of TDs from TD[911] up to and including TD [900].

In some embodiments, multiple TRs and one CR reside in the shared memory, and TDs may be grouped according to which TR they correspond to. TDs may be grouped according to, for example, type of data. If a user equipment is receiving audio and video data simultaneously, audio and video data (and other types of data, e.g., encoded text strings) may be handled separately. For instance, the peripheral processor may write a CD with an identifier for the TR and the group of data received. "CD [A, $t_1$, $t_{500}$]" may be written to the CR to indicate to the host processor that data (e.g., MPDUs 1-500) for TR_A were completed. "CD [B, $t_{501}$, $t_{600}$]" may be written to indicate completion of MPDUs 501-600 for TR_B. Subsequently, "CD [A, $t_{601}$, $t_{700}$]" may be written to indicate completion of additional MPDUs 601-700 for TR_A, and so on.

Conversely, out-of-order data may be allocated to multiple CRs. TDs associated with one portion of the out-of-order data would be completed according to one CD, and other CD(s) for other portion(s) of the out-of-order data. This implementation may be useful for, e.g., CRs whose slots are mostly occupied (and running out of space for new CDs), usage of a large shared memory allowing multiple CRs to reside therein, or where each CR is allocated for different data types similar to the above where data is separated according to type (e.g., audio and video).

In another variant, the system may be configured such that TDs may be grouped by simply pointing to the last TD in the sequence. For instance, "CD [A, $t_{1000}$]" may indicate that MPDUs 1 through 1000 were completed. If only MPDUs 50 through 1000 were actually received, it would indicate that MPDUs 50 through 1000 were completed. In this case, another CD identifying [A, $t_{49}$] would indicate that MPDUs 1 through 49 were received subsequently out-of-order; the peripheral processor may write CD [A, $t_{49}$] before CD [A, $t_{1000}$] to indicate the correct order of completion.

In yet another variant, TDs may be grouped similarly according to the size of data received. For example, if the payload is large enough to fill an available memory apparatus (e.g., DRAM, processor-side cache, backing buffers) when it is received (e.g., other data already allocated to memory, insufficient memory remaining), TDs associated with the payload may need to be separated into two or more groups. In one implementation, the size of each group may be equal under a presumption that more memory space will not be available. However, the payload may be split into two where the first group is limited by currently available memory space and the second group consists of the remainder. In the latter case, each CD would correspond to each group e.g.: "CD [A, $t_1$, $t_{600}$]" for the first portion of the payload and "CD [A, $t_{601}$, $t_{1800}$]" for the second portion. Again, the order of these CDs written to the CR would depend on the proper order.

Methods

The following discussion describes methods for indicating completion of out-of-order data transactions between two (or more) independently operable processors according to the present disclosure. In one exemplary variant, the signaling is further optimized for completion of groups of data transactions.

Figure 11:
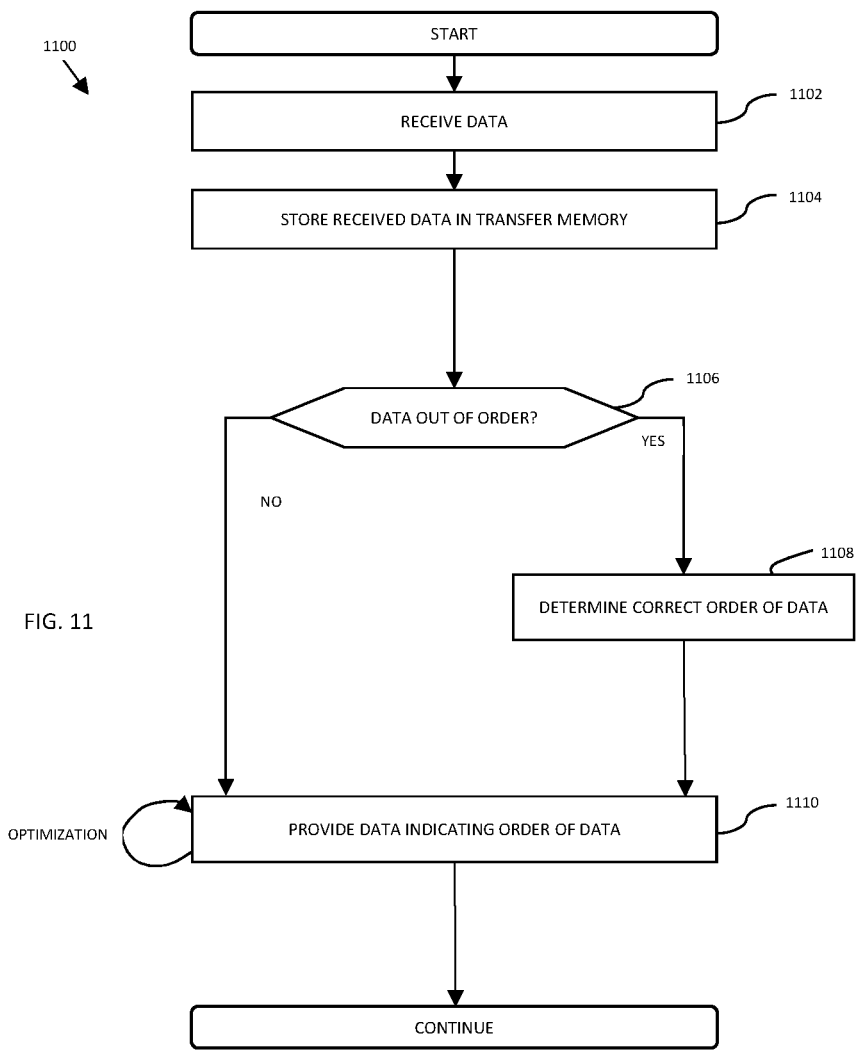
FIG. 11 illustrates one exemplary method for completing an out-of-order data transmission received at a system having two or more independently operable processors using a processor-side cache, in accordance with the principles described herein.

FIG. 11 illustrates one exemplary method 110 for completing an out-of-order data transaction, in accordance with the various principles described herein.

At step 1102 of the method 1100, a processor receives data. In one exemplary embodiment, the processor (e.g., baseband processor) is in data communication with an another processor (e.g., an application processor), both housed in a user equipment. However, the present disclosure is not so limited, and the following method may be adopted by any of the independently operable processors. In a further exemplary embodiment, the signaling is further optimized for completion of groups of data transactions.

In one exemplary embodiment, a wireless modem resident (or in data communication) with the second processor receives data from a source, such as an access point apparatus, a cellular tower, a small cell or femtocell, a base station, another user equipment, a peripheral device, or other entity. In another embodiment, data may also be received from other parts of the user equipment, such as a third independently operable processor apparatus.

The data received through the modem may include any type of digital data encapsulated in packets or other data structures. Examples include but are not limited to audio, video, image, text (e.g., plaintext, encoded strings, code, markup, network data (e.g., SSID, beacons)), and gaming data (e.g., mobile application, binary data that toggles status). As noted previously, the wireless modem may be configured for 3GPP cellular (e.g., 3G, 4G LTE (Long Term Evolution), incipient 5G NR (New Radio) standards according to Release 15 and beyond) or IEEE Std. 802.11 (e.g., Wi-Fi) connectivity, as well as other long- or short-range communications, such as Bluetooth (including BTLE), RFID, or GPS.

At step 1104 of the method 1100, the processor stores the data into a transfer memory.

In one such embodiment, the data is written to a data structure. As used herein, the term "data structure" refers without limitation to any particular schema for organizing and storing data such that it can be accessed and modified. A data structure is generally characterized by one or more of: (i) the collection of data elements, (ii) the relationships between the various data elements (if any), and (iii) the functions or operations that can be applied to the data. Common examples of data structures include without limitation scalars, records, vectors, arrays, multi-dimensional arrays, linked lists, hashes, union, classes, buffers, circular or ring buffers, FIFO (first in, first out) buffers, LIFO (latest in, first out), graphs, trees, and/or any other structured data.

In one embodiment, the data is written into one or more backing buffers associated with a transfer descriptor ring (TR). These backing buffers may be any memory device associated with a transfer descriptor ring (TR) and reserved for data written by at least the processor. In one variant, the backing buffers may reside in shared memory accessible by both a first and the second processor apparatus. In another variant, the backing buffers may reside external to the shared memory and be accessible to one or both processors.

In the exemplary embodiment, the one or more data structures include one or more transfer descriptors (TDs) that are stored within a transfer descriptor ring (TR), where the TDs may describe the data stored in one or more backing memory buffers. In one such variant, the TDs, TRs, and/or backing memory buffers are read, stored, and/or written from/to a shared memory module. For example, in one such implementation the second processor apparatus reads and/or writes the one or more TDs into the TR. In another variant, TDs may describe data stored on external DRAM as mentioned above.

In one exemplary variant, the TR includes one or more TDs which are defined based on one or more referential data arrays. In one such implementation, the one or more referential data arrays include a head pointer array and a tail pointer array. Each of the head pointer array and tail pointer array include one or more indices that identify, e.g., the position of TDs, point to free space in the TR, and/or indicate which TDs or buffers to process next.

In one exemplary embodiment, the processor apparatus writes the data to memory (e.g., backing buffers) in a first order. In one exemplary variant, the first order is the order of reception and may be out-of-order. For example, some of the data may be corrupted, partly missing, have failed to transmit or receive, or otherwise unreadable or unusable, which may prompt the access point (or other source of data transmission) to retransmit the unreadable data out-of-order.

In one embodiment another processor caches the one or more data structures into a local cache. In one such variant, the one or more data structures can be immediately freed or otherwise reclaimed. In some variants, the local cache resides within the processor's cache. In alternative embodiments, the local cache resides within another processor's cache. In another embodiment, the local cache may reside within a memory buffer that is shared by both the first and second processor apparatuses. Still other implementations of the present disclosure may be substituted with equivalent success by artisans of ordinary skill, given the contents of the present disclosure.

For example, in one such implementation, placing at least some the data structures within a cache memory (e.g., a TD may be cached in a tightly coupled cache) may enable a processor to use cache optimized data transfers (such as direct memory access (DMA) based transfers, etc.) In this manner, a processor can devote more processing resources to other system tasks, e.g., user interface and/or general processing burden. Alternatively, placing at least some of the data structures within an external memory (e.g., in an external DRAM) may require the processor to access the data over the physical bus; however, such implementations may be desirable for cost or reliability reasons (e.g., commodity components, explicit handshaking, etc.)

In one exemplary embodiment, transferring data into a local cache includes copying some or all of the TDs from the TR onto the cache, thereby offloading the TDs and freeing up space from the TR. In one variant, only out-of-order TDs are copied to the cache. Copying only some of the TDs may be useful when cache space needs to be conserved, although identifying the TDs will require additional evaluation of the TDs to determine which TDs need re-ordering. In another variant, all of the TDs pending in the TR are copied to the cache. Copying all the TDs reduces up-front cataloging of which TDs need to be reordered and may be possible with larger cache sizes.

In one exemplary embodiment, the one or more data structures are representative of data to be processed by the another processor, e.g., rendered for video display or user interface element, read to execute instructions, shown as text on a display, synced or combined with other data for user consumption (e.g., playing as audio), decrypted, or otherwise processed). In another embodiment, the one or more data structures are representative of data to be transmitted further to another device such as an external peripheral device (e.g., mouse, another user device), another processor, and/or another access point. That is, the data structures may be directly consumed by the processor or the another processor (or other processors or parts of the user equipment). Various other forms of data transactions and/or data consumption may be substituted by those of ordinary skill in the related arts given the contents of the present disclosure, the foregoing being purely illustrative.

In some embodiments, the processor may notify another processor when one or more data structures are available for processing. In some variants, the notification is performed via messaging, an interrupt (e.g., MSI), or other explicit signaling. In some cases, the MSI may additionally identify the one or more data structures for processing (e.g., the MSI may identify a TR/TD allocation via numeric values for each head or tail index).

In other embodiments, the second processor apparatus may independently determine when one or more data structures are available for processing and/or when the one or more data structures can be processed. For example, the second processor may periodically poll for any new data structures and change the interval for polling based on, e.g., changes to a TD/TR, rate of new TDs being written to a TR, and/or other associated data structures. In other examples, the second processor may retrieve new data structures based on, e.g., its own considerations and/or application requirements. For example, the second processor may poll for new data structures based on its own power consumption requirements and/or processing limitations. In other examples, the second processor may retrieve new data structures based on a pre-agreed schedule to support application requirements, e.g., audio or video streaming. For example, the payload may be scheduled for reception at time intervals for another processor, a local memory buffer, and/or an external memory module.

In some embodiments, the processing is based on a packet-based protocol. In one such variant, the packet based protocol is delivered via a pipe (data stream) of an inter-processor communication (IPC) link. In one exemplary variant, the pipe of the IPC link is represented by a TR including one or more packets stored within one or more TDs. In alternative embodiments, processing is based on a stream-based protocol, e.g., a direct memory access (DMA). Unlike packet-based protocols which send data via in distinct packets, a stream-based protocol sends a continuous flow of data (e.g., not discrete units of data).

As a brief aside, data (payloads, packets, TDs, and/or any other structured data) may vary widely in size between different applications. However, different data structures may have size constraints to e.g., reduce complexity and/or simplify design constraints. For example, packets may be maximally sized at 1,500 kilobytes (kb) so as to minimize packet routing hardware complexity within the context of IEEE 802.3 Ethernet frames.

In another example, a TD may be optimally sized at 2 kb so as to simplify memory management within the processors. Within this context, data structures may be joined together to form larger data structures, such that virtually any size transaction may be handled. For example, a TR that has linked TDs can transfer larger payloads to suit so-called "jumbo" frames (Ethernet frames with more than 1,500 bytes of payload, the size set by the IEEE 802.3; generally, jumbo frames are specifically suited for certain products and services). For example, linking four (4) 2 kb TDs can transfer up to an 8 kb jumbo frame. Completions may either individually complete each TD (e.g., four (4) CDs that directly correspond to the four (4) TDs), or complete the set of TDs in aggregate using overflow-type completions (e.g., a single CD status provides a "distributive" status for all four (4) blocks).

In one embodiment, the one or more data structures are accessed over a bus linked to the processor interface. The bus interface may be singly mastered or multiply mastered. In one such variant, the bus interface is an IPC link. In various embodiments, the IPC link may include a pair of unidirectional pipes or a bidirectional or multidirectional pipe. Other examples of a bus interface usable with the present disclosure include without limitation, Peripheral Connect Interface (PCI), PCI-Express (PCIe), Small Computer System Interface (SCSI), Thunderbolt, FireWire (and other implementations of IEEE 1394), Universal Serial Bus (USB) and variants thereof (e.g., USB-C, Micro-USB), and any other high speed bus interface.

In alternative implementations, the one or more data structures are read via an internal processor bus. For example, the data structures may be DMA'd (direct memory access) by the processor. Subsequently thereafter, the processor reads the one or more data structures via its internal memory bus. Various other techniques for reading data structures may be substituted by those of ordinary skill given the contents of the present disclosure.

At step 1106 of the method 1100, the processor determines whether the data is out-of-order.

In one embodiment, the processor determines the proper order based on identifiers included with a header or footer (or another portion) of a given received packet or data structure. For example, each MPDU may contain a sequence number and/or a fragment number totaling 16 bits. Moreover, the sequence number may increment by one after each MPDU frame (incremented by the device transmitting the data), thus creating a sequentially coherent series of MPDUs having a series of increasing numbers as long as the data is not interrupted, corrupted, etc. Thus, the processor may read the sequence number of each MPDU received to see if there are any "holes." Based on such inference, the processor may then request retransmission of the missing MPDU from the source of data (e.g., the access point), and/or identify an appropriate ordering of received MPDUs.

By way of example, a series of MPDUs numbered 1 through 80 and 82 through 100 may imply that there should have been an MPDU numbered 81. A series of MPDUs numbered 2 through 100 may indicate that there should have been an MPDU numbered 1. A series of 100 MPDUs numbered 1 through 20 and 30 through 90 may indicate that there should have been MPDUs numbered 21 through 29 and 91 through 100. As for the MPDUs numbered 91 through 100, the processor may require additional information that 100 MPDUs were transmitted. Such information may include a separate file or index as described below.

In another embodiment, the proper order may be determined based on a separate file or index that lists identifiers of each MPDU or a range of MPDU sequence numbers to be sent by the data source (e.g., access point) that the processor may check against the data actually received. In another embodiment, the proper order may be dictated by another processor, where the another processor identifies and requests a certain set of data in a certain order indicated by, e.g., aforementioned means of determining the correct sequence MPDUs or packets. Other numbering schemes may be used, including binary or hexadecimal numbering.

In still other embodiments, the processor determines that one or more packets or data structures should be skipped. More directly, there are circumstances where out-of-order operation (e.g., missing packets) is acceptable, or even desirable. For example, in some cases, rather than waiting for a packet, the second processor may simply ignore the missing packet and flush any data dependent thereon. In other cases, rather than waiting for a packet, the second processor may simply skip the packet and accept any resulting errors (which can be corrected via other post-delivery techniques).

If the data is out-of-order and requires correction, then at step 1108, the processor determines an order for the data.

In one embodiment, the processor determines the correct order of data based on the aforementioned sequential identifiers. For example, the proper order may be determined based on identifiers included with a header or footer (or another portion) of a given received packet or data structure (e.g., a sequence number and/or a fragment number, alpha-numeric quantity, and/or other enumeration). In some embodiments, the processor may additionally take steps to remedy the out-of-order data; for example, the processor may return to step 1102 and request retransmission of missing data. In some systems, missing data can be inferred based on e.g., data that is present and/or historical analysis. In other systems missing data can be replaced with substitute data. Still other techniques for managing missing data may be substituted by artisans of ordinary skill given the contents of the present disclosure.

In one exemplary embodiment, the processor infers the correct order of data based on information within the data. For example, the correct order may be inferred from one portion of originally received data that identifies a second portion of previously missing data. In some other cases, the correct order may be may be inferred from an index file, table of contents, or other information used to determine the contents of a data structure.

At step 1110 of the method 1100, the processor provides the order to another processor.

In one exemplary embodiment, the another processor retrieves the one or more data structures according to the correct order of data determined at step 1108. In one embodiment, the rearrangement includes reading data buffers identified by TDs of the TR in the proper order. In another exemplary embodiment, the another processor re-orders one or more data structures stored in a local cache according to the correct order of data determined at step 1108.

In some variants, the another processor checks the list of TDs to evaluate whether the sequencing is correct (i.e., there are no holes) and/or checks the list of TDs against any index file or list received from the data source.

In one exemplary embodiment, order information is provided via one or more completion data structures to indicate the completion of data. In one exemplary embodiment, the completion data includes completion descriptors (CDs) that indicate which TDs are to be processed in which order by, e.g., the first processor apparatus. In one such variant, each CD includes a tag that identifies one or more TDs. In one such optimization, the tag identifies any outstanding TDs up to and including the identified TD.

As used herein, the term "completion" refers to the actual end and/or result achieved by a process of finite actions and/or steps. A completion may indicate success (all the finite actions and/or steps of the process were performed successfully and/or achieved expected ends and/or results), failure or incomplete (e.g., at least one action and/or step of the process was not performed, did not succeed, or did not achieve the expected end/result), timeout (e.g., at least one action and/or step of the process was not performed within an allotted time), indeterminate (e.g., the process outcome cannot be determined based on e.g., security and/or permissions requirements), error condition, and/or any other information regarding processor execution or status. In one exemplary implementation, the completion information is a value indicates one or more of the following statuses: invalid, partial transfer (PT), end transfer (ET), overflow, block overflow, abort, and/or error.

In one exemplary embodiment, a data transfer process is completed when the one or more data structures are ready for transfer to another processor. For example, a TD that was successfully placed into the correct order in a sequence of TDs (in the processor-side cache) can be successfully completed by the second processor. TDs that could not be placed in the correct order (because the second processor could not determine proper order, data could not be retransmitted, etc.) may be flagged with a completion that indicates, e.g., failure, timeout, error, or other status.

Various other forms of data structure processing may be substituted by those of ordinary skill given the contents of the present disclosure. For example, a security processor may receive data structures to be processed for, e.g., security authorization within a securely isolated software code base. In some cases, the security processor may provide a successful completion. However, the security processor may not indicate the completion status; e.g., error or timeout information could be exploited by potentially malicious software, etc. Still other forms of data structure processing may be conceived by an artisan of ordinary skill in the relevant art.

Referring back to step 1110, in the exemplary embodiment, one or more completion descriptors (CDs) indicating the proper order of TDs are written to a completion descriptor ring (CR) by the processor. Index values may be updated to indicate to the first processor that new CDs are available. In some variants, the CDs/CR reside in shared memory. In other variants, the CDs/CR reside in either or both of the first and second processors' local memory.

In various embodiments, each CD corresponds to exactly one TD. In other embodiments, each CD corresponds to a number of TDs identified by one or more tags. In one such variant, the CD corresponds to any TD identified by the tag and any preceding TDs not explicitly identified therein which have not yet completed; more directly, one or more TDs may be implicitly associated with the explicitly identified TD. In another such variant, the CD corresponds to any TD identified by the tag and any implicitly associated TDs not explicitly identified therein which have not yet completed. For example, associated TDs may be defined by a set. In one such implementation, the set is identified at the time of initial pipe allocation (e.g., a pipe having a number of TDs is allocated.) In one implementation, the set may be identified or otherwise internally managed by host and/or peripheral software.

As previously alluded to, each CD may contain information indicating which TD (e.g., a TD tag), data, or transaction thereof was completed by the processor. In one variant, each CD may include information on a corresponding TD that was completed. In another variant, a given CD may include information on multiple TDs that were completed. In still another variant, a given CD may include information on a partial TD that was completed. Various other combinations of one-to-one, one-to-many, many-to-one, many-to-many mappings between CDs and TDs will be readily apparent to those of ordinary skill in the related arts given the contents of the present disclosure.

Also as previously alluded to, in one embodiment, each CR corresponds to exactly one TR. For example, CDs in a CR may directly correspond to the TDs in the corresponding TR of the CR. In some variants, this one-to-one correspondence between CR and TR is extended to multiple CRs each corresponding to respective TRs. In other variants, a set of CRs may correspond to a set of TRs but not necessarily in a prescribed one-to-one relationship between a CR and a TR; e.g., a CR may correspond to any TR in the set. In one implementation, the set of CRs and the set of TRs are of equal size. In other embodiments, each CR corresponds to more than one TR. For one-to-many CR/TR correspondences, a CDs in a CR may include a tag that identifies which TR the CD corresponds to. In still other embodiments, many CRs can correspond to one TR. Various other mappings of CR/TR (including among those in other shared memories or other user equipment) will be readily appreciated by those of ordinary skill, given the contents of the present disclosure.

In some embodiments, the completion data structure may expressly reference the data itself (rather than a data structure). For example, rather than a CD that references a TD (e.g., by tag value), some completion data structures may identify ranges of data that have been processed. For example, the completion data structure may identify a range of addresses of a region of buffer or external memory containing the completed data, a unique ID that was previously assigned to the data, and/or a combination of both. Common methods for identifying a range of memory include identifying start address, end address, length, pointer to the next address range (in split ranges of addresses), total count of ranges, total remaining count of ranges, and/or any number of other referential data.

As an aside, as one skilled in the relevant arts may appreciate, completion data structures (CDs) may be smaller in size than data structures for transfer/processing (TDs). In contrast, a data structures for transfer/processing might contain, e.g., consumable media data, particularly in the case where the payload is directly encapsulated in the data structure itself by adding the payload to, e.g., a header, a footer, a body, and/or an address field (according to the delivery mechanisms described in, e.g., co-owned and co-pending U.S. patent application Ser. No. 15/865,638 entitled "METHODS AND APPARATUS FOR REDUCED-LATENCY DATA TRANSMISSION OVER AN INTER-PROCESSOR COMMUNICATION LINK BETWEEN INDEPENDENTLY OPERABLE PROCESSORS" and filed Jan. 9, 2018, incorporated supra). By encapsulating into one or more TDs, relevant information may be delivered to another processor (e.g., the host processor) that reads the TD. During operation, the host first determines the size of the data (the payload) to be included in the TD. If the size is below a predetermined threshold, the host may place the data in the TD. Example of sufficiently small data include new index values, acknowledgments of receipt of data, sequence numbers, or other identifying information. Otherwise, the host processor may write the data to the external memory or a local cache accessible to the peripheral processor.

In one exemplary embodiment, writing one or more CDs to a CR can be performed in a memory allocation that is significantly less than required for writing TDs to a TR. For example, in one exemplary embodiment, each exemplary TD describes a physically contiguous buffer in host memory having a maximum size of two (2) kilobits. In contrast an exemplary CD has a maximum size of 128 bits, of which sixteen (16) bits can be used to represent consecutive completions (e.g., up to 65,535 consecutive completions). In other words, a single CD can be used to complete many consecutive TDs at a fraction of the total memory. As such, in the exemplary embodiment, CRs need not be a large data structure in the shared memory. "Optimized" completions may thereby be implemented as described above.

To reiterate some optimization examples from elsewhere above, a single CD may point to a range of TDs. For instance, "CD [A, $t_1$, $t_{500}$]" may be written to the CR to indicate to the first processor that data (e.g., MPDUs 1-500) for TR_A were completed. Alternatively, the system may be configured such that TDs may be grouped by simply pointing to the last TD in the sequence. For instance, "CD [A, $t_{1000}$]" may indicate that MPDUs 1 through 1000 were completed.

In some embodiments, CDs/CR may reside in a distinct memory from the TDs/TR. For example, the TDs/TR can be stored within a first processor's memory (e.g., host-side memory), whereas the CDs/CR are stored within a second processor's memory (peripheral-side memory). As previously alluded to, different memories have different access latencies for different processors. For example, placing at least some the CDs within the peripheral memory (e.g., in a CR that resides at the peripheral's local cache or buffer) may reduce the burden on the peripheral processor to manage transfers over an external physical bus (this task can be offloaded to the host processor) and vice versa. Other implementations may consolidate the transfer/processing data structure and completion data structure within the same memory (e.g., shared memory 704); such implementations may be simpler to implement within a single memory controller and/or cheaper to manufacture (e.g., larger memories are less expensive than multiple smaller memories.)

In some variants, a first processor notifies a second processor, thereby causing the second processor to acknowledge the completion. Alternatively, a processor may check for completions on its own (without requiring an explicit notification from other processors). More directly, artisans of ordinary skill in the related arts, given the present disclosure, will recognize that explicit notification may be desirable where, e.g., one processor is waiting for completion information. Common examples of such implementations include, e.g., time-sensitive applications, performance maximization, closely coupled processor scheduling, and/or any number of other potential optimizations. In contrast, non-notification and/or deferred notification may be preferable where, e.g., one processor is not waiting for completion information and can prioritize other system considerations. Common examples of such implementations include, e.g., updating background applications, load balancing, reducing power consumption, and/or any number of other potential priorities related to application processing by the application processor.

In one exemplary embodiment, a peripheral processor may generate an interrupt and/or other signaling to notify another processor of an outstanding completion; interrupt-driven signaling may be preferred for time-sensitive or urgent completion messaging. In one variant, the notification includes a message signaled interrupt (MSI). In some variants, the notification includes a "doorbell" (e.g., an update to a status, indication, or flag contained in a separate registry unit). Other common examples of signaling include, e.g., general purpose input/output (GPIO), dedicated hardware signaling, and/or message based signaling.

In one variant, the application processor may read one or more completion data structures (CDs) responsive to the notification, and process the CDs (i.e., read and/or remove the CDs). Upon reading the CDs, the application processor may further acknowledge the completion and/or process the CDs (i.e., remove the CDs or indicate that they have been read), thereby forming a two-way handshake caused at least in part by the peripheral processor. In some implementations, acknowledgment may include a separate signal, interrupt, or doorbell. In other implementations, acknowledgment may include an update to index values (such as those shown in FIGS. 8A-8F).

As an aside, the term "process" and "processing" as used herein refer to a series of finite actions and/or steps taken in order to achieve a particular end and/or result. A process may be executed by a processor, dedicated hardware, and/or any other form of logic that performs logical operations. Examples of processing alternatives include, without limitation, reduced instruction set computer (RISC) processors, complex instruction set computing (CISC) processors, field-programmable gate arrays (FPGAs), application specific integrated circuits (ASICs), and programmable logic devices (PLDs).

Moreover, while the present discussion is presented in the context of wireless communications, the various principles described herein are not so limited. In one exemplary embodiment, processing the one or more data structures includes processing the data structure within a media application for, e.g., playback, capture, and/or rendering. Common examples of media applications include audio codec operation, video codec operation, human interface operation (e.g., touchscreen, keyboard, mouse, headset, and/or any other human interface peripheral). Persons having ordinary skill in the relevant art will recognize that various media interfaces may be enabled depending on the hardware (e.g., displays, speakers, microphones) and human interface elements (virtual or physical) on the hardware, both indigenous to the device and/or externally coupled to the device.

Hence, in some embodiments, a first processor may consume or process the one or more completion data structures (e.g., CDs). In one variant, any payload data embedded within the completion data structures may be used directly by the user device via the first processor. For example, the payload data may include text data that is displayed via a display screen. Alternatively, the payload data may include an image that has been rendered or compressed by another device. The payload data may include instructions to display or modify a user interface. The payload data may also include audio or video data to be displayed on the user device.

Combinations of the above may be processed and/or transacted concurrently. In other embodiments, the application may hybridize one or more subsidiary applications. For example, in some cases an application may include both wireless communication and media application aspects. As one example, a wireless-enabled touchscreen device may require both wireless and rendering functionalities (e.g., video codec operation). In another example, a Short Messaging Service (SMS) may require both limited cellular functionality and user interface functionality. Still other common variants may combine various wireless capabilities (e.g., Wi-Fi with cellular and/or short-range protocols such as Bluetooth) with user applications (e.g., gaming, web surfing, etc.)

In one embodiment, a first processor processes the one or more completion data structures independently of a second processor. More directly, the first processor processes the one or more completion data structures without requiring the second processor to provide, e.g., task scheduling, clock, power, processing code, or other logic. In other words, the first processor's processing of the one or more completion data structures is isolated from the second processor. This enables the second processor to, e.g., switch to other tasks, provide additional completion data, and/or transition into various power-conserving modes while the first processor is processing the data structures.

Alternatively, a first processor may process the one or more completion data structures in conjunction with/or concurrently with other related tasks of the second processor. In one such embodiment, the first processor processes the one or more completion data structures according to scheduling requirements set forth by the second processor. For example, a baseband processor may be required to receive or transmit data from/to a wireless network at a specified time interval in order to ensure that certain application requirements (running at an application processor) are met. Still other implementations may require that the first and second processor share one or more of, e.g., clock, power, processing code, or other logic. In some cases, the first and second processor dynamically adjust the amount of data that is processed according to, e.g., load balancing, power consumption, performance requirements, and/or any number of other system wide considerations.

Artisans of ordinary skill in the related arts will readily appreciate that a data structure may not directly map one-to-one to a process. One or more data structures may be used by one or more processes. Moreover, each process may include sub-processes and/or be subsumed within a larger process or activity. For example, a continuous streaming video may be rendered based on multiple video-associated data structures, each of which is processed via a series of smaller discrete processes (e.g., rendering its constituent video frames, motion prediction, image interpolation). Similarly, a single data structure may be used within multiple sub-processes.

In some embodiments, to assist with processing of the CDs, the payload in the CDs may include self-contained messaging. For instance, CDs may encapsulate message signaled interrupts (MSIs) therein that indicate to and/or instruct the first processor to process another CD. In one variant, the first processor increments sequentially to the next queued CD (immediately subsequent to the last-processed CD).

In alternative embodiments, a CD may include one or more referential messaging. For example, a CD may include a pointer to another CD and/or TD. For example, a CD may identify the next CD that has completed and/or the next TD that is being processed. In some other implementations, a CD may include reference to the contents of another CD. For example, a so-called "overflow" CD may be indeterminate by itself, but reference the contents of a prior or subsequent CD for its own status. Thus, both CDs e.g., succeed or fail based on the referenced CD. In some implementations, a "chain" of CDs can reference one another, thereby allowing a single CD provide completion status for all of the chained CDs.

In other variants, a first processor does not further acknowledge the completion. Here, the first processor is not explicitly notified but determines whether or not a completion is outstanding. In some variants, the first processor can read one or more arrays which identify outstanding completion requests. In other variants, the first processor can read one or more arrays which identify the current record of completion requests, and the second processor determines whether any new completion requests should be serviced. Other common forms of deferred notification include without limitation, e.g., mailboxes, semaphores, and/or other memory based messaging. For example, the second processor may notify the first processor of a completion data in a completion data structure by updating a pointer index to the completion data structure.

In a hybrid embodiment, a first processor may both make its own determinations as well as receive notifications for redundancy in case one happens to fail. For example, in one such case, the first processor checks a CR for a new CD at time intervals, whether or not an MSI is generated and received. That is, the first processor may check before an MSI is expected or even after an MSI is received to confirm the MSI. In some implementations, the time intervals may be static. For example, the interval may be predetermined and checked at regular intervals. However, in other implementations, the interval may vary or be modified depending on network activity, current processing load or priorities, etc.

In some cases, the variance in time intervals may be based on one or more processor considerations. In one such implementation, the interval may be dynamically set such that the interval is smaller when there has been a certain number of transactions (a threshold) over a given time period, and larger when the number falls below the above threshold or a different threshold. Similarly, in another embodiment, the threshold corresponds to the amount of data transactions over the wireless air interface (e.g., amount of data received over a period of time). In another embodiment, the host processor may check for an update to an index value in similar predetermined or dynamic intervals to see whether a particular TD or TDs were transacted or otherwise completed. More generally, the time intervals may be based on processor load, power consumption, performance requirements, load balancing, and/or any other processor consideration.

In one embodiment, once the first processor determines that the second processor has completed the data transactions, the first processor may retrieve the data that was stored by the second processor (e.g., in backing buffer, DRAM) according to the CDs in the correct order, and remove the corresponding one or more TDs from the TR. The second processor may then return to one of the previous steps to evaluate the TDs and/or rearrange any TDs written out-of-order (caused by, e.g., data received out-of-order).

While the foregoing description is presented within the context of a packet-based protocol, those of ordinary skill in the related arts will readily appreciate that non-packet-based protocols may be substituted with equivalent success, given the contents of the present disclosure. For example, in some cases data or payload may be transferred via a circuit-switch or other dedicated signaling protocol. Such connectivity may include, e.g., general purpose input output (GPIO), I2C, I2S, and/or any number of other dedicated bus protocols.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method of re-ordering an out-of-order transaction of digital data received via a baseband processor in data communication with an application processor, the method comprising:
   receiving a plurality of packets via a first interface;
   receiving one or more transfer descriptors (TDs) from a shared memory structure accessible by the baseband processor and the application processor, wherein each of the one or more TDs is associated with a corresponding tag;
   writing the plurality of packets into data buffers identified by the one or more TDs;
   determining an order for the plurality of packets;
   providing the order via one or more completion descriptors (CDs) at the shared memory structure; and
   causing the application processor to retrieve the plurality of packets from the data buffers identified by the one or more TDs, the application processor re-ordering the plurality of packets based on the order.

2. The method of claim 1, wherein the determining of the order comprises determining of the order based at least on one or more headers associated with the plurality of packets.

3. The method of claim 1, wherein the providing of the order via the one or more CDs comprises providing of the order via a single CD that completes multiple TDs.

4. The method of claim 3, wherein the providing of the single CD that completes the multiple TDs comprises identifying a common completion status for one or more outstanding TDs up to and including a single TD; and
   providing the common completion status and the corresponding tag associated with the single TD.

5. The method of claim 1, further comprising:
   requesting a retransmission of one or more missing packets; and
   responsive to receiving one or more retransmitted packets via the first interface:
      writing the one or more retransmitted packets into data buffers identified by one or more subsequent TDs; and
      causing the application processor to retrieve the one or more retransmitted packets from the data buffers identified by the one or more subsequent TDs.

6. The method of claim 5, wherein the determining of the order for the plurality of packets comprises determining an order for the one or more retransmitted packets.

7. The method of claim 1, wherein the causing of the application processor to retrieve the plurality of packets from the data buffers identified by the one or more TDs, further comprises:

freeing the one or more TDs; and writing another plurality of packets into the data buffers of the one or more TDs that were identified.

8. A user device comprising:

a first processor and a second processor;

the first processor coupled to a first interface;

a shared memory structure comprising a first memory structure and a second memory structure; and a non-transitory computer-readable apparatus comprising a storage medium having a computer program stored thereon, the computer program comprising instructions configured to, when executed, cause the first processor to:

read a plurality of packets from data buffers identified by the first memory structure;

transmit the plurality of packets;

receive one or more acknowledgements that identify one or more packets of the transmitted plurality of packets that were successfully transmitted;

determine an order for the one or more packets that were successfully transmitted; and provide the order via the second memory structure;

wherein the second processor is configured to free the plurality of packets based at least on the order provided via the second memory structure; and wherein the first memory structure comprises a plurality of transfer descriptors (TDs), and the second memory structure comprises one or more completion descriptors (CDs).

9. The user device of claim 8, where the instructions are further configured to, when executed, cause the first processor to:

identify one or more packets that were unsuccessfully transmitted; and retransmit the one or more packets that were unsuccessfully transmitted.

10. The user device of claim 9, wherein the instructions are further configured to, when executed, cause the first processor to:

responsive to successful retransmission of the one or more packets that were unsuccessfully transmitted, determine a retransmitted order; and provide the retransmitted order via the second memory structure.

11. The user device of claim 8, wherein at least one of the plurality of CDs of the second memory structure is configured to complete multiple ones of the plurality of TDs of the first memory structure.

12. The user device of claim 11, wherein the at least one of the plurality of CDs of the second memory structure comprises one or more tags associated with the multiple ones of the plurality of TDs.

13. A system configured to re-order data transactions via an inter-processor communication (IPC) link between two or more independently operable processors, the system comprising:

a shared memory structure comprising a transfer descriptor ring and a completion descriptor ring, the shared memory structure being accessible to a first processor and second processor via the IPC link;

wherein the first processor is configured to:

allocate a plurality of transfer descriptors to the transfer descriptor ring, the plurality of transfer descriptors configured to describe data that has been buffered for the second processor;

responsive to a doorbell interrupt, retrieve a first set of data that has been buffered, the first set of data corresponding to a first set of the plurality of transfer descriptors; and re-order the first set of data based on a first order provided within a first set of completion descriptors, the first set of completion descriptors comprising a completion descriptor that is configured to complete multiple ones of at least the first set of the plurality of transfer descriptors.

14. The system of claim 13, wherein:

the first processor comprises an application processor;

the second processor comprises a wireless modem, the wireless modem being configured to receive data from an external wireless-enabled device; and the wireless modem is configured to transact and receive data over the IPC link.

15. The system of claim 13, wherein the first processor is further configured to, responsive to a doorbell interrupt by the second processor, retrieve a second set of buffer data based at least on a second set of transfer descriptors in a second order provided within a second set of completion descriptors.

16. The system of claim 15, wherein the first and second order are configured to describe a sequence of the first and second set of buffer data.

17. The system of claim 13, wherein the completion descriptor comprises a tag associated with a single transfer descriptor.

18. The system of claim 13, wherein the completion descriptor comprises a distributive status for the multiple transfer descriptors.

* * * * *